(12) United States Patent
George

(10) Patent No.: US 8,323,027 B2
(45) Date of Patent: Dec. 4, 2012

(54) SYSTEM OF TEACHING SUCCESS AND METHOD OF TEACHING SAME

(76) Inventor: Kevin W. George, East Schodack, NY (US)

( * ) Notice: Subject to any disclaimer, the term of this patent is extended or adjusted under 35 U.S.C. 154(b) by 1800 days.

(21) Appl. No.: 11/168,081

(22) Filed: Jun. 28, 2005

(65) Prior Publication Data

US 2005/0287505 A1    Dec. 29, 2005

Related U.S. Application Data

(63) Continuation-in-part of application No. 10/964,537, filed on Oct. 13, 2004, now abandoned, which is a continuation-in-part of application No. 10/878,827, filed on Jun. 28, 2004, now abandoned.

(51) Int. Cl.
    *G09B 19/00*    (2006.01)
(52) U.S. Cl. .......................... 434/236; 434/238
(58) Field of Classification Search .................. 434/219, 434/236–23, 322–365
    See application file for complete search history.

(56) References Cited

U.S. PATENT DOCUMENTS

| | | | |
|---|---|---|---|
| 5,217,379 A | 6/1993 | Kirschenbaum et al. |
| 6,231,344 B1 | 5/2001 | Merzenich et al. |
| 6,317,728 B1 | 11/2001 | Kane |
| 6,497,577 B2 | 12/2002 | Kanter |
| 6,524,805 B1 | 2/2003 | Stefano et al. |
| 6,533,584 B1 | 3/2003 | Jenkins et al. |
| 6,572,380 B1 | 6/2003 | Buckley et al. |
| 2002/0110792 A1 | 8/2002 | Mastria |
| 2002/0192625 A1 | 12/2002 | Mizokawa |
| 2003/0027116 A1* | 2/2003 | O'Donnell ................. 434/236 |
| 2003/0036042 A1 | 2/2003 | Hill |
| 2003/0036043 A1 | 2/2003 | Sullivan et al. |
| 2003/0108850 A1 | 6/2003 | Murgia et al. |

OTHER PUBLICATIONS

Texas A&M Student Counseling Service webpage titled Wondering who can Help?, retrieved from <http://scs.tamu.edu/selfhelp/elibrary/goals.asp>, and verified as being published on the web as early as Nov. 13, 2002, utilizing a web archive tool available at www.webarchive.org.*

* cited by examiner

*Primary Examiner* — Timothy A Musselman
(74) *Attorney, Agent, or Firm* — Schmeiser, Olsen & Watts, LLP

(57) ABSTRACT

A method and system of teaching success, comprising: instructing student(s) 1) to select at least one Creative Ambition(s) or compelling personal goal (CA'); 2) to identify at least one Thought (T) as in a STARS roadmap for achieving CA'; 3) to ascertain in which thought awareness stage their T for achieving CA' is; and 4) to adjust their pleasure index so that the at least one T that is in a thought awareness stage other than a Willed Action or Willed Inaction is displaced to the Willed Action or Willed Inaction thought awareness stage. CA' may be derived from a Supreme Collective Intelligence (SCI') or from a collective group of people (SCI). A method and a system, comprising: teaching that a higher Success Ratio may be achieved by de-compartmentalizing success and offsetting intensification of resistance from the Ego by tagging or attaching an intense pleasure or displeasure to achieving the CA'.

12 Claims, 39 Drawing Sheets

$$E_i = E_{CA} + E_{r,s}$$

$$E_i = E_{CA} + E_{r,s}$$

| (1) PERSONAL GOAL: | | | |
|---|---|---|---|
| (2) POTENTIAL ACTIVITIES | (3) OLD OR NEW | (4) SELECT | |
| (5) INCREASES TO REWARD | | (6) DECREASES TO REWARD | |
| (7) DWELLING TIME NEGATIVES: | | (8) DWELLING TIME POSITIVES: | |

710: teaching the students, such as the sales personnel, to complete a "must" list of things they want to accomplish before their life is over;

720: teaching the students, such as the sales personnel, to determine whether the stated goal is a compelling desire or personal goal;

If No → 750

If yes ↓

730: teaching the students, such as the sales personnel, to get into and maintain a state of passion about their compelling desire or personal goals; and

740: teaching the students, such as the sales personnel, to determine if there some specific action they can start to take.

800 teaching the students, such as the sales personnel, to reflect all the successes...big and small...you've already accomplished in your life ;  — 810 teaching the students, such as the sales personnel, to determine a starting point A;  — 820 teaching the students, such as the sales personnel, to determine where they'd *like* to be, or, to define their success goals; and  — 830 teaching the students, such as the sales personnel, to list their sustained activities;  — 840 teaching the students, such as the sales personnel, to learn from their past successes.  — 850

FIG. 12

SYSTEM OF TEACHING SUCCESS AND METHOD OF TEACHING SAME

This application is a continuation-in-part of U.S. patent application Ser. No. 10/964,537, filed on Oct. 13, 2004 now abandoned which is a continuation-in-part of Unites States patent application Ser. No. 10/878,827, filed on Jun. 28, 2004 now abandoned.

FIELD OF THE INVENTION

The present invention relates to the field of teaching; more specifically, it relates to system and method for teaching success.

BACKGROUND OF THE INVENTION

A portion of the disclosure of the present invention contains material that is subject to copyright protection. The copyright owner has no objection to the facsimile reproduction by anyone of the patent document or patent disclosure, as it appears in the Patent and Trademark Office patent files or records, but otherwise reserves all copyrights whatsoever.

Success may be defined as the achievement of something desired, planned, or attempted. However, in some cases, success may not be achieved. Government statistics show drastically growing rates of people taking antidepressant medications. Between 1997 and 2002 the number of Americans taking at least one antidepressant increased by over 50%, from 5.6 percent to 8.5 percent. The rate of antidepressant usage in the "near poor" almost doubled during the same period. Meanwhile in 2001, prescription spending for mental health disorders topped $14.3 billion, becoming the second leading expenditure related to a prescribed drug purchase behind high blood pressure which was number one. Spending on diabetes, asthma and high cholesterol ranked third, fourth and fifth respectively. Overall spending on the top five household-reported conditions (high blood pressure, mental health disorder, diabetes, asthma and high cholesterol) related to a prescribed drug purchase, quadrupled in the 14-year period between 1987 and 2001, to a total cost of $55.9 billion even when adjusted for inflation.

These trends indicate that Americans are struggling to maintain good physical and mental health and happiness. Being the wealthiest nation in the world does not mean that every one of us is wealthy. One thing that certainly underlies the statistics of how wealthy we are as a nation is the degree of stress and strain within our society.

When one earns a lot of wealth they have to work that much harder to maintain that wealth. Global competition is much greater. Many manufacturing jobs have been exported in the last few decades creating many changes within our society. America has gone from being a manufacturing nation to a one in which most of the jobs are in the computer, health, and service industries. The change in jobs has created a great migration of many to the Sunbelt states creating a disruption of communities and families.

Today's success also means that many people in the U.S. are working longer hours in jobs they dislike or hate, thereby promoting greater stress. These people are increasingly feeling trapped and helpless. For example, the combination of low food prices and increased stress has been shown to promote increased eating. The increasing trends for food consumption and obesity appear to correlate with increasing trends for high cholesterol and diabetes. Between 1987 and 2001, there has been a greater than four fold increase in adults with high cholesterol while the rates for adults with diabetes increased by 46 percent during that same period. Heart disease continues to rank the number one cause of death in our society.

Therefore, there is a need for a system and method for teaching success.

SUMMARY OF THE INVENTION

A first aspect of the present invention is a method for moving Thought (T) to Action (A) of the STARS roadmap, comprising: instructing a student to select at least one Creative Ambition(s) or compelling personal goal (CA'); instructing the student to identify at least one Thought (T) as in a STARS roadmap for achieving the Creative Ambition or the compelling personal goal (CA'); instructing the student to ascertain in which thought awareness stage their Thought (T) for achieving the Creative Ambition or the compelling personal goal (CA') is; and adjusting the student(s) Pleasure Index to enable them to progress from the Thought (T) step of the STARS roadmap to an Action (A) step of the STARS roadmap, wherein the Pleasure Index is a ratio of Pleasure (P) to Displeasure (DP), so that the student progresses to willed action or reflex right action stages when Pleasure (P) is greater than Displeasure (DP), the student progresses to a willed inaction stage when Pleasure (P) is less than Displeasure (DP).

A second aspect of the present invention provides a method of de-compartmentalization of success, comprising: instructing a student to construct a Total Personal Excellence (TPE) diagram, said diagram comprising at least one pair of TPE compartments, each at least one pair of TPE compartment having fields listing the student(s) achievements that are related to at least one pair of TPE compartments; instructing the student to ascertain if their TPE diagram is compartmentalized, wherein the TPE diagram is not compartmentalized if each compartment of at least one pair of the TPE compartments have at least one achievement; instructing the student(s) to list at least one Thought (T) for an additional achievement in the at least one pair of TPE compartments of their TPE diagram if the TPE diagram is compartmentalized and to ascertain if the TPE diagram having the additional achievement is compartmentalized; and repeating the instructing the student(s) to list at least one Thought (T) and/or Action (A) for an additional achievement step if the answer to the question whether the TPE diagram having the at least one Thought (T) and/or Action (A) listed is compartmentalized is "Yes" or ending the method of de-compartmentalizing the TPE diagram if the answer to the question whether the TPE diagram having the at least one Thought (T) and/or Action (A) listed is compartmentalized is "No".

A third aspect of the present invention provides a method of utilizing a STARS roadmap to achieve a higher Success Ratio and overcome resistance from the Ego, comprising: instructing a student to select at least one Creative Ambition(s) or compelling personal goal (CA'); instructing the student to identify at least one Thought (T) as in a STARS roadmap for achieving the Creative Ambition or the compelling personal goal (CA'); instructing the student to ascertain in which thought awareness stage their Thought (T) for achieving the Creative Ambition or the compelling personal goal (CA') is; and instructing the student to achieve the higher Success Ratio by increasing an equilibrium setpoint of their Ego because their total CA·rs creative energy has been redistributed and rebalanced so that their Passion-Mind (PM) results exceed their Body-Mind (BM) results.

A fourth aspect of the present invention provides a method of utilizing a STARS roadmap to overcome the Ego dominated Body-Mind Complex, comprising: instructing a student to select at least one creative ambition or compelling personal goal (CA'); instructing the student to identify at least one Thought (T) as in a STARS roadmap for achieving the Creative Ambition or the compelling personal goal (CA'); instructing the student to ascertain in which thought awareness stage their Thought (T) for achieving the Creative Ambition or the compelling personal goal (CA') is; and instructing the student to adjust a Pleasure-Displeasure ratio (P/DP) for the Thought (T) for achieving Creative Ambition (CA') by tagging or attaching an intense pleasure (P) or displeasure (DP) that they can associate to the potential outcome if they don't achieve the Creative Ambition (CA').

A fifth aspect of the present invention provides a method for teaching success, comprising: teaching a student to create a success plan that includes a list of "to do" activities and "not to do" activities for prioritizing their efforts and resources, comprising: subdividing the student's behavior into inclusive and exclusive behavior subsets and single (static) versus recurrent (dynamic) behaviors for each of the subsets; instructing the student to perform their inclusive behavior on a recurrent basis in order to complete their goal and to move into a stage 2a domain of thought awareness, willed action; and instructing the student to identify all those activities that do not support their goal and to exclude those activities from their behavior by moving them into a stage 1b domain of thought awareness, willed inaction.

A sixth aspect of the present invention provides a method of utilizing a STARS roadmap to achieve a higher Success Ratio by de-compartmentalizing success, comprising: instructing a student to construct a Total Personal Excellence (TPE) diagram, said diagram comprising TPE compartments; instructing the student to list at least one achievement in at least one TPE field of a TPE compartment associated with the achievement; instructing the student to determine if the TPE diagram is balanced, wherein a balanced TPE diagram has at least one achievement listed in each of the TPE compartments, and to list at least one Thought (T) and/or Action (A) for a de-compartmentalized achievement for the at least one TPE compartment of their TPE diagram, if the TPE diagram is not balanced; and; instructing the student to list the Thought (T) and/or Action (A) for at least one de-compartmentalized achievement in a blank TPE field of a TPE compartment associated with the achievement.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

FIG. 3 is a pictorial representation illustrating a worksheet for inputting information, according to the present invention;

FIGS. 10-11 depict a method for teaching success, according to the present invention;

FIGS. 12-13 depict a method for teaching students, according to the present invention;

DETAILED DESCRIPTION OF THE INVENTION

Figure 1A:
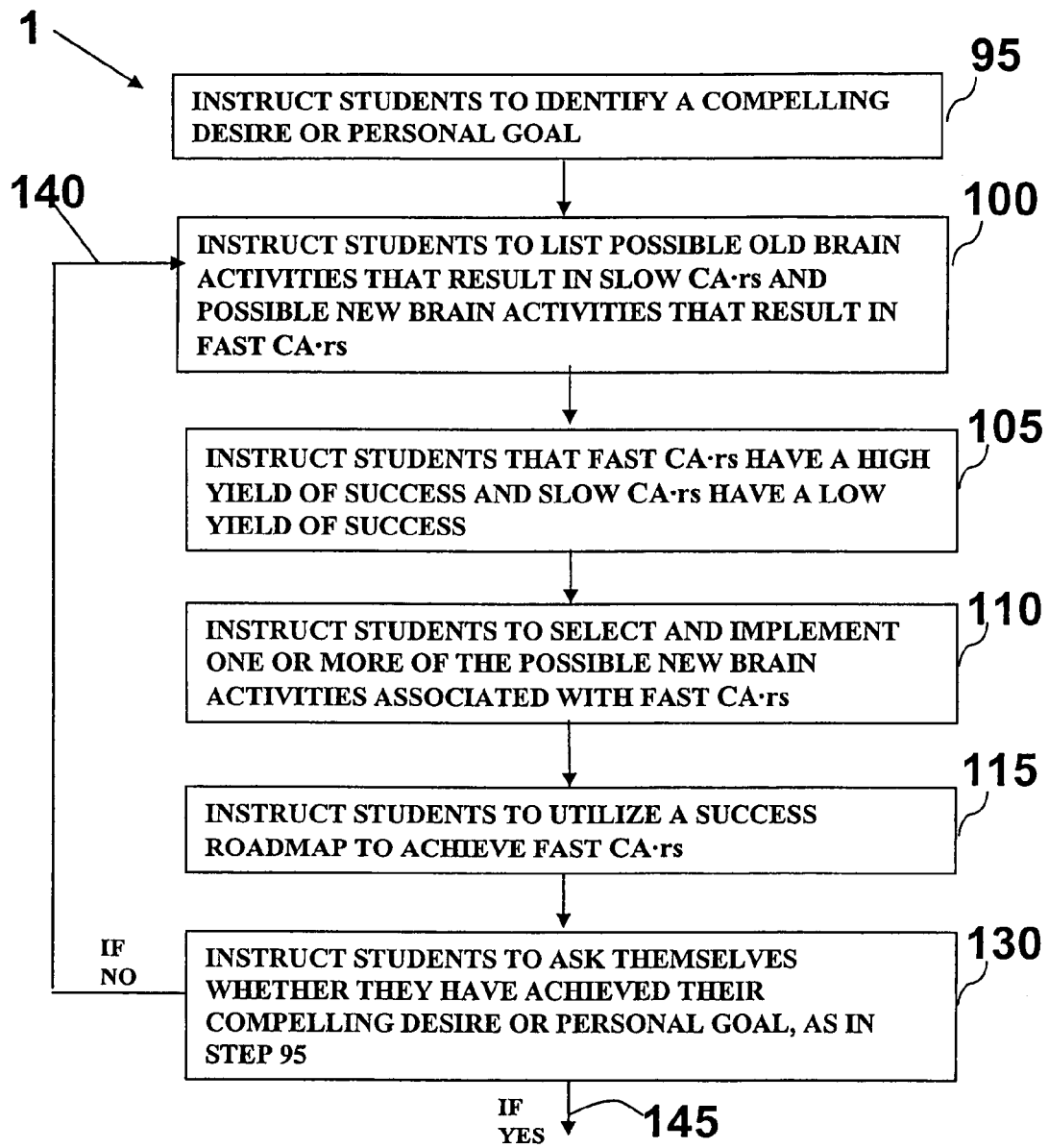
FIG. 1A is an overall flowchart of a method for teaching success according to the present invention.

FIG. 1A is an overall flowchart of a method 1 for teaching success, according to the present invention. In step 95, success, self-empowerment and self-governance are defined for the students and the students are instructed to select a personal goal that may be far beyond their comfort limit. Success may be defined as the degree of efficiency in materializing thought through self-governance. "Self-governance" may be defined as the degree of efficiency in controlling ones's activity drives, emotional drives and quality of life drives or instincts, as depicted in FIG. 1G, infra, and described herein, such that one, such as students of the systems and methods of teaching success of the present invention may be in a happy state of mind, wherein "happy" may be defined as enjoying, showing, or marked by pleasure, satisfaction, or joy.

Alternatively, success may be defined as the achievement of something desired, planned, or attempted, such as, for example, happiness or legacy. "Legacy" is one's heritage that may be handed down from an ancestor or a predecessor or from the past. Alternatively, success means applied creativity. Success is an action that accomplishes its intended purpose. Success is achieved by selling yourself on doing all the things you hate to do because you appreciate the importance of overriding your natural internal auto-resistance to change and your default tendency to avoid unpleasant obstacles.

The opposite of success is failure. Failure is performing and achieving far below your true possible or potential and abilities. Failure is your inability each day to resume and maintain the integrity of your focus, attention, interest, and pleasure in pursuing your desired goals.

Success may also be that which comes after; hence, consequence, issue, or result, of an endeavor or undertaking, whether good or bad; the outcome of effort. Success may be the favorable or prosperous termination of anything attempted; the attainment of a proposed object, prosperous issue. Empower may have the legalistic meaning "to invest with authority, authorize." It may be used with an infinitive in a more general way meaning "to enable or permit." Self-empowerment may be defined as a system of managing your life such that you increase your probability of taking consistent creative actions or sustained right actions, which in turn, increases your probability of achieving great success. Self-empowerment puts you on the fast track to unlimited success:

Puts you in control of your life and your interactions or sustained right actions with those around you Teaches you how to regain your creativity and creative edge Teaches you how to promote and sustain your creative drive Examples of personal goals include, but are not limited to: balancing ones time between family, work and personal; achieving harmony between ones personal values and beliefs and those of society; achieving happiness; achieving contentment; achieving specialness; achieving peace of mind; increasing interaction with others; increasing level of giving of ones talent; solving large scale problems; increasing altruism; increasing ones level of service to humanity; increasing ones level of community service; matching ones level of accomplishment in life to ones true possible or potential, by application of ones own creativity, genius and magnificence; achieving personal and emotional growth; upholding happiness as a central focus in life; promotion and advancement of individual success; nurturing a team spirit; creating an atmosphere of increased positive creative energy to buffer against the prevailing culture of negativity, fear and misery. Hereinafter, "creative energy" is having the ability or power to create, e.g., having the ability or power to be productive, ability or power characterized by originality and expressiveness, imaginativeness, e.g., having the ability or power to write creatively. "Creative energy" may also be the ability or power of one who displays productive originality, e.g., the creatives in the advertising department.

Figure 1B:
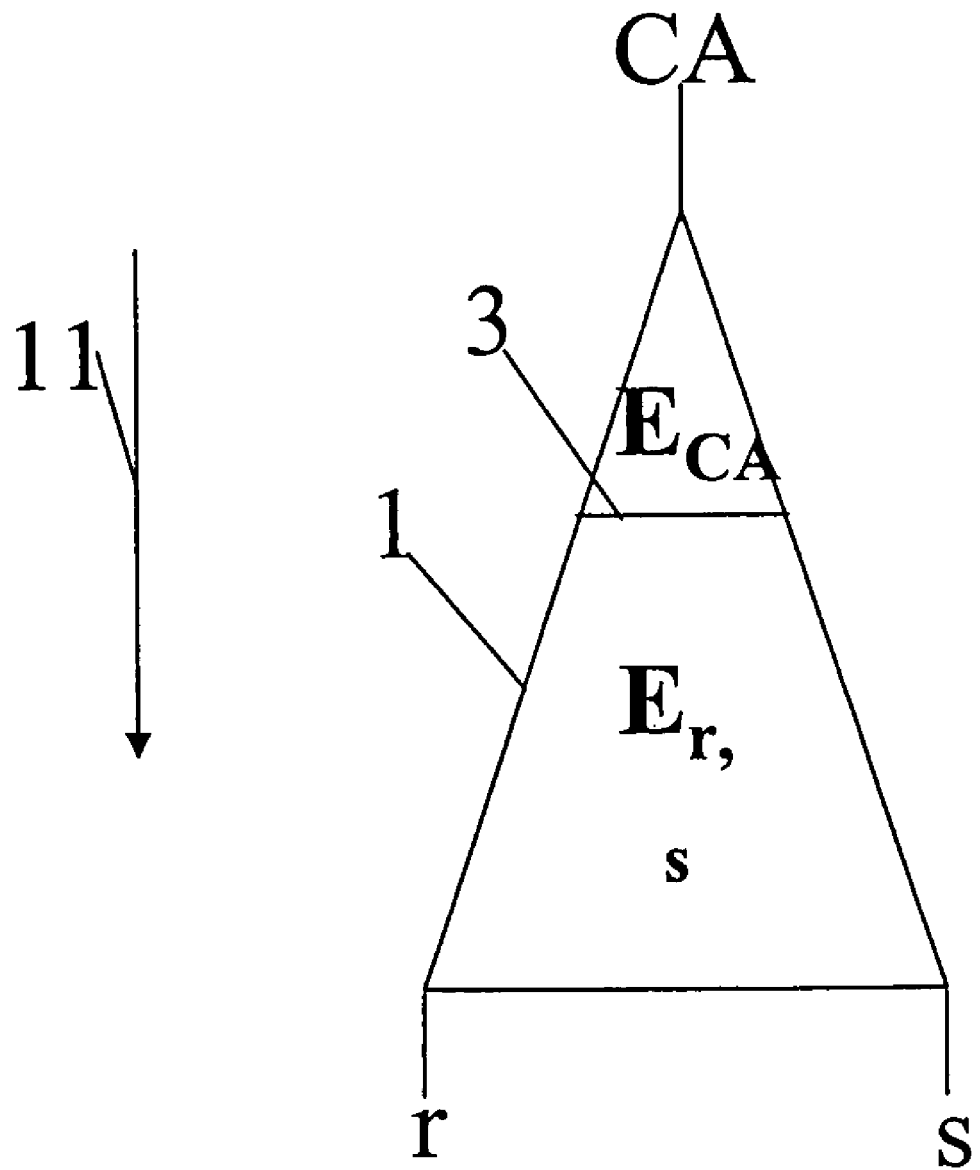
FIG. 1B depicts at least one Success CA·rs creative energy distribution, according to embodiments of the present invention.

FIG. 1B depicts at least one Success CA·rs 1, comprising any plane or solid geometric figure such as a circle, square, rectangle, or a sphere, cube, parallelepiped and the like. The at least one Success CA·rs 1 comprises: a student's new brain Creative Ambitions and/or Creative Actions or sustained right actions, hereinafter abbreviated as upper case CA, old brain survival or self-protection drives or instincts, hereinafter abbreviated as lower case s, and old brain recreation drives or instincts, or overindulgence in recreation, such as for instant gratification, hereinafter abbreviated as lower case r. The term Creative Ambitions and/or Creative Actions or sustained right actions, CA, may be an eager or strong desire to achieve something characterized by originality and expressiveness. Alternatively, Creative Ambitions and/or Creative Actions or sustained right actions, CA, may be imaginative or a desire for exertion or activity characterized by originality and expressiveness. The term recreation, r, may be a drive or instinct for refreshment of one's mind or body after work through activity that amuses or stimulates; play. The term recreation, r, may be a drive or instinct for instant gratification. The term recreation may also be indulgence in play or in simple pleasures. The term "recreation" does not mean "creation again," as in "re-create," in the context of embodiments of the present invention. The term "recreation" means a diversion. Recreation may also mean refreshment of one's strength and spirits after toil; amusement; diversion; sport; pastime. The term survival, s, may be a drive or instinct for protection of oneself from harm or destruction, and the drive or instinct for individual preservation; the innate desire to stay alive. Alternatively, the term survival, s, may be a drive or instinct for preservation of oneself from harm; a natural or instinctive tendency towards self-preservation or survival.

Old brain recreation, r, drives or instincts for instant gratification may arise from witnessing startlingly sudden tragedy such as loss of life or property on a massive scale that results in people being less willing to rely on planning, anticipating, and developing long-term goals. Alternatively, old brain recreation drives or instincts for instant gratification may arise in people who no longer believe in the virtue of patience and simply want instant gratification. Hereinafter, "instant gratification" means behavior of a student in which the student prefers receiving a small reward at this instant, rather than receiving a larger reward in the future. Such people may be characterized as impulsive and as lacking in the ability to defer or delay gratification, i.e., as having medical conditions such as attention deficit/hyperactivity disorder (ADHD), bipolar disorder, frontal lobe disorder, and drug addiction. Lesions in an area of the forebrain involved in reward, the nucleus accumbens core (AcbC), may cause the student to simply want instant gratification, e.g., always chosing a more immediate, smaller reward over a bigger, later one. The finding suggests that damage to this brain area could contribute to behavioral disorders characterized by the urge for instant gratification or being impulsive. Drugs such as amphetamine and cocaine may act on the AcbC, altering levels of the neurotransmitter dopamine. The student may be taught the drug Ritalin, the controversial drug widely used to control hyperactive and inattentive children, may also act on the AcbC, altering levels of the neurotransmitter dopamine and/ or adrenalin. Hereinafter, behavior characterized by the desire for instant gratification, hyperactivity, and/or inattentiveness may result from an unhealthy low level of dopamine, that may be due to an unhealthy AcbC. Alternatively, old brain survival or self-protection instincts may arise from other reward-related areas of the brain, such as the amygdala, which is involved in fear.

It has been found that dopamine produces a feeling of well-being, happiness, altruism and general self-satisfaction, and that increasing its level may result in off-setting or countering the bad effects of an unhealthy level of adrenalin, such as hyper-activity and inattentiveness. In embodiments of the present invention, students may be taught to use dopamine increasing techniques such as 1) activity kindling or self-controlled hyper-arousal, 2) self-deprivation, 3) self-controlled increase of their success-startle threshold or activity kindling threshold, and 4) creation of a crisis of need or relevance, or combinations, thereof, to overcome the bad effects of an unhealthy level of adrenalin.

It has been found that endorphins also produce sensations of pleasure by uninhibiting dopamine pathways, causing more dopamine to be released into the synapses. Endorphins are peptides that may be produced by the pituitary gland and the hypothalamus in vertebrates. Endorphins may be released by laughter, or rigorous exercise that takes persons over their success-startle threshold or activity kindling threshold. The "runner's high" is one example where strenuous exercise or the high that comes from completing a challenge rather than just through the exertion takes persons over their success-startle threshold or activity kindling threshold. Endorphins may be generated in response to certain spices, such as chili peppers. In some embodiments of the present invention, the students may be taught to increase endorphin release using the aforementioned techniques to experience a "winners high."

Students may be taught that the old brain physically resides in primitive brain structures, such as the brain stem. The old brain may be responsible for primitive drives in humans such as survival and self-preservation and/or defensiveness instinct, and recreation, such as instant gratification type pleasures. An example of the students' self-preservation, survival and/or defensiveness drives or instinct may be a primal instinct such as "fight or flight" that arises when students may be frightened because they perceive they are in danger of physical harm, or in danger of not being able to obtain necessities of life such as food, shelter, warmth and sleep. Actions or sustained right actions directed by the old brain tend toward avoidance behavior, minimizing exposure and promoting inactivity and thus have a negative effect on success as defined supra.

Although students may be instructed to de-emphasize old brain drives or instincts for recreation, r, and survival, s, and to emphasize new brain Creative Ambitions and/or Creative Actions or sustained right actions and Success-Creative Activities in order to re-distribute their creative energy, $E_i$, to reallocate it to power and achieve their compelling desires and personal goal, students may be instructed in embodiments of this invention to allocate a finite amount of their creative energy, $E_i$, for recreation, r, and survival, s, old brain activities that include spirit energizing or refreshing recreation, r, such as pleasuring in the sounds of the forest or socializing with friends or family, or exercising for maintaining one's health. Students may be taught to allocate a finite amount of their creative energy, $E_i$, to survival, s, that include self-defense, sex and reproduction or working long hours to finish a task on time.

Students may be taught that the new brain physically resides in higher brain structures such as cortical structures. Actions or sustained right actions directed by the new brain tend toward complex dynamic activity and involve adventure, logic, reason, risk taking and delaying gratification and thus have a positive effect on success as defined supra.

In embodiments of the present invention, old brain activities do not include behavioral tasks such as motivation, people skills, innovation, memory, and seeing situations in total (seeing the "big picture"). On the contrary, new brain activities of the present invention include behavioral tasks such as motivation, people skills, innovation, memory, and seeing situations in total (seeing the "big picture").

The student may be instructed that the differences between the old and new brain set up a polarized internal conflict in the students between recreation and survival drives, on the one hand, and Creative Ambitions and/or Creative Actions or sustained right actions, on the other hand, as depicted in the at least one Success CA·rs 1 and 2 in FIG. 1B, infra. In some embodiments, the students may be taught that SLOW CA·rs activity, characterized by low probability of success, may arise from old brain structures.

In FIG. 1B, the at least one Success CA·rs 1 may be represented by an acronym "CA·rs", wherein the first two letters of the CA·rs acronym represent the first letter of Creative Ambitions and/or Creative Actions or sustained right actions, and the third letter of the CA·rs acronym represents recreation drives or instincts and the fourth letter of the CA·rs acronym represents survival or self-protection. In FIG. 1B, the at least one Success CA·rs 1 may be represented by a triangle, wherein the student's creative energy for powering his or her Creative Ambitions and/or Creative Actions or sustained right actions and/or Success-Creative Activity may be an area $E_{CA}$ in the at least one Success CA·rs 1, wherein the students' creative energy for powering recreation and survival may be an area $E_{r,s}$, and wherein the students' initial creative energy, $E_i$, is equal to $E_{CA}+E_{r,s}$. The at least one Success CA·rs 1 may be primary vehicles of the students' creative energy. Therefore, the at least one Success CA·rs 1 may be primary vehicles for the students creative thoughts or sustained right thinking and creative actions or sustained right actions, since creative thoughts or sustained right thinking and creative actions or sustained right actions may be powered by their creative energies. In a step 110 of the method 1, the students may be taught to redistribute and re-balance their creative energy distribution to increase the area $E_{CA}$ by repositioning the divider 3 in a direction of an arrow 11, thereby teaching the students to allocate more of their Creative Ambitions and/or Creative Actions or sustained right actions energy, $E_{CA}$, for their thoughts or sustained right thinking, actions or sustained right actions and results to power and achieve their Creative Ambitions and/or Creative Actions or sustained right actions and/or Success-Creative Activities. Hereinafter, students may be instructed to achieve their compelling desire, their personal goal and success by instructing them to utilize a Success Roadmap 50, as depicted in FIG. 1E, infra. Hereinafter, "STARS" is an acronym, wherein the first "S" represents said students' "Ideal Self," and/or "Spirited Living or Sustained Spirit Energy," "T" represents said students' "thoughts or sustained right thinking," "A" represents said students' "actions or sustained right actions," or "activities" and the last "S," in the acronym represents "surveillance," "self-monitoring," and/or "self-governance." Hereinafter, instructing students to utilize "STARS" means instructing them to power their thoughts or sustained right thinking, "T", "actions or sustained right actions," "A", and "results," "R," inter alia, from the students' creative energy of their "Ideal Self" and/or "Spirited Living or Sustained Spirit Energy." Hereinafter, the method, wherein the students' thoughts or sustained right thinking, "T", "actions or sustained right actions," "A", and "results," "R," are powered by their creative energy of their "Ideal Self" and/or "Spirited Living or Sustained Spirit Energy" and subsequently subjected to "surveillance" and/or "self-monitoring" and/or "self-governance," "S" may include the steps 51-56 of the Success Roadmap 50, as depicted in FIG. 1E, infra, and described in associated text and may be named "FAST CA·rs MAKE HOLLYWOOD STARS." FAST CA-rs are the students' creative energy. Hollywood STARS include all their extraordinary successes. The term "Fast CA·rs Make Hollywood STARS" is a slogan that may mean the students' extraordinary successes, i.e., Hollywood STARS, may depend upon their ability to access their creative energy Fast CA·rs. Students may become a STAR by never allowing their minds to dwell upon either, too much partying (recreation), or excessive concerns about your survival. Students may become STARS by centering their minds and actions upon pursuits of a creative nature.

In some embodiments success may require the interaction of the students' Spirit and mind (Thoughts) to set off a sequence of Creative Actions, CA, that bind together the students' desired Results under their watchful Surveillance and/or Self-monitoring and/or Self/governance.

Figure 1C:
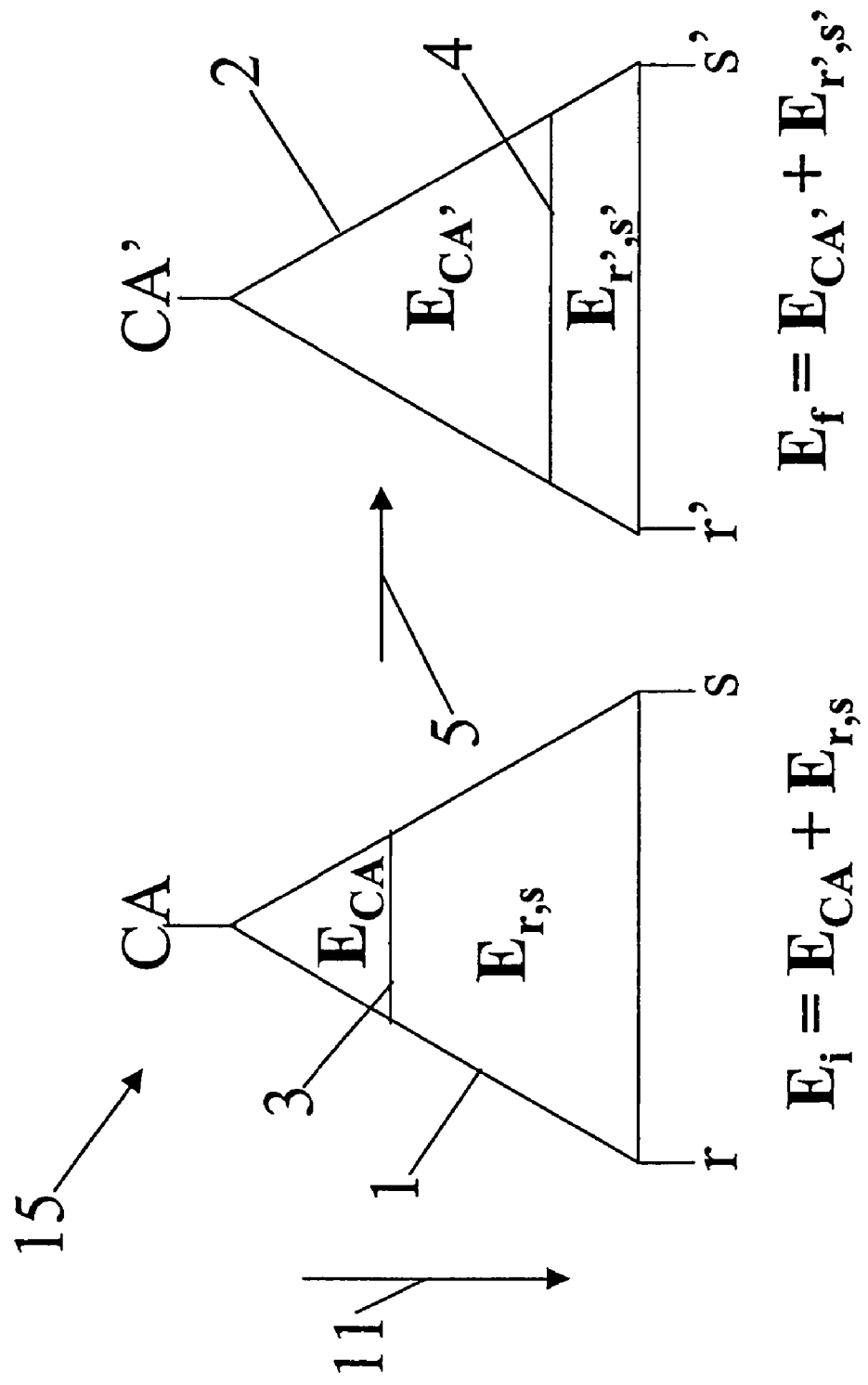
FIG. 1C depicts FIG. 1A after students redistribute and re-balance their creative energy to allocate more creative energy to power or achieve their Creative Ambitions or Creative Actions or sustained right actions and their Success-Creative Activities, according to embodiments of the present invention.
Figure 1D:
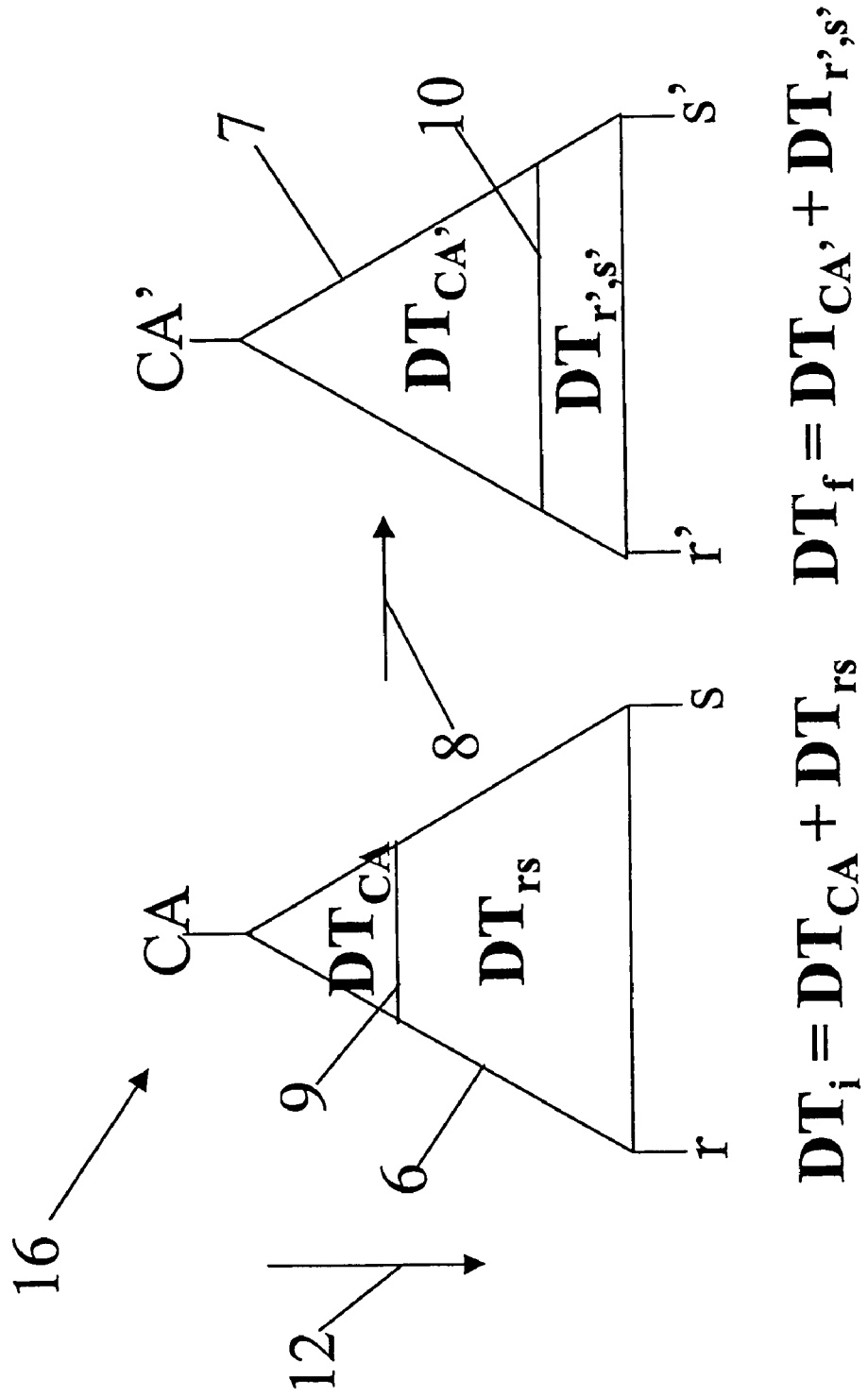
FIG. 1D depicts a Success CA·rs dwelling time redistribution, according to embodiments of the present invention.
Figure 1E:
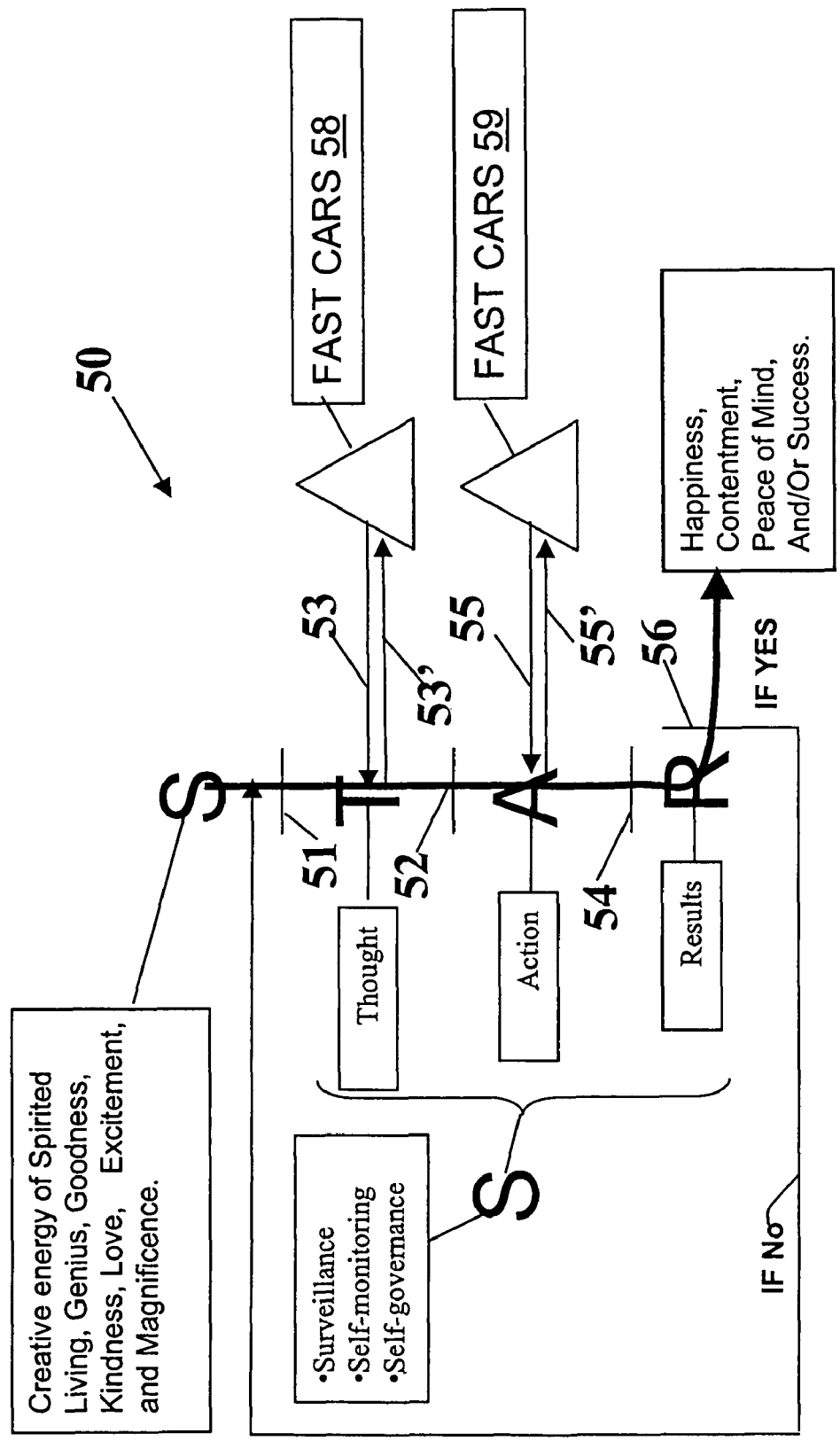
FIG. 1E depicts a Success Roadmap, according to embodiments of the present invention.

In some embodiments, "STARS" includes powering the students' thoughts or sustained right thinking, "T" and "actions or sustained right actions," "A" by providing the students' creative energy from FAST CA·rs resulting from the Success CA·rs redistributions 15, 16, and 35, as depicted in FIGS. 1C, 1D, and IF, as depicted, infra, and described in step 115 of the method 1, as depicted in FIG. 1A, supra.

FIG. 1C depicts FIG. 1B, illustrating a Success CA·rs 15 redistribution in a direction of the arrow 5, wherein a portion of the student's initial creative energy, $E_i$, in the at least one initial Success CA·rs 1, may be equivalent to $E_{CA}$, and a portion of the student's final creative energy, $E_f$, may be equivalent to $E_{CA'}$ in an at least one final Success CA·rs 2, after students have redistributed and re-balanced their creative energy so as to allocate more Creative Ambitions energy and/or Creative Actions or sustained right actions energy for powering their Creative Ambitions and/or Creative Actions or sustained right actions and/or Success-Creative Activity, according to embodiments of the present invention. The Success CA·rs 15 redistribution may be a method of attaining personal goals by performing new brain activities, in accordance with the method 1, as depicted in FIG. 1A, infra, and described in associated text.

In the Success CA·rs redistribution 15 depicted in FIG. 1C, a remaining portion of the student's initial creative energy, $E_i$, may be equivalent to $E_{r,s}$, in the at least one initial Success CA·rs 1, and a remaining portion of the student's final creative energy, $E_f$, may be equivalent to $E_{r',s'}$ in an at least one final Success CA·rs 2 after the students have redistributed and re-balanced their creative energy so as to allocate more Creative Ambitions and/or Creative Actions or sustained right actions energy, $E_{CA'}$, for powering their Creative Ambitions and/or Creative Actions or sustained right actions and/or Success-Creative Activity. $E_{r,s}$ may be equivalent to a sum of creative energy for powering r and s in the at least one initial Success CA·rs 1, and $E_{r',s'}$ may be equivalent to a sum of creative energy for r' and s', in the at least one final Success CA·rs 2. Hereinafter, $E_{CA}$ represents initial Creative Ambitions and/or Creative Actions or sustained right actions energy in the at least one initial Success CA·rs 1, and $E_{CA'}$ represents final Creative Ambitions and/or Creative Actions or sustained right actions energy in the at least one final Success CA·rs 2. Both the initial and final Success CA·rs 1 and 2 may be represented by any plane or solid geometric figure such as a circle, square, rectangle, or a sphere, cube, parallelepiped and the like. The at least one initial and final Success CA·rs 1 and 2 may be represented by different plane or solid geometric figures. In FIG. 1C, the initial and final CA·rs 1 and 2 states may be represented by triangles, wherein the students' creative energy for achieving their Creative Ambitions and/or Creative Actions or sustained right actions and/or Success-Creative Activity may be an area $E_i$ in the at least one Success CA·rs 1 and an area $E_f$ in the at least one Success CA·rs 2, and wherein $E_i = E_{CA} + E_{r,s}$ and $E_f = E_{CA'} + E_{r',s'}$. The Success CA·rs redistribution 15 in the direction of the arrow 5, depicted in FIG. 1C, shows CA' having $E_{CA} > E_{CA'}$. Therefore, FIG. 1C depicts transformation of a SLOW Success CA·rs 1 into a FAST Success CA·rs 2 because the area of CA is greater than the area of CA'. Hereinafter, the students may be instructed that FAST CA·rs 2 have a high yield of success and SLOW CA·rs 1 have a low yield of success, as in the step 105 of a method 1, herein.

There is a possibility that success may fail to arouse a feeling of happiness in what has been accomplished. It has been found that when success is in harmony with the students' Creative Ambitions and/or Creative Actions or sustained right actions, for example, when their personal values and beliefs and those of society are in harmony, the probability that the success will arouse a feeling of unhappiness is low. Hereinafter, success may be in harmony with the students' Creative Ambitions and/or Creative Actions or sustained right actions when the creative activities that are the manifestation of the success resonate, i.e. are consistent with and constructively in-phase with the students' Creative Ambitions and/or Creative Actions or sustained right actions.

To be an effective redistribution of the students' creative energy, the final creative energy $E_{CA'}$ should be greater than the initial creative energy $E_{CA}$, but the relationship of $E_i$ and $E_f$ may be one of $E_i = E_f$, $E_i < E_f$ or $E_i > E_f$. Therefore, an effective CA·rs redistribution may require the area $E_{CA'} > E_{CA}$, regardless what plane or solid geometric figure may be used to represent the initial and final CA·rs 1 and 2 states. In the Success CA·rs redistribution 15, students have been instructed to redistribute and re-balance their Creative Ambitions and/or Creative Actions or sustained right actions energy, $E_{CA}$, so that more of their final Creative Ambitions and/or Creative Actions or sustained right actions energy, $E_{CA'}$, may be available to power his or her Creative Ambitions and/or Creative Actions or sustained right actions and creative activities. In so doing, the area of $E_{CA'}$ may be made larger than the area of $E_{CA}$ by moving a position of divider 3 in the triangle 1 in a direction of an arrow 11 to a position of a divider 4 of the triangle 2. Therefore, the position of divider 4 in the final Success CA·rs 2 state relative to the divider 3 in the initial CA·rs state should be such that the area of $E_{CA'} > E_{CA}$, since the student has allocated more creative energy to power his or her Creative Ambitions and/or Creative Actions or sustained right actions and/or Success-Creative Activity in the CA·rs redistribution 15.

FIG. 1D depicts a Success CA·rs 16 redistribution in a direction of the arrow 8, wherein a portion of the student's Dwelling Time, $DT_i$, in the at least one initial Success CA·rs 1, may be equivalent to a Dwelling Time $DT_{CA}$, and a portion of the student's final Dwelling Time, $DT_f$, may be equivalent to $DT_{CA'}$ in the at least one final Success CA·rs 2 after the students have redistributed and re-balanced their Dwelling Time so as to allocate more of the students' Dwelling Time for achieving their Creative Ambitions and/or Creative Actions or sustained right actions and/or Success-Creative Activity, according to embodiments of the present invention.

In addition, FIG. 1D depicts a Success CA·rs 16 redistribution in the direction of the arrow 8, wherein a remaining portion of the students' Dwelling Time, $DT_i$, may be equivalent to $DT_{rs}$ in the at least one initial Success CA·rs 6, and a remaining portion of the students' final Dwelling Time, $DT_f$, may be equivalent to $DT_{r's'}$ in the at least one final Success CA·rs 7 after the students have redistributed and re-balanced their Dwelling Time so as to allocate more Dwelling Time for achieving their Creative Ambitions and/or Creative Actions or sustained right actions and/or Success-Creative Activity. $DT_{rs}$ may be equivalent to a sum of Dwelling Time for achieving r and s, and $DT_{r's'}$ may be equivalent to a sum of Dwelling Time for achieving r' and s', in a final Success CA·rs 7. Hereinafter, CA represents Creative Ambitions and/or Creative Actions or sustained right actions, an r represents recreation, and s represents survival and self-protection in the initial CA·rs 6 state and CA' means Creative Ambitions and/or Creative Actions or sustained right actions, r' means recreation, and s' means survival and self-protection in the final CA·rs 7 state. As in FIG. 1C, supra, both the initial and final CA·rs 6 and 7 states may be represented by any plane or solid geometric figure such as a circle, square, rectangle, or a sphere, cube, parallelepiped and the like. The initial and final CA·rs 6 and 7 states may be represented by different plane or solid geometric figures. In FIG. 1D, the initial and final CA·rs 6 and 7 states may be represented by triangles, wherein the student's Dwelling Time for achieving his or her Creative Ambitions and/or Creative Actions or sustained right actions and/or Success-Creative Activity may be an area $DT_{CA}$ in the triangle 6 and an area $DT_{CA'}$ in the triangle 7, and wherein $DT_i = DT_{CA} + DT_{rs}$ and $DT_f = DT_{CA'} + DT_{r's'}$. The Success CA·rs redistribution 16 in the direction of the arrow 8, depicted in FIG. 1D, showing CA' having greater Dwelling Time than CA may result from the student's redistribution and re-balancing of his or her Dwelling Time so as to allocate more Dwelling Time to achieve his or her Creative Ambitions and/or Creative Actions or sustained right actions and/or Success-Creative Activity. To be an effective redistribution of the student's Dwelling Time, the final Dwelling Time $DT_{CA'}$ should be greater than the initial Dwelling Time $DT_{CA}$, and the relationship of $DT_i$ and $DT_f$ may be one of $DT_i = DT_f$. Therefore, an effective Success CA·rs 16 redistribution may require the area $DT_{CA'} > DT_{CA}$, regardless what plane or solid geometric figure may be used to represent the initial and final CA·rs states. In so doing, the area of $DT_{CA'}$ may be made larger than the area of $DT_{CA}$ by moving a position of divider 9 in the Success CA·rs 6 in a direction of an arrow 12 to a position of a divider 10 of the Success CA·rs 7. Therefore, the position of divider 10 in the final Success CA·rs 7 state relative to the divider 9 in the initial CA·rs 6 state should be such that the area of $DT_{CA'} > DT_{CA}$, since the student has allocated more Dwelling Time to power his or her Creative Ambitions and/or Creative Actions or sustained right actions and/or Success-Creative Activity in the CA·rs redistribution 16.

FIG. 1A depicts an overall flowchart of a method 1 for teaching success according to the present invention. In step 95, students may be instructed to identify a compelling desire or personal goal. In step 100, students may be instructed to list possible or potential causes for failing to achieve a personal goal, that is, their creative resistance, and possible or potential substitute new brain activities for achieving the personal goal. Creative resistances may be barriers to success. The student may be taught that as a toddler and youngster, they were carefree and filled with curiosity and creative energy, but with the passage of time, they acquired from their parents greater responsibility for ensuring their own personal safety. Further, while, their primary caregivers continually warned them of the dangers of the world, they may have experienced some negative events such as disappointment, tragedy, loss or trauma. Consequently, they may have begun to withdraw and may have become increasingly fearful and defensive, that may have resulted in limiting their curiosity and creative energy. As they became increasingly preoccupied with concerns of survival and self-preservation and recreation for instant gratification, they may have begun to suppress their creativity and their carefree creative nature. As they retreated and played it safe, an imbalance was created in their lives, with a greater share of their creative energy being channeled towards survival, self-preservation, and recreation, and less time towards creative pursuits.

The student may be taught that the biological roots for self-preservation or survival and recreation in the at least one Success CA·rs 1 may arise from primitive evolutionary drives or instincts and may be old brain activity that result in SLOW CA·rs that may be characterized by a low probability of success. In contrast to FAST CA·rs, SLOW CA·rs may be characterized by a low probability of success because they may establish a resistance in the students towards engaging in FAST CA·rs activities, such as creative activities that may utilize the new brain. Alternatively, students may be taught that old brain activity may inhibit willingness to express the students' Creative Ambitions and/or Creative Actions or sustained right actions, thereby inhibiting the students' comfort with exposure or standing out in a crowd or leadership and inhibiting the students' success-creative activities. Hereinafter, "low probability of success" means failure to achieve the students' compelling desire or personal goal. Failure includes performing and achieving far below the students' true possible or potential abilities. Students may be taught that failure includes the students' inability each day to resume and maintain the integrity of their focus, attention, interest, and pleasure in pursuing their desired goals. Hereinafter, old brain activities include self-preservation or survival fear, worry, fight or flight reflexes, impulsive responses, recreation, i.e., over-indulgence in play, or in simple pleasures or in matters of instant gratification. It may be explained to the student that the old brain preserved a "biological hardwiring for survival" when the new brain evolved.

Examples of possible or potential questions the students may be taught to ask themselves to characterize whether they may be allocating sufficient creative energy as FAST CA·rs instead of SLOW CA·rs include, but are not limited to: 1) Do I often fail to follow through with important tasks? 2) Do I often lose interest quickly? 3) Do I often fail to set goals and maintain goals? 4) Do I often fail to complete projects? 5) Why do I fail to maintain a diet? 6) Why do I postpone changing my career? 7) Why do I lose enthusiasm for new projects? 8) Do I often feel empty and dissatisfied? 9) How can I be more consistent in following through? 10) How can I raise my level of energy and enthusiasm? 11) How can I avoid future regret because of my inappropriate behavior or regrettable actions or sustained right actions?

Referring to the step 100 of the method 1, the student may be instructed to list possible or potential old brain activities from which the causes for SLOW CA·rs listed in the step 100 may arise, and to list possible or potential new brain activities to overcome these causes. The list of reasons may include, but may not be limited to one of the following: the student may list "old brain" activities such as survival, self-preservation, and/or defensiveness and/or reproduction or sex and/or recreation drives or instincts as reasons for failing to achieve the aforementioned personal goals. Alternatively, the student may list "old brain" activities that include, but are not limited to: 1) thinking too small; 2) thinking too little of ourselves and our capabilities; 3) preferring to settle for less; 4) failing to initiate and sustain enough interest; and 5) playing it safe.

Referring to the step 100 of the method 1, the student may list "new brain" activities to achieve the aforementioned personal goals that the students listed in the step 95 of the method 1. Hereinafter, "new brain" activities are activities that arise from the student's creativity such as imagining, dreaming, and boundary-less problem solving which come from the students' free spirit or sense of omnipotence. Herinafter, the "sense of omnipotence" means the ability to achieve boundlessly. Students may be taught they may be born with a boundary-less or free spirit. Alternatively, the student may be taught that the greatness (omnipotence) the students may see in others may also be greatness that is within the students. However, that free spirit may become restricted or inhibited by life's experiences that introduce and reinforce doubt in the students' minds about what is a reachable, a realistic or a reasonable goal or activity. The student may be taught this may result in a loss of creativity. The aforementioned new brain activities may be driven by "activity drives" such as work, charity, applying interactive synergy and/or Creative Ambition and/or Creative Activity and/or Creative Action, as in success FAST CA·rs, to achieve the aforementioned personal goals. Hereinafter, "interactive synergy" means the interaction of two or more agents or forces so that their combined effect is greater than the sum of their individual effects. Alternatively, "new brain" activities may be activities driven by "experiential drives" such as a need for love, companionship, appreciation, understanding, having a sense of meaningfulness, and having a sense of purpose. Alternatively, "new brain" activities may be activities driven by "quality of life drives" such as need for belonging, affiliation, acceptance, happiness, contentment, special ness and peace of mind. Alternatively, the new brain easily handles problems such as logic, objectivity, precision, analysis, and technology. Steps 95 and 100 of the method 1 are preparatory steps. Being successful individuals may require increased use of the aforementioned new brain activities and a decreased use of the aforementioned old brain activities in their day to day lives.

In step 105 of the method 1, the students may be instructed that the FAST CA·rs may have a high yield of success and SLOW CA·rs may have a low yield of success. The students may be instructed that the acronyms FAST CA·rs and SLOW CA·rs describe opposite states of the Success CA·rs redistributions 15 and 16 of FIGS. 1C and 1D, as depicted supra, and described herein. In the step 100, $E_{CA}$ of Success CA·rs 1 may be less than $E_{CA'}$ of Success CA·rs 2 because the line 3 has moved in the direction of the arrow 11 to a position of the line 4, resulting in the area $E_{CA}$ being less than the area $E_{CA'}$. Creative Ambition and/or Creative Action, may be opposite recreation and survival. The opposites Creative Ambitions and/or and Creative Actions or sustained right actions are represented to the student as FAST CA·rs activity, and recreation (or short-lived pleasure) and survival are represented to the student as the two SLOW CA·rs activities. The features of FAST CA·rs activities are: they have a high yield for success, are activities that power Creative Ambitions and/or Creative Actions or sustained right actions and are success excitatory. FAST CA·rs activities include activities that may require creativity, wisdom, problem solving, spirituality, and activities that elicit such complex emotions such as exhilaration. Examples of FAST CA·rs activities include the aforementioned new brain activities. The features of SLOW CA·rs activities include: they have a low yield for success, are the baseline automatic default responses, are creative liabilities, i.e. activities that drain a students' creative energy and are success inhibitors. SLOW CAR activities may also include old brain activities. Examples of SLOW CAR recreation (or pleasure) activities include any compulsive pursuits that may only serve to distract students from implementing or completing new brain activities to achieve their personal goal. SLOW CAR recreation (or pleasure) activities include activities that provide instant gratification such as compulsive drinking or eating or habitual behavior. SLOW CAR survival activities include activities based on fear, worry and may invoke flight or fight responses or other impulsive responses. SLOW CAR survival activities include activities such as over-working, and being a perfectionist. A persons' creative energy may be split between the SLOW and FAST CA·rs.

In step 110 of the method 1, the students may be instructed to select and implement at least one of the possible or potential new brain activities associated with the FAST CA·rs.

In the step 115, the students may be instructed to utilize a success roadmap to achieve FAST CA·rs. FIG. 1E depicts a Success Roadmap 50 in which their creative energy flows from their Ideal Self and/or their Spirited Living or Sustained Spirit Energy, S, to power their thoughts or sustained right thinking, T, actions or sustained right actions, A and their results, R. In a surveillance and/or self-monitoring and/or self-governance step, the students may consciously ask whether they have effectively allocated their dwelling time and creative energy to achieve their compelling desire or personal goal. The students may be instructed to utilize, the Success Roadmap 50 in the step 115 of the method 1, as depicted in FIG. 1A. The Success Roadmap 50 comprises: a step 51 in which the students' creative energy may flow from their Ideal Self and/or their Spirited Living or Sustained Spirit Energy to power thoughts or sustained right thinking, T, such as right or correct thoughts or sustained right thinking, wherein the rightness or correctness of the thoughts or sustained right thinking, T, may be based on FAST CA·rs thoughts or on whether the students determine that they have achieved their compelling desire and/or their personal goal; a step 52 in which the students' creative energy may flow from their Ideal Self and/or their Spirited Living or Sustained Spirit Energy throght their thoughts, T, to power their actions or sustained right actions, A, such as right or correct actions or sustained right actions, wherein the rightness or correctness of the actions or sustained right actions, A, may be based on FAST CA·rs actions and/or whether the students determine that they have achieved their compelling desire and/or their personal goal; a step 54, in which the students' creative energy may flow from their Ideal Self and/or their Spirited Living or Sustained Spirit Energy through their thoughts and actions to power their results, R, such as right or correct results, wherein the rightness or correctness of the results, R, may be based on whether the students determine that they have achieved their compelling desire and/or their personal goal. In steps 51, 52 and 54, the Law of Positive Natural Consequences may be taught to the student. The Law of Positive Natural Consequences states that outcome is a natural outflow from action or inaction. The Law of Positive Natural Consequences controls all a students' interactions or sustained right actions with the universe. Technically the Law of Positive Natural Consequences is an "IF . . . THEN" sequential dyad. In the steps 51, 52 and 54, the student is taught the consequences of the Law of Positive Natural Consequences. First, the Law of Positive Natural Consequences controls the time-movement of all objects (tangible and intangible); that is, how a person gets from here to there, that is, how a person acquires success, in accordance with the present invention. Second, like baking a cake, sequence guarantees outcome. Third, good outcome may require consistent, positive actions or sustained right actions.

The Success Roadmap 50 includes a surveillance and/or self-monitoring and/or self-governance step, 56, in which students may be instructed to ask whether they have effectively allocated their dwelling time and creative energy to achieve their compelling desire or personal goal, and if they have achieved their good compelling desire or personal goal. In the step 56, if the answer is "NO", the students may be taught to repeat steps 51-56 of the Success Roadmap 50. Alternatively, they may consciously choose to abandon or postpone such intended compelling desire or personal goal. If the answer is "YES", the students may be taught that a purpose of the surveillance and/or self-monitoring and/or self-governance operation, S, in the Success Roadmap 50 is to enable the students to continually test the rightness or correctness of their thoughts or sustained right thinking, T, actions or sustained right actions, A and/or their results, R the results, R. The students may be taught that their thoughts or sustained right thinking, T, actions or sustained right actions, A and/or their results, R may be right if they feel a sense of Happiness, Contentment, and/or Peace of Mind, after they have achieved success in regard to achieving their compelling desire or personal goal, as in step 95 of the method 1, as depicted in FIG. 1A. A compelling desire or personal goal can also include helping others achieve Happiness, Contentment, Peace of Mind and/or success for themselves. Surveillance and/or self-monitoring and/or self-governance may be tests for whether the students have preserved their Happiness, Contentment, and/or Peace of Mind, after they have achieved Success in regard to achieving their compelling desire or personal goal, as in step 95 of the method 1, as depicted in FIG. 1A.

Figure 1F:
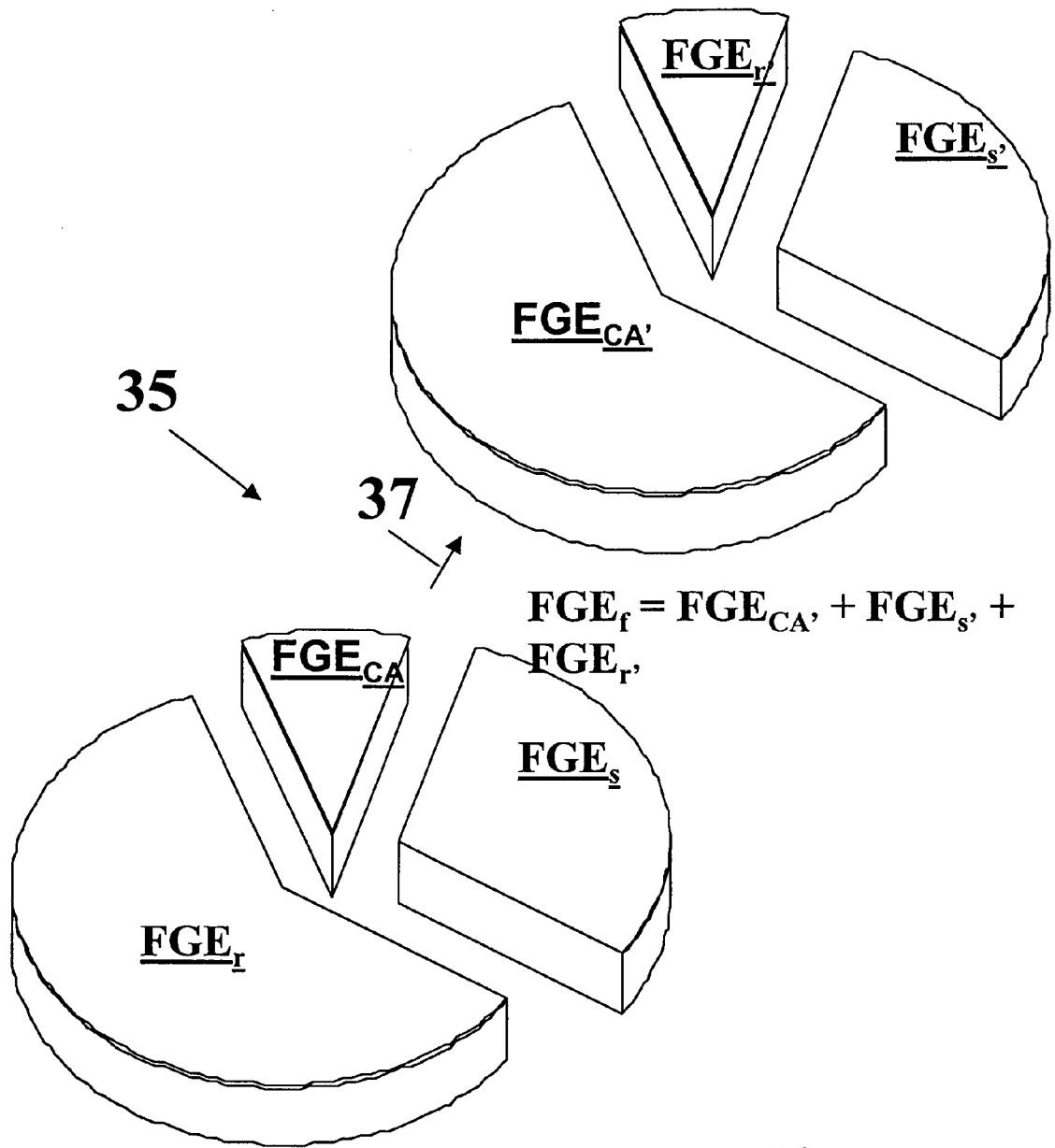
FIG. 1F depicts a Success CA·rs creative energy redistribution, according to embodiments of the present invention.
Figure 1G:
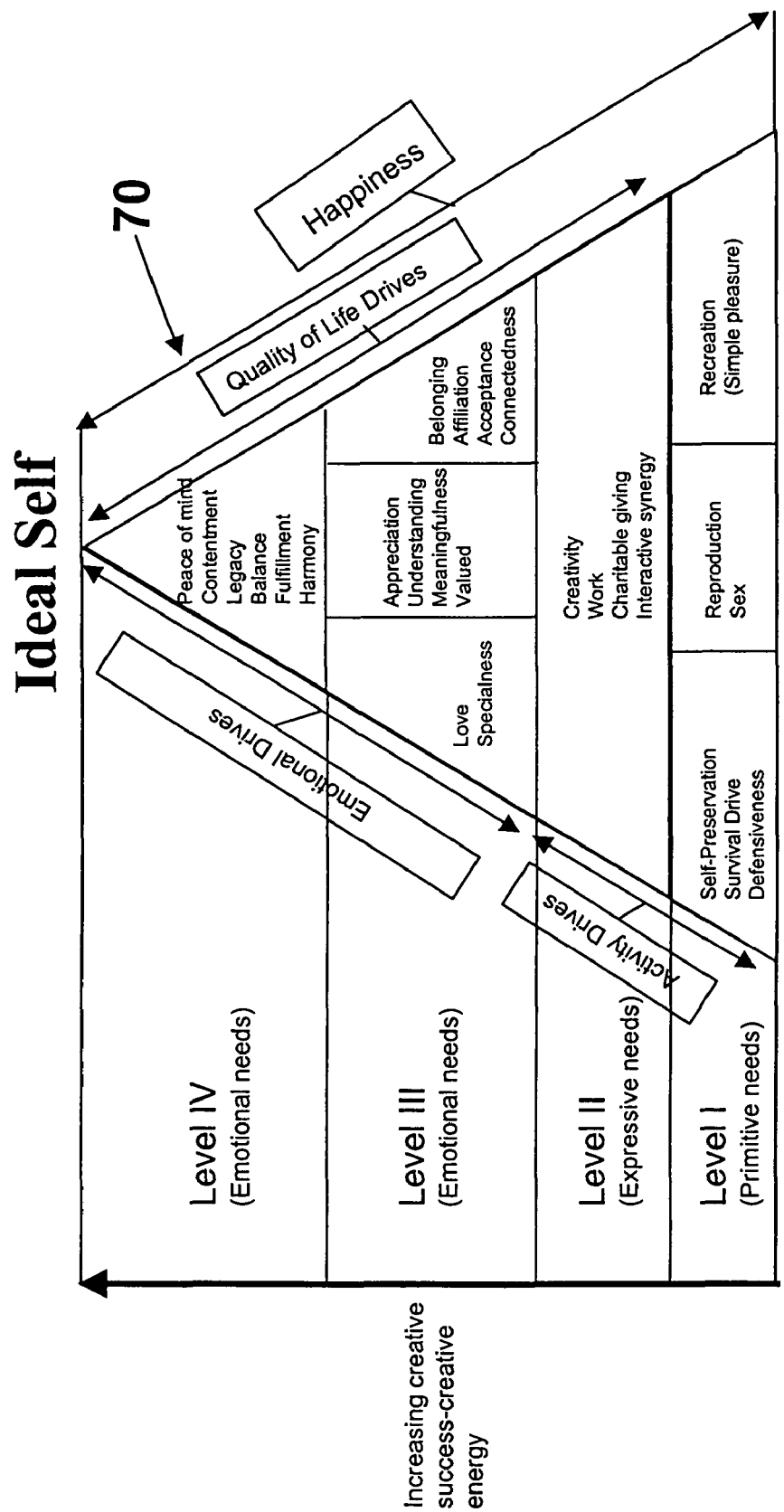
FIG. 1G depicts Self-governance of the Ideal Self, according to embodiments of the present invention.

The students may be taught success FAST CA·rs 58 may provide creative energy in the form of Creative Ambitions and/or Creative Actions or sustained right actions, CA, as depicted in FIGS. 1C, 1D, and 1F, supra, for powering their thoughts or sustained right thinking, T, in a direction of an arrow 53. In some embodiments, the students may be taught creative energy from their Ideal Self and/or Spirited Living or Sustained Spirit Energy, S, may be provided for powering their success FAST CA-rs 58, in a direction of an arrow 53' and/or creative energy from their success FAST CA·rs for powering their thoughts or sustained right thinking in the direction of the arrow 53.

The students may be taught success FAST CA·rs 59 may provide creative energy in the form of Creative Ambitions and/or Creative Actions or sustained right actions, CA, recreation, as depicted in FIGS. 1C and 1D, supra, for powering their actions or sustained right actions, A, in a direction of an arrow 55. In some embodiments, the students may be taught creative energy from their thoughts or sustained right thinking, T, and/or Ideal Self and/or Spirited Living or Sustained Spirit Energy, S, may be provided for powering their success FAST CA·rs 59, in a direction of an arrow 55' and/or creative energy from their success FAST CA·rs for powering their thoughts or sustained right thinking in the direction of the arrow 55.

FIG. 1G depicts one embodiment of an "Ideal Self" and/or "Spirited Living or Sustained Spirit Energy" success CA·rs 70, wherein the students have been taught to allocate their success-creative energy in proportion to an area of each labeled portion of the success CA·rs 70 in order to power and achieve their Creative Ambitions and/or Creative Actions or sustained right actions, CA, as in the success CA·rs 1, as depicted in FIG. 1A, supra. In FIG. 1G, the students may have been instructed to allocate a lowest level of their creative energy to primitive needs such as self-preservation, survival, reproduction, sex and recreation for simple pleasure. The students have been instructed to allocate a second level of their creative energy to expressive needs to improve their quality of life through activity drives, including, but not limited to, creativity, work charitable giving, and interactive synergy. In FIG. 1G, primitive and expressive needs have been allocated generally to activity drives.

In FIG. 1G, the students may also have been instructed to allocate an intermediate and highest levels of their success-creative energy to Emotional Needs for powering their Emotional drives or instincts, including, but not limited to, feeling of love, specialnesss, being appreciated, being understood, having a sense of feelings of meaningfulness, being valued, having a sense of belonging, having a sense of affiliation, being accepted, being connected, having peace of mind, having contentment, having legacy, having balance, having fulfillment and being in harmony. Hereinafter, Quality of Life drives or instincts include Emotional drives or instincts and the Expressive Needs portion of Activity drives or instincts. Hereinafter, happiness means a balanced embodiment of activity drives, quality of life drives, and emotional drives to achieve a sense of completeness and harmony. Happiness is the students' moment to moment ability to look and see far beyond the negative, so as to experience the beauty and perfect-ness of this world (and of those around you); and, with great love and excitement in your heart, immerse yourself in the creative possibilities of now.

In the step 115 of the method 1, students may be taught that performing the Success CA·rs redistributions 15 and 16 may result in success in achieving their personal goals. Students may be taught that performing the Success CA·rs redistributions 15 and 16 may result from increased use of the new brain activities and a decreased use of the old brain activities in their day to day lives, transforming their SLOW CA·rs to FAST CA·rs, in accordance with the method 1 of the present invention. In the step 115 of the method 1, the student may be instructed to allocate more creative energy and Dwelling Time to power and achieve his or her Creative Ambitions and/or Creative Actions or sustained right actions and/or Success-Creative Activity, according to the Success CA·rs 15 and 16 redistributions as depicted in FIGS. 1B and 1C and described supra, to achieve their personal goals, success, happiness and legacy. When students are instructed to allocate more Creative Ambition and/or Creative Actions or sustained right actions energy, $E_{CA}$, and Dwelling Time to power and achieve their Creative Ambitions and/or Creative Actions or sustained right actions and/or Success-Creative Activity in the CA·rs redistribution as depicted in FIGS. 1B and 1C and described supra, they may achieve their personal goals, success, happiness and legacy. In the CA·rs redistribution, the student may increase his or her Creative Ambitions and/or Creative Actions or sustained right actions Dwelling Time, $DT_{CA'}$ relative to the student's Creative Ambitions and/or Creative Actions or sustained right actions Dwelling Time, $DT_{CA}$, as depicted in FIG. 1B and described in associated text. Hereinafter, Dwelling Time may be the time the student invests thinking about and performing any activity. Dwelling Time can be constructive or destructive. Constructive Dwelling Time may be rooted in Creative Ambitions and/or Creative Actions or sustained right actions and in Success-Creative Activity. Constructive Dwelling Time may be time that directly powers success. Destructive Dwelling Time may be rooted in self-preservation and recreation. Destructive Dwelling Time may displace Success-Creative activity. Students may be taught to do surveillance and/or self-monitoring and/or self-governance, in which they are taught to optimize a probability of success of achieving their personal goals by monitoring their Constructive Dwelling Time. Students may be instructed to perform the Success CA·rs redistributions 15 and 16 to de-emphasize recreation and survival activities by re-distributing and re-balancing their Dwelling Time so that more of the students' Success-Creative activity may be allocated toward Creative Ambitions and/or Creative Actions or sustained right actions. New brain activities are helpful in achieving a student's personal goal; old brain activities are detrimental to achieving the student's personal goal.

In some embodiments of the present invention, in step 115 of the method 1, students may be instructed to de-emphasize old brain activities by allocating more creative energy and dwelling time to power and achieve their personal goals and FAST CA·rs based on the listing of new and old brain activities that result in Fast CA·rs, supra, listed in the step 100 of the method 1.

Figure 1H:
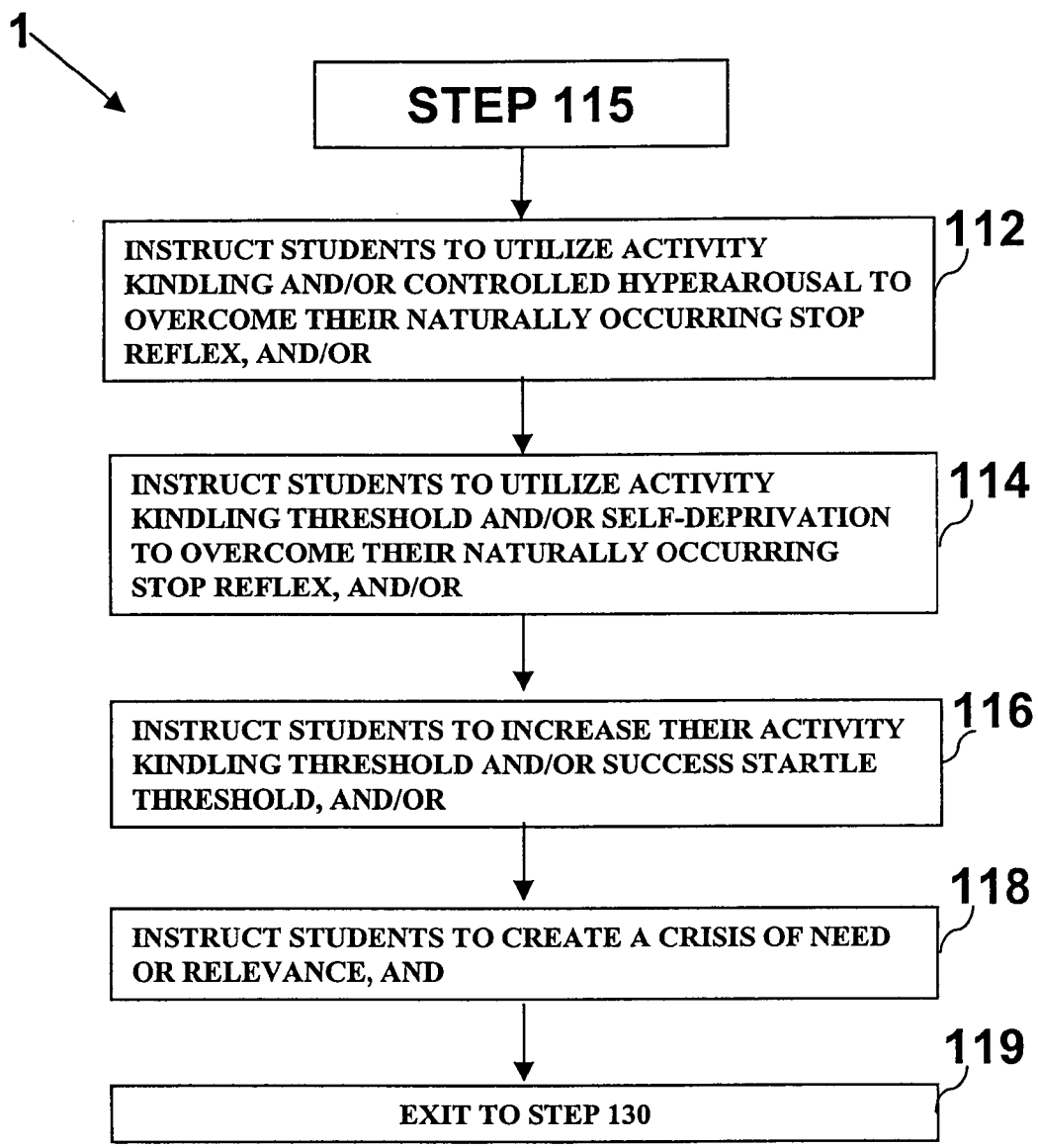
FIG. 1H depicts a method for using techniques to overcome the stop reflex, according to embodiments of the present invention.

FIG. 1H depicts an embodiment of the step 115 of the method 1, wherein the students may be instructed to redistribute and rebalance their initial foreground creative energy, $FGE_i$, as in a Success CA·rs redistribution 35 in a direction of the arrow 37, as depicted in FIG. 1G and described infra. In FIG. 1H, the students may have redistributed their initial foreground energy, $FGE_i$, such that $FGE_{CA}>FGE_{CA}$ to accomplish the students' moment-to-moment thoughts or sustained right thinking and behaviors. Creative energy includes foreground creative energy. "Foreground energy" is a portion of a students' creative energy that may be allocated to power in-progress activities in order to achieve the students' personal goal. The students may be instructed to distinguish between personal goals that may have an immediate need from personal goals that may be achieved later. In this foreground creative mode, a task executing in foreground is one able to accept input from and return output to the user in contrast to one running in the background. Normally, there may be more than one foreground task per student to be accomplished. Hereinafter, accomplishing more than one task per student may be termed "multi-resulting." In the foreground creative mode, instructing the students, as depicted in FIGS. 1G and 1H, and described, herein, to allocate their "foreground energy" to accomplish their moment-to-moment thoughts or sustained right thinking and behaviors may avoid confusion that may result from multi-resulting.

FIG. 1H depicts an embodiment, Overcoming Resistance, of the step 115 of the method 1, comprising a step 112, instructing students to utilize activity kindling or controlled hyper-arousal to overcome their naturally occurring stop reflex, or a step 114, instructing students to utilize self-deprivation to overcome, suppress or override their naturally occurring stop reflex, or a step 116, instructing students to increase their success startle threshold or activity kindling threshold, or a step 118, instructing students to create a crisis of need or relevance. In the step 112, the students may be instructed to utilize activity kindling or hyper-arousal to overcome their naturally occurring stop reflex that may be a barrier preventing allocation of their creative energy, $E_f$ in order to achieve their Creative Ambitions and/or Creative Actions or sustained right actions, as in a Success CA·rs redistributions 15, 16, and 35 as in FIGS. 1C, 1D and 1F. Hereinafter, kindling means the electrophysiological changes that occur in the brain as a result of repeated intermittent exposure to a sub-threshold electrical or chemical stimulus (as one causing seizures) so that there develops a usually permanent decrease in the threshold or barrier to action or activity. Hereinafter, "hyper-arousal" means a state of elevated or increased alertness, focus, interest, awareness or wakefulness. "Hyper-arousal" may also mean an enhanced state of sensory sensitivity accompanied by an exaggerated intensity of behaviors whose purpose is to detect threats, for example, hyper-vigilance. Hereinafter, the "stop reflex" is a reflex that arises from a students' natural resistance to change, such as, for example, the Natural Protective Resistance (NPR) to change or novelty. The "stop reflex" may arise from homeostasis, a term that describes a students' bodies' natural tendency to preserve their physiological equilibria, such as, for example, a homeostatic regulator that preserves the current state of affairs, such as the body's ability and drive to maintain a constant fixed body temperature. Students may prepare for action if they are threatened by the environment (or informed of an approaching pleasure or danger). They may activate reserves of energy that may be a barrier preventing allocation of their creative energy, $E_f$, to achieve their Creative Ambitions and/or Creative Actions or sustained right actions, as in a Success CA·rs redistributions 15, 16, and 35 as in FIGS. 1C, 1D and 1F, and produce certain hormones such as adrenalin, which prepares them for conflict or flight, such as for example, the survival instinct reflex. This activation can be manifested in visible physiological reactions or sustained right actions. Their heart beats and respiration may quicken in the presence of emotion, perceived danger, or physical effort. Their faces may turn red or pale and their bodies may perspire. They may experience shortness of breath, cold sweats, shivering, or trembling legs. In preparation for fight or flight, physiological change gets converted into feelings of anxiety which increase the students fear. The fear then becomes the resistance to creativity.

Homeostasis can be a voluntary response to paired stimuli, e.g., to drink when one is thirsty, to eat when hungry, to put on clothing when cold, to open a window when one is too warm, or involuntary response to paired stimuli, e.g. shivering, or sweating when one has a fever or may be too cold or hot. Here, the "paired stimuli" mean the stimulus of the pleasure to drink in response to the stimulus to relieve the pain of thirst, the stimulus of the pleasure to eat in response to the stimulus to relieve the pain of hunger, etc. In either voluntary or involuntary cases of homeostasis, students may be taught that the likelihood that they may overcome the stop reflex of homeostasis may depend on their control of the "paired stimuli," that may be opposite human sensations such as pleasure and pain, hunger and satiety, or emotions, such as love and hate.

Figure 1I:
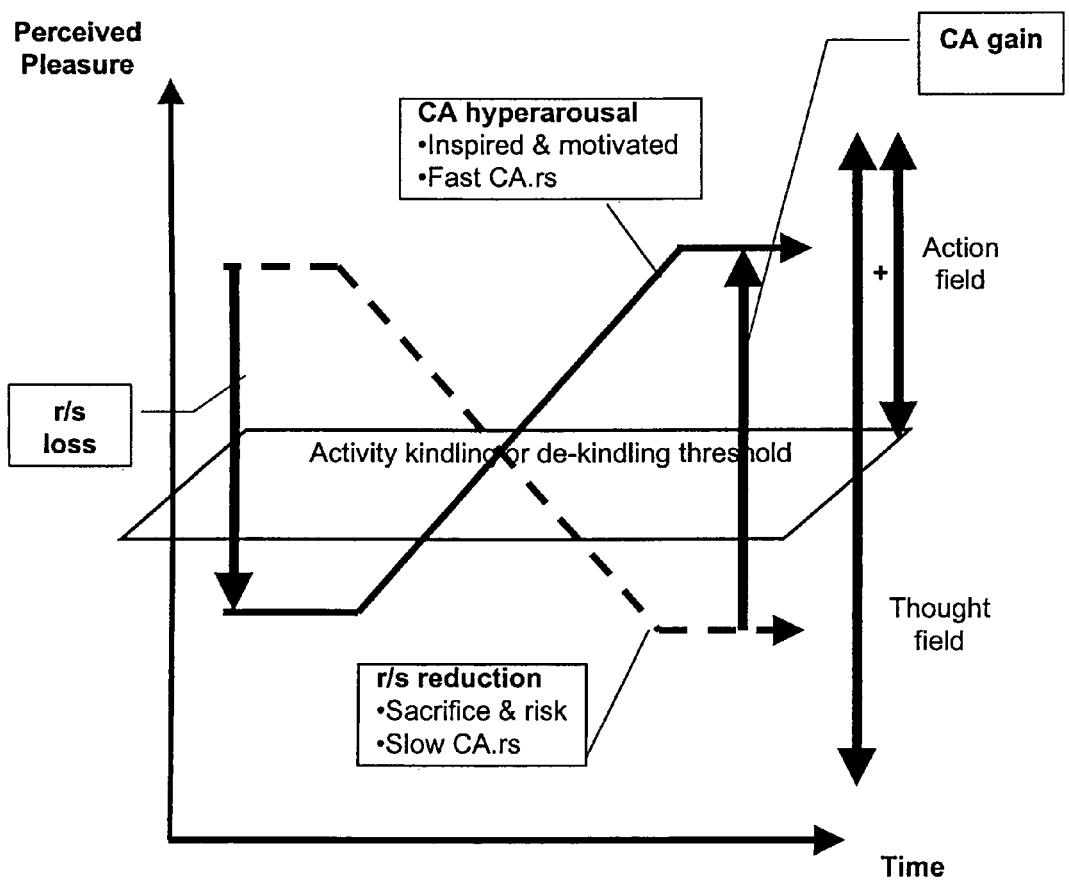
FIG. 1I depicts the students' creative energy, such as their perceived pleasure versus time that may power students' Creative Ambitions, according to the present invention.

FIG. 1I depicts the students' creative energy, such as their perceived pleasure, as in equation (1), infra, versus time that may power students' Creative Ambitions. The students' perceived pleasure is shown as being either greater than, equal to or less than the students' activity kindling or de-kindling threshold or hyper-arousal or hyper-dearousal threshold versus time. Hereinafter, "activity dekindling threshold" and "hyper-dearousal threshold" are opposite of "activity kindling threshold" and "hyper-arousal threshold," respectively. The broken curve of FIG. 1I depicts activity dekindling or controlled hyper-dearousal, wherein a high r/s (i.e., high recreation, r, and/or survival, s,) activity having the students' creative energy inefficiently allocated to survival, s, and/or recreation, r, activity may be dekindled, i.e. directed below the "activity dekindling threshold" and "hyper-dearousal threshold" over time by instructing the students to link the high r/s activity to a low perceived pleasure, that may be less than 50%, as defined in equation (1) supra. By instructing the students to link the high r/s activity to the low perceived pleasure, the students may be taught to stop doing the high r/s activity. It has been found that students will stop doing the high r/s activity when the perceived pleasure is less than 50%, resulting in directing the high r/s activity from an "activity field," as in FIG. 1I, to a thought field. In contrast, the solid curve of FIG. 1I depicts activity kindling or controlled hyper-arousal, wherein a high Creative Ambitions, CA, activity may be kindled, i.e. directed above the "activity kindling threshold" and "hyper-arousal threshold" over time by instructing the students to recognize that the activity linked to the high Creative Ambitions, CA activity may have a high perceived pleasure, as defined in equation (1) supra. By instructing the students to link the high Creative Ambitions, CA, activity to the high perceived pleasure, the students may be taught to start doing the high CA activity. It has been found that students will start doing the high CA activity when the perceived pleasure is greater than 50%, resulting in directing the high CA activity from the "thought field" as in FIG. 1I, to the "activity field," as in FIG. 1I, to a though field. It has been found that teaching students identify high CA activities that have a perceived pleasure greater than 50% enable them to gain leverage over barriers to implementation of the creative activities they have identified to help them achieve their compelling desire or personal goal. The technique in FIG. 1I may be used by the students to transform their creative thought into creative action. FIG. 1I, teaches the students that Perceived Pleasure, as in equation (1), infra, may increase when the students kindle their high CA activities resulting in doing the activities that the students have identified may be required to achieve their compelling desires or personal goal, i.e. success. In like manner, FIG. 1I teaches the students that Perceived Pleasure, as in equation (1), infra, may increase when the students redistribute and re-balance their creative energy to allocate more creative energy to their Creative Ambitions, CA, thereby losing r/s, as depicted in FIG. 1I. FIG. 1I teaches the students to allocate r/s energy to provide the energy to transform their creative thought into creative action. It has been found that the loss in r/s energy may be equivalent to the gain in CA energy, which may also be equivalent to the gain in perceived pleasure energy.

It has been found that students should increase activity kindling or hyper-arousal intensity to an activity kindling or hyper-arousal threshold level of perceived pleasure associated with an activity, in order to overcome the stop reflex due to homeostasis in order to cause students to engage in the activity and/or carry it out. It has also been found that a likelihood that students will engage in the activity may be proportional to an activity kindling level or a controlled hyper-arousal level of the students.

Therefore, in the step 112, students may be taught activity kindling or controlled hyper-arousal techniques and that they may overcome either voluntary or involuntary homeostasis, and that may promote the students' FAST CA·rs activities such as, for example, new success. This may be because it has been found that activity kindling or controlled hyper-arousal in excess of the activity kindling or hyper-arousal threshold and in excess of the energy of aroused interest in recreation, r, or survival, s, or self-preservation, s, may overcome the students' stop reflex due to homeostasis, thereby causing students to engage in the activity and/or carry it out. In some embodiments in which the students' personal goal may include behavior displacement, it has been found that teaching students to associate more pleasure with the behavior to be activated and more pain with the behavior to be suppressed may be an effective activity kindling or controlled hyper-arousal technique. The students may be taught that activity kindling or controlled hyper-arousal that associates pleasure with activities to be activated attracts students to engage in the activity, but activity dekindling or controlled hyper-dearousal that associates pain or discomfort with activities to be suppressed causes students to withdraw from the activity to be suppressed. It has been found that activity kindling or controlled hyper-arousal may effectively stimulate activities such as working to finish a task on time in competition with other activities selected from the group consisting of watching television, playing, or reading, going to the gym, new success and combinations thereof. Alternatively, activity kindling or controlled hyper-arousal may effectively stimulate new success, effectively displacing other activities selected from the group consisting of watching television, playing, or reading, going to the gym, working and combinations thereof. In some embodiments, the controlled hyper-arousal may be the students' conviction that their personal goal justifies "going all out," such as, for example deciding to become a physician because the student can not accept not becoming a physician.

A student may be taught that activity kindling or hyper-arousal may be utilized for energizing new success when it may be internally controlled. Alternatively, activity kindling or hyper-arousal may be externally controlled, for example, by the advertising industry. Advertising expensive clothing such as women's fashion may be an example of externally controlled hyper-arousal or externally controlled activity kindling, wherein customers may be enticed to buy articles by advertisers representing the articles to possible or potential customers as unnaturally or unrealistically desirable, beautiful, or sexually appealing. This could cause the students to displace, suppress, or abandon activities of Creative Ambition, CA. Students may be taught a benefit to internally controlling hyper-arousal or internally controlling activity kindling, is that the students may choose to pursue new success instead of being enticed to buy articles by advertisers who represent the articles to possible or potential customers as unnaturally or unrealistically desirable, beautiful, or sexually appealing. Students may be taught to increase the likelihood of achieving their creative pursuits and/or personal goal by manipulatively increasing a hyper-arousal adrenaline effect the students may associate with their creative pursuits and/or personal goal. Students may be taught to associate pleasure to present success and new success activities, and associate pain for recreation or survival activities such as working, playing, watching television, or going to the gym since it has been found that increasing the intensity of pleasure associated with an activity increases the likelihood that students will engage in it and/or carry it out.

In the step 114 of the method 1, as depicted in FIG. 1H, supra, the students may be instructed to utilize self-deprivation to overcome their naturally occurring stop reflex due to homeostasis, thereby causing students to engage in the activity and/or carry it out. The students may be taught that self-deprivation may mean deferred or delayed gratification and that these may be new brain activities that may arise from complex, dynamic brain activity. Self-deprivation includes voluntarily giving up or losing relative or perceived pleasure associated with the activity being deprived. Therefore, self-deprivation and instant gratification may be opposites because self-deprivation may be a new brain activity and instant gratification may be an old brain activity. The students may be taught to have confidence in self-deprivation and/or delayed gratification if they are given a larger reward for engaging in and/or carrying out the activity in the future than if they engage in and/or carry out the same activity immediately, such as, for example, deferring pre-marital sex until they are committed to a monogamous relationship, instead of accepting a higher risk of being exposed to a sexually transmitted disease from a polygamous partner.

In the step 116 of the method 1, as depicted in FIG. 1H, supra, the students may be instructed to focus their attention on the Creative Ambitions, CA, and/or Creative Actions or sustained right actions, CA, and/or productive activities related to carrying out their compelling desire and/or personal goal, as in the step 95 of the method 1, supra. By focusing on activities the students identify that will help them achieve their compelling desires and/or personal goal, students may induce success startles that are specific to carrying out their compelling desires and/or their personal goal. A problem is that normal human brains generate competing voluntary and involuntary success startles. In healthy brains, involuntary success startles may be controlled by a balance of adrenaline and dopamine and/or endorphins. We have described how brains with unhealthy lesions in the frontal lobe or people diagnosed with attention deficit syndrome have random uncontrolled success startles such that they try to give their attention to every activity they imagine. Focusing accomplishes two results that help students achieve their compelling desires and/or their personal goal. Firstly, focusing on creative activities increases an intensity of their success startles, and secondly, focusing on creative activities increases their success startle threshold and/or kindling and/or activity thresholds for Creative Ambition, CA, Creative Action, CA and/or productive actions or sustained right actions identified by the students for carrying out their compelling desires and/or their personal goal. As to the first result, focusing on the activity to be carried out increases the success startle intensity for that activity relative to the numerous other competing success startles in a normal or unhealthy brain. As to the second result, it has been found that focusing raises the success startle threshold and/or kindling and/or action threshold for success creative activities relative to recreation (or pleasure) r, and self-preservation, s activities. Therefore, instructing students to focus on creative activities increases their success startle intensities so that the creative activity may be stimulated to action even though focusing also raises the success startle threshold and/or kindling and/or action threshold for success creative activities relative to recreation (or pleasure) r, and self-preservation, s activities and relative to the competing success startles in the normal and unhealthy brains.

It has been found that the success startle and/or kindling and/or activity threshold for recreation (or pleasure) r, and self-preservation, s, activities such as play, watching television, or instant gratification for immediate pleasure or play may be lower than for working on Creative Ambitions, CA, and/or Creative Actions or sustained right actions, CA, and/or productive actions or sustained right actions activities that may have time pressure due to a near term deadline. Procrastination, where students defer working on Creative Ambitions, CA, and/or Creative Actions or sustained right actions, CA, and/or productive actions or sustained right actions, but instead pursue recreation (or pleasure) r, and self-preservation, s, activities such as play, watching television, or instant gratification for immediate pleasure or play such that the Creative Ambitions, CA, and/or Creative Actions or sustained right actions, CA, and/or productive actions or sustained right actions may be finished late or just in time, may exemplify this lowered success startle and/or kindling and/or action threshold for recreation (or pleasure) r, and self-preservation, s, activities such as play, watching television, or instant gratification for immediate pleasure or play. Therefore, teaching the students to focus on the Creative Ambitions, CA, and/or Creative Actions or sustained right actions, CA, and/or productive actions or sustained right actions in contrast to recreation (or pleasure) r, and self-preservation, s, thereby increasing the students' success startle for the Creative Ambitions, CA, and/or Creative Actions or sustained right actions, CA, and/or productive actions or sustained right actions may overcome the students' naturally occurring stop reflex due to homeostasis, thereby causing students to engage in the Creative Ambitions, CA, and/or Creative Actions or sustained right actions, CA, and/or productive actions or sustained right actions activities and/or carry them out.

Alternatively, in the step 116 of the method 1, the student is taught that their choice of creative activity over recreation, r, and/or survival, s, may be based on a perceived relative rewards associated with each activity and that there is a natural attraction towards activities with the greatest perceived relative rewards.

In step 116, the student is taught the concept of Perceived Relative Reward. Perceived Relative Reward can be defined as a ratio of perceived pleasure to perceived pain as in equation (1) infra:

$$\text{Perceived Relative Reward} = \frac{\text{Average Perceived Pleasure}}{\text{Average Perceived Pain}} \quad (1)$$

where:
Perceived Pleasure includes enjoyable activity drives such as love, happiness, altruism, Creative Ambition comfort, Creative Ambition excitement, Creative Ambition wealth, Creative Ambition sex, success, positive legacy and inspiration. Here, activity drives such as Creative Ambition wealth and sex are not drives for recreation, r, or survival, s, wealth and drives for recreation, r, sex for instant gratification. Perceived Pain includes un-enjoyable recreation, r and/or survival, s, withdrawal drives such as from fear, physical or emotional pain, discomfort, shame, guilt, worry, and regret.

In step 116, the students may be taught to ascribe an intensity for each of the Perceived Pleasures listed supra for a given activity on a scale of 0-10, wherein 0 means no pleasure, a 5 means average pleasure, and 10 means the greatest intensity of pleasure that the students ascribe to the given activity to determine the quantity "Perceived Pleasure." In like manner, the students may be taught to ascribe an intensity for each of the Perceived Pains listed supra for a given activity on a scale of 0-10, wherein 0 means no pain, a 5 means average pain, and 10 means the greatest intensity of pain that the students ascribe to the given activity to determine the quantity "Perceived Pain." Each of "Average Perceived Pleasure" and "Average Perceived Pain" may be determined by averaging each of "Perceived Pleasure" and "Perceived Pain" for the given activity, wherein any appropriate method of statistical averaging such as equal weighting or non-equal weighting may be used to determine each of "Average Perceived Pleasure" and "Average Perceived Pain."

In step 116, the student is taught that a high Perceived Relative Reward (high Perceived Pleasure) promotes action in those activities and a low Perceived Relative Reward (high Perceived Pain) promotes avoidance of actions or sustained right actions in those activities. The student is taught that the probability of action thus increases as Perceived Relative Reward increases. In step 116, the student is taught how to increase or decrease their Perceived Relative Reward. On one hand, increasing their perceptions of love, happiness and the greater good served by fulfilling their Creative Ambition and/or Creative Actions or sustained right actions, can increase a students' Perceived Relative Reward. On the other hand, decreasing their perceptions of pain, fear, shame, guilt, discomfort and regret associated with not fulfilling their Creative Ambitions can decrease a students' Perceived Relative Reward.

Figure 2:
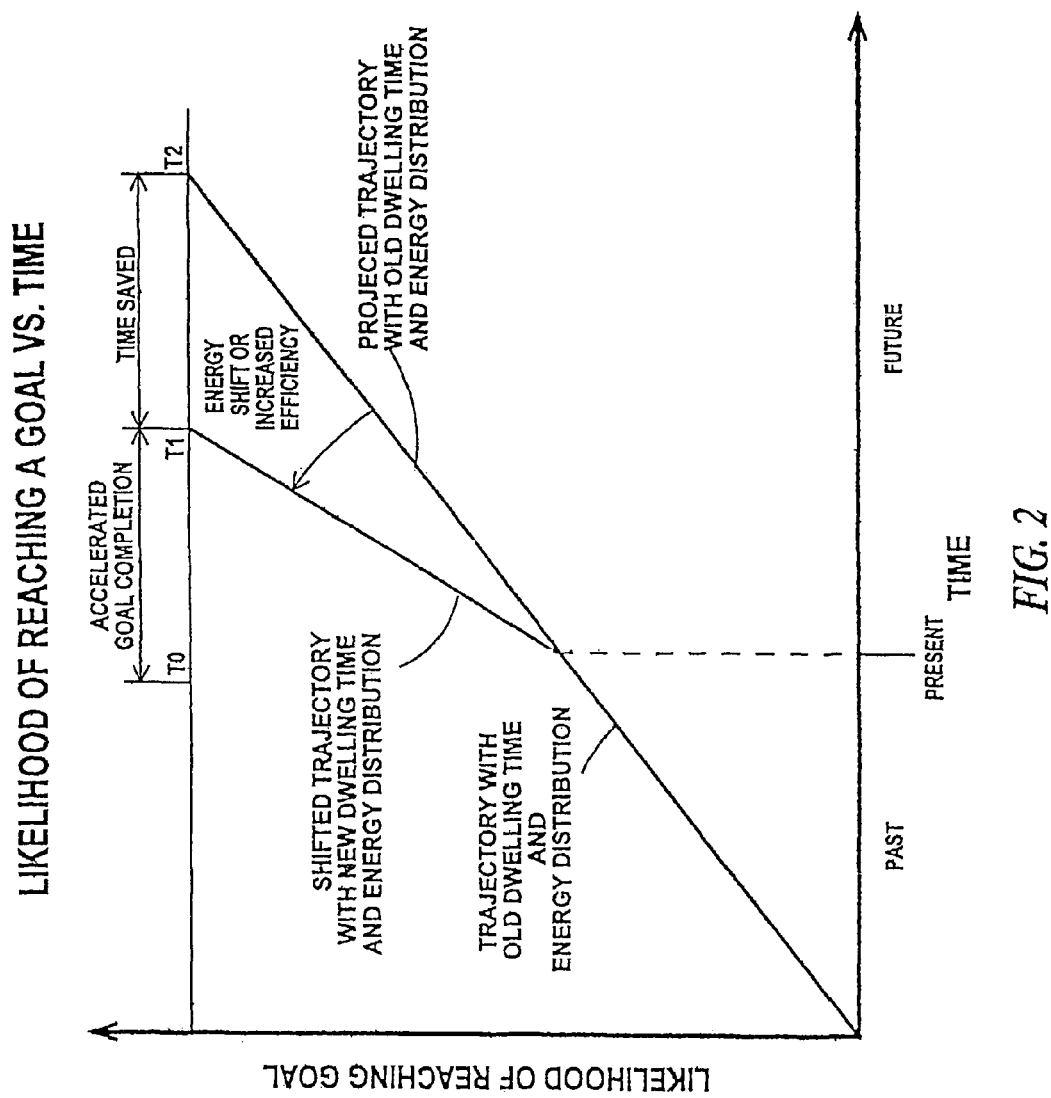
FIG. 2 is a crisis of need or relevance diagram, according to the present invention.

In the step 118 of the method 1, as depicted in FIG. 1H, supra, the students may be instructed to create a crisis of need or relevance to overcome their naturally occurring stop reflex. The students may be taught that time may expire before they have achieved their compelling desire and/or their personal goal. Students may be taught to project or estimate a timeline for achieving their compelling desire and/or their personal goal. Students may be taught to make a plan for completing their compelling desire and/or their personal goal and to determine if the estimated time to the plan exceeds the time they want to wait. Students may be taught to recognize their dissatisfaction with the length of the timeline for completion may be a crisis of need or relevance that may motivate them shift their energy for their plan. FIG. 2, infra, depicts a crisis of need or relevance.

FIG. 2 is a pictorial representation illustrating a crisis of need or relevance. In FIG. 2 the likelihood of reaching a goal is plotted versus time. It is immediately apparent that the likelihood of reaching a goal increases with the amount of time spent in activities powering reaching the goal. The time axis is split into the past and the future by the present time. The present is time T0. Without the method of the present invention, the projected slope of the line of likelihood of reaching a goal over time is the result of old habits and routines of dwelling time between new brain and old brain activities remains the same as in past time (left of T0) and the goal is accomplished at time T2. With the method of the present invention, the projected slope of the line of likelihood of reaching a goal over time is the result of new habits and routines of creative energy or dwelling time shifted from old brain activities to new brain activities increases and the goal may be accomplished at time T2, taking less time. In FIG. 2 the energy shift represented by the steeper slope of the line of likelihood of reaching a goal over time that is the result of new habits and routines of creative energy or dwelling time (present to T1) is an increased efficiency in achieving the goal. FIG. 2 may be presented to students as part of the method 1 of the present invention.

The techniques taught to the students to overcome the stop reflex due to homeostasis in order to cause students to engage in the activity and/or carry it out in the steps 112, 114, 116, and/or 118 of the method 1 may be used in any order. Alternatively, the students may be taught to use at least one of the steps 112, 114, 116, and/or 118, or any combinations thereof. In the steps 112, 114, 116, and/or 118 of the method 1, the students may be taught to use the following techniques to overcome the stop reflex in order to cause students to engage in the activity and/or carry it to override all obstacles and barriers: identify their talent-matched desired contribution to others; identify parallel pleasure anchors, i.e., rewards to promote and sustain your pursuit interest; elevate their gravitational energy. Hereinafter, gravitational energy is their creative energy that may unify and focus the students' mental, physical and spiritual energies, i.e., their attention, interest, pleasure, determination and endurance; increase their mental and physical processing speed; and increase their closure rate for achieving or accomplishing their compelling desire and personal goal.

In step 130, students may be instructed to self-monitor themselves whether they have achieved their compelling desire or personal goal, as identified in the step 95, supra.

If, as a result of surveillance and/or self-monitoring and/or self-governance, the students conclude they may not have achieved their compelling desire or personal goal, the students are instructed as in step 140, of the method 1, to reiterate steps 100 to 130. Alternatively, if, as a result of surveillance and/or self-monitoring and/or self-governance, the students conclude they may have may have achieved their compelling desire or personal goal, or if the students decide they no longer want to pursue their compelling desire or personal goal, the students are instructed to proceed to step 145, of the method 1, described infra.

In the step 145 of the method 1, the students may be instructed to reiterate steps 95 to 130 of the method 1, as depicted in FIG. 1A, supra. FIG. 1F depicts another embodiment of the step 115 of the method 1, wherein the students may be instructed to redistribute and rebalance their initial foreground recreation energy, $FGE_r$, as in a success CA·rs redistribution 45 in a direction of the arrow 47. In FIG. 1F, the students may have redistributed their initial foreground recreation energy, $FGE_r$, such that a portion of their initial foreground recreation energy, $FGE_r$ may be reallocated as new success final foreground Creative Ambitions and/or Creative Actions or sustained right actions energy $FGE_{CA'}$, such that their final Creative Ambitions and/or Creative Actions or sustained right actions energy, $FGE_{CA'}$, includes present success $FGE_{CA'}$, and new succes $FGE_{CA'}$ to accomplish the students' moment-to-moment thoughts or sustained right thinking and behaviors. The students may be instructed that such new success may require management and reallocation of their initial recreation or survival foreground creative energy, $FGE_{r,s}$, rather than diminishing final present success foreground creative energy, $FGE_{CA'}$. Here final foreground creative energy, $FGE_{r',s'}$ is equal to the final foreground creative energy the students allocate to recreation, $FGE_{r'}$ and the final foreground creative energy the students allocate to survival, $FGE_{s'}$. Therefore, the students may be instructed that one goal of success is to preserve present success.

Alternatively, in the step 145 of the method 1, the students may be instructed to reiterate steps 95 to 130 of the method 1, as depicted in FIG. 1A, supra, such that the students may be instructed to redistribute and rebalance their initial recreation energy, $FGE_r$, as in a success CA·rs redistribution 15 and 16, as in FIGS. 1C and 1D, supra. In this embodiment, the students may have redistributed their initial recreation energy, $E_r$, such that a portion of their initial recreation energy, $E_r$ may be reallocated as new success final Creative Ambitions and/or Creative Actions or sustained right actions energy $E_{CA'}$, such that their final Creative Ambitions and/or Creative Actions or sustained right actions energy, $E_{CA'}$, includes present success $E_{CA'}$ and new succes $E_{CA'}$ to accomplish the students' moment-to-moment thoughts or sustained right thinking and behaviors. The students may be instructed that such new success may require management and reallocation of their initial recreation or survival creative energy, $E_{r,s}$, rather than diminishing final present success creative energy, $E_{CA'}$. Here final creative recreation and survival energy, $E_{r',s'}$, is equal to the final creative energy the students allocate to recreation, $E_{r'}$ and the final creative energy the students allocate to survival, $E_{s'}$. Therefore, the students may be instructed that one goal of success is to preserve present success.

The students may be taught that redistributing and rebalancing their dwelling time can reclaim their loss of their boundary-less or free spirit. The student is further taught that success can be achieved by the combination of rebalancing dwelling time, de-emphasizing self-preservation and recreation (or pleasure), reclaiming their carefree creative nature, promoting adventure and change and promoting success-creative activities.

FIG. 3 is a diagram of a worksheet that may be used to practice the present invention. The worksheet in FIG. 10 may be used by either the student to apply what they have learned or as a tool in the teaching of the method of the present invention to the student. The worksheet in FIG. 3 comprises eight Fields that may be filled in by a student of the method of the present invention in sequential order. In Field (1) Personal Goal, the student is instructed to enter their personal goal. In Field (2) Potential Activities, the student is instructed to enter possible or potential activities they believe, if performed diligently, will lead to success in accomplishing the goal. In Field (3) Old or New, the student is instructed to categorize each activity based on whether the activity is a new brain activity or and old brain activity as described supra. In Field (4) Select, the student is instructed to select at least one of the possible or potential activities to actually implement based on the corresponding categorization made in Field (3). In Field (5) Increases to Reward, the student indicates what they can do to increase their perceived pleasure by implementation of the selected activities as taught supra. This may include inclusion and/or examination of sub-activities within the selected possible or potential activities. In Field (6) Decreases to Reward, the student indicates what to look out for that will increase their perceived pain by implementation of the selected activities as taught supra. The student then told to develop strategies to minimize these increases to perceived pain. In Field (7) Dwelling Time Negatives, the student is instructed to list what self-monitoring and/or self-governance should be done to minimize the potentially destructive dwelling time as taught supra. In Field (8) Dwelling Time Positives, the student is instructed to list what self-monitoring and/or self-governance should be put in place to maximize the potentially constructive dwelling time, as taught supra.

Figure 4:
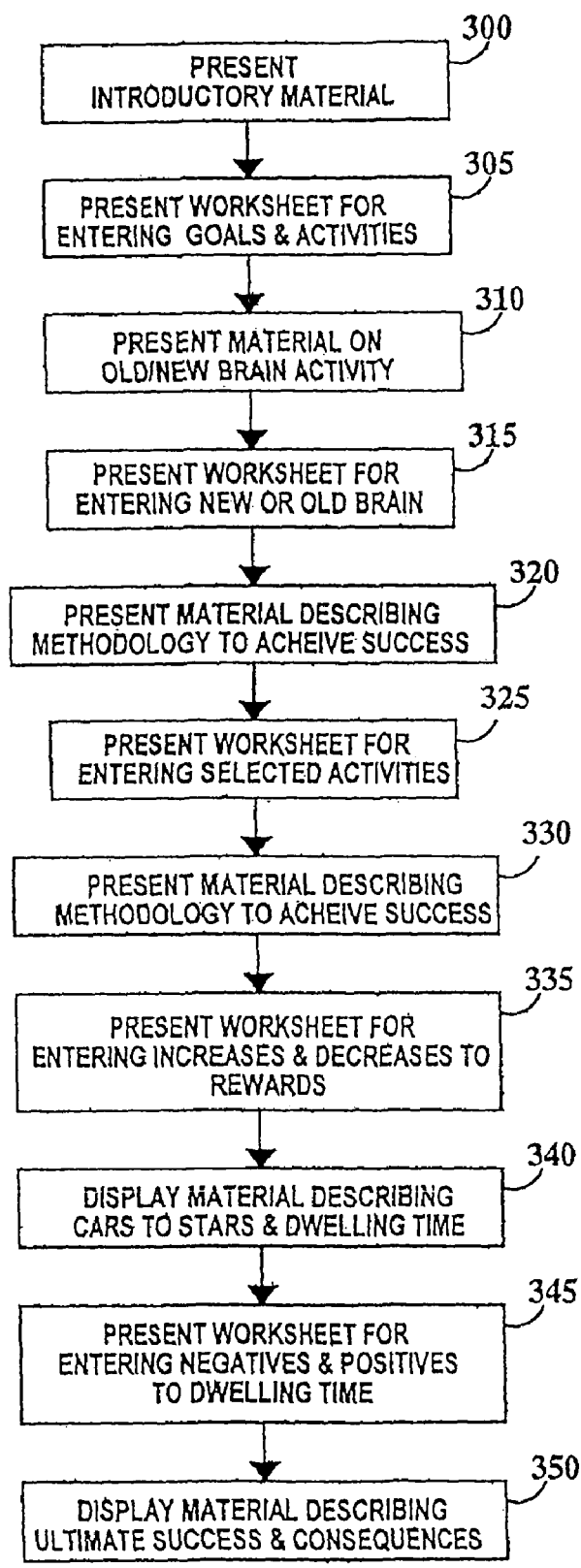
FIG. 4 is a detailed flowchart for teaching the five keys to success, according to the present invention.

FIG. 4 is an overall flowchart of a method for integrating the teaching success according to the present invention and the worksheet of FIG. 3 into an interactive method of teaching the present invention. For the purposes of describing FIG. 4, the terms "present, to present and presenting" are defined to mean projecting on a wall screen or a television screen using, for example, a slide or foil projector as well as displaying on a computer screen under the direction of a computer program the subject matter being taught. The terms "enter and entering" are defined to mean writing on a paper worksheet or typing through a keyboard (or moving or clicking a pointing device) linked to a computer adapted to display the information entered on a screen.

FIG. 4 depicts a method for presenting the method 1 for teaching success, as depicted in FIG. 1A, supra. In step 300, the introductory material described supra in reference to FIG. 1A, steps 95-100 may be presented to the students. In step 305, a worksheet (for example that illustrated in FIG. 3 and described supra may be presented to the students for the students to enter their personal goal and possible or potential activities to achieve the personal goal as described supra in reference to FIG. 1A, step 95. In step 310, the new brain/old brain material described supra in reference to FIG. 1A, step 100 may be presented to the students. In step 315, the worksheet for the student to enter their determination of which of the possible or potential activities are new brain activities and which are old brain activities as described supra in reference to FIG. 1A, step 100 may be presented to the students. In step 320, the methodology to achieve success material described supra in reference to FIG. 1A, step 115 may be presented to the students. In step 325, the worksheet for the student to select which of the possible or potential activities to implement as described supra in reference to FIG. 1A, step 95 is presented to the students. In step 330, the methodology to achieve success material described supra in reference to FIG. 1A, step 115 may be presented to the students. In step 335, the worksheet for the student to enter increases and decreases to rewards described in FIG. 1E, steps 51, 52, and 54 may be presented to the students. In step 340, the FAST CA·rs MAKE HOLLYWOOD STARS material described supra in reference FIG. 1E, steps 51, 52, and 54 and dwelling time material described supra in reference to FIGS. 1D and 1E, steps 51, 52, and 54 is presented to the students. In step 345, the worksheet for the students to enter negatives and positives to dwelling time is presented to the student. Finally, in step 350, the material describing ultimate success and consequences displayed supra in reference to FIG. 1E, step 54 may be presented to the student. The students now have a plan, constructed according to the present invention, for successfully achieving the personal goal that they may implement.

Figure 5:
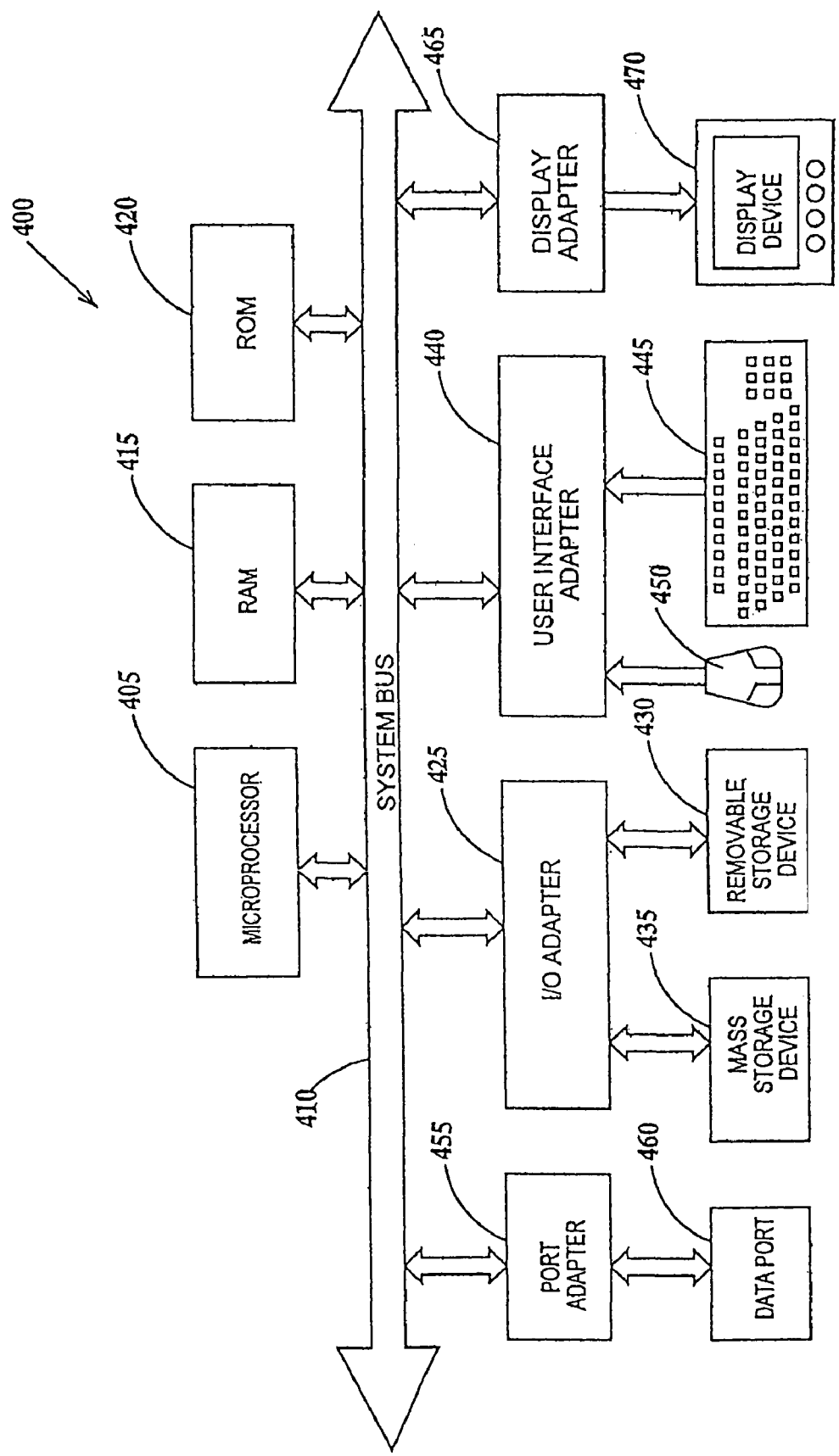
FIG. 5 is a schematic block diagram of a general-purpose computer that may be used for practicing the present invention.

Generally, the method 1 described herein, using the worksheet illustrated in FIG. 3 and described supra, may be practiced with a general-purpose computer and the method may be coded as a set of instructions on removable or hard media for use by the general-purpose computer. FIG. 5 is a schematic block diagram of a general-purpose computer for practicing the present invention. In FIG. 5, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445. In a first example, the slides illustrated in the Appendix may be written to a storage media and self-presented by a student. In a second example, the slides illustrated in the Appendix and the worksheet of FIG. 3 may be written to a storage media and self-presented by a student, the worksheet being presented at appropriate intervals during the presentation of the slides of the Appendix and student input accepted for predetermined fields of the worksheet at predetermined points in the presentation of the slides.

Figure 6:
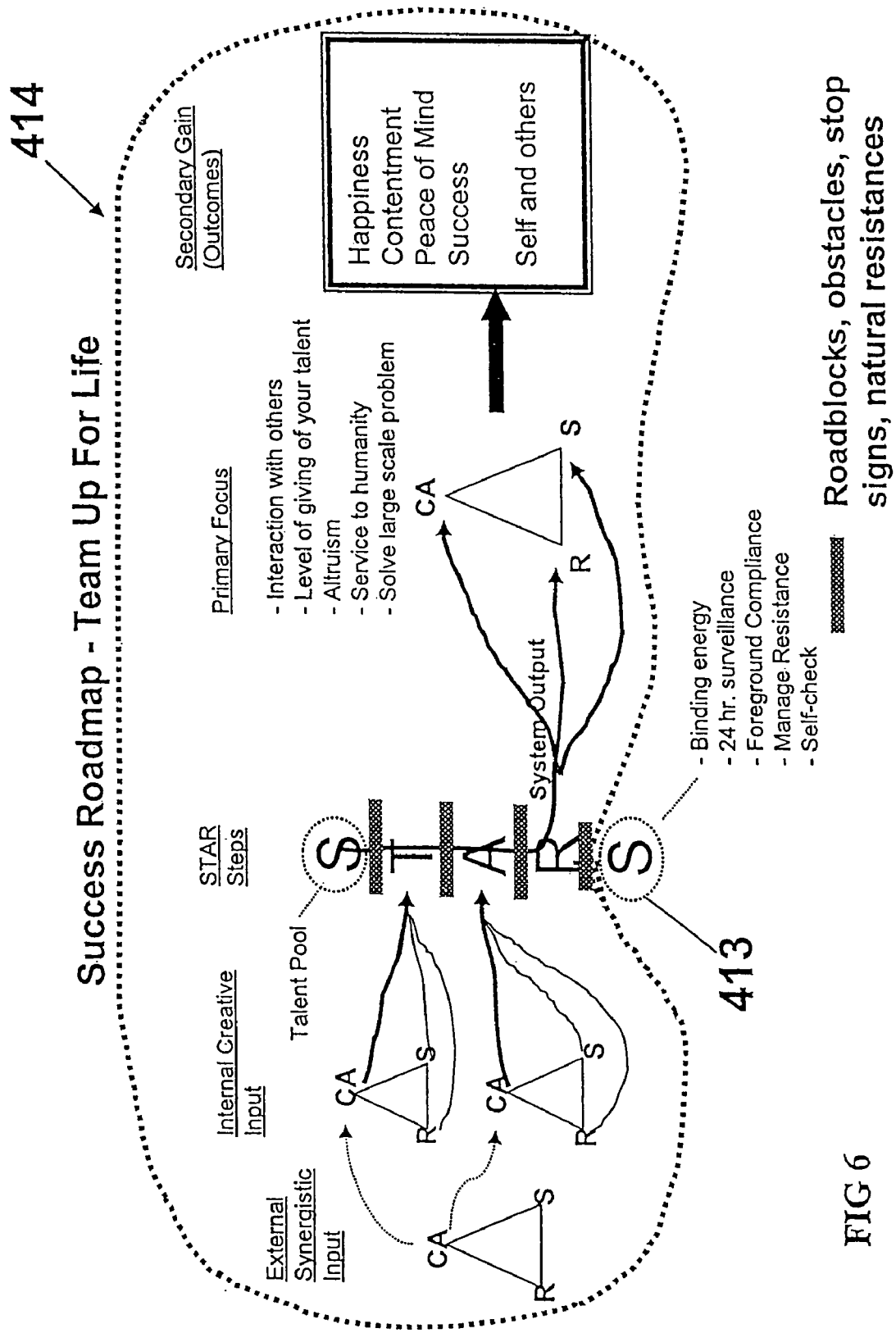
FIG. 6 is a pictorial representation illustrating a Success Roadmap, according to the present invention.

FIG. 6 depicts an embodiment in which the Success Roadmap 414, as in step 115 of the method 1, may be a "Success Roadmap—Team Up For Life" process, comprising the following "STAR" categories: Spirit, Thought, Action, Results, and Surveillance, self-monitoring and or self-governance 413 (for monitoring Creative Ambitions and/or Creative Action or Dwelling Time, DT). Each thought or action may receive input from a "CA·rs" category, wherein the CA·rs categories are Creative Ambitions and/or Creative Actions or sustained right actions, Recreation and Survival. FIG. 6 depicts External Synergistic and Internal Creative Inputs to the CA·rs categories, wherein the inputs may be possible or potential old and new brain activities and the student may be taught to identify the activities as old and new brain activities and to characterize the inputs into new brain Creative Ambitions and/or Creative Actions or sustained right actions by increasing his dwell time for new brain activities. External Synergistic Input may be input from a source "outside of" and "external to" the student that creates an enhanced combined effect. The student may be instructed to find External Synergistic Input from a book, work of art, a person who is a kindred spirit, a person who is a professional colleague, a person who is a loved one, another student, and combinations thereof. The External Synergistic Input may be suggestions and inspirations for Creative Ambitions and/or Creative Actions or sustained right actions for the student when it is the External Synergistic Input to the CA·rs categories. Cooperative interactions or sustained right actions between agencies such as the student and the External Synergistic Input may result in "synergism," where synergism means a simultaneous action of separate agencies that, together, have greater total effect than the sum of their individual effects. Internal Creative Input may be input arising from within the student resulting from instructing the student to be original, expressive, artistic, clever, cool, demiurgic, deviceful, fertile, formative, gifted, hip, ingenious, innovational, innovative, innovatory, inspired, inventive, original, originative, productive, prolific, stimulating, visionary, and imaginative that may be suggestions and inspirations for Creative Ambitions and/or Creative Actions or sustained right actions for the student when the Internal Creative Inputs are input into the CA·rs categories.

The combined inputs from External Synergistic and Internal Creative Inputs may be a talent pool that may be a total talent that results from allocating to the STAR Steps as depicted in FIG. 6, supra, when the student, such as the sales personnel, is instructed in step 115 of the method 1, supra. Thus, the present invention provides a method and system for teaching students, such as sales personnel, to achieve success in meeting goals that effect their spiritual, emotional or physical well-being.

Figure 7:
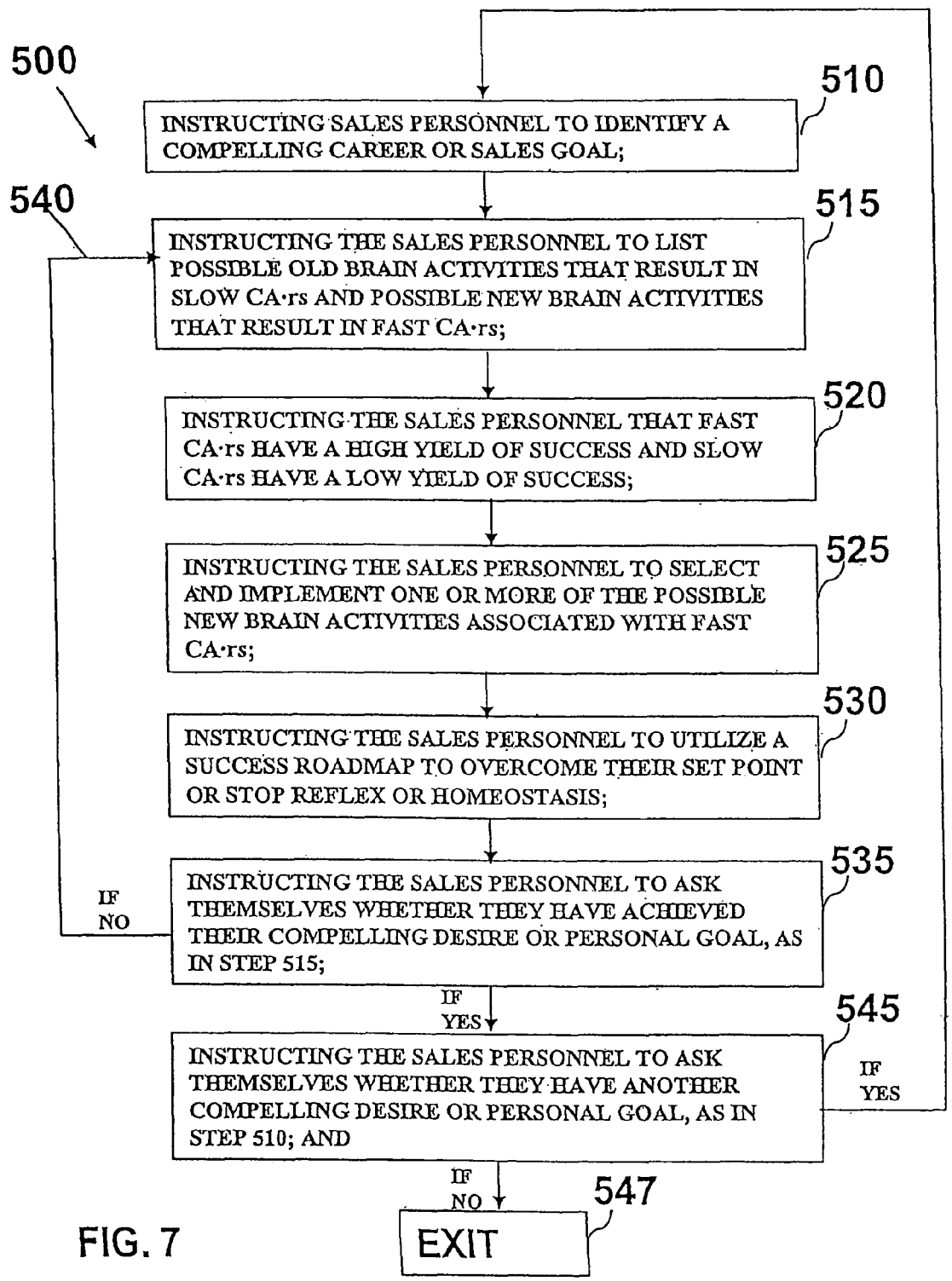
FIG. 7 depicts an overall flowchart of a method for teaching success to a student, such as sales personnel, according to the present invention.

FIG. 7 depicts a flow chart of a method 500, for teaching success to students, such as sales personnel, such as, for example, to students, such as sales personnel, who sell medical treatment compositions or devices to buyers, such as druggists, physicians, osteopathic medical service providers such as physicians' assistants, registered nurses, or licensed practical nurses if such osteopathic medical service providers may be under the supervision, control and responsibility of a licensed osteopathic physician, other physicians' assistants, pharmacists or support staff of physicians, hospitals, clinics or pharmacies. The method 500 comprises: a step 510, instructing the students, such as sales personnel to identify a compelling career or sales goal; a step 515, instructing the students, such as sales personnel, to list possible old brain activities that result in SLOW CA·rs and possible new brain activities that result in FAST CA·rs; a step 520, instructing the students, such as sales personnel, that FAST CA·rs have a high yield of success and SLOW CA·rs have a low yield of success; a step 525, instructing the students, such as sales personnel, to select and implement one or more of the possible new brain activities associated with FAST CA·rs; a step 530, instructing the students, such as sales personnel, to utilize a success roadmap to overcome their set point or their stop reflex or their natural biological tendency maintain their set point that we have termed homeostasis; a step 535, instructing the students, such as sales personnel, to ask themselves whether they have achieved their compelling desire or personal goal; a step 540 repeating steps 510-535 if the students, such as sales personnel, answer in the negative that they haven't achieved their compelling desire or personal goal; a step 545, repeating steps 505-545 if the students, such as sales personnel, answer affirmatively that they have another compelling desire or personal goal, such as to achieve a new success; and a step 547, exiting the method 500 if the students, such as sales personnel, answer in the negative that they have another compelling desire or personal goal.

The medical treatment compositions may be pharmaceutical products, such as drugs. The medical treatment devices may be diagnostic equipment, such as, temperature or blood pressure monitoring equipment, such as manometers, thermometers, specimen containers, sterile dressings, equipment for analyzing blood, urine or other body fluids such as for performing chemical testing such as for drug concentrations, equipment for analyzing blood, such as for counting red and white cells. Alternatively, the medical treatment devices may be instructional aids such as audio visual presentations such as videos or cassettes. The instructional aids may provide information on the benefits of the medical treatment compositions, such as for treatment of mental conditions or diseases, or instruction for administering the medical treatment compositions to patients, instruction on the use of medical treatment devices, or data about the medical treatment compositions and devices. Alternatively, the method 500 could be used for teaching success to any appropriate student, such as a sales person selling products that may be characterized as having at least one drug or chemical composition or at least one medical treatment device. Hereinafter, the medical treatment compositions or devices are known as "medical treatment products." The appropriate student, such as a sales person may be any sales person selling any medical composition or medical device meant for treatment of humans or other animals such as pets or other animals under a human's care.

Figure 8:
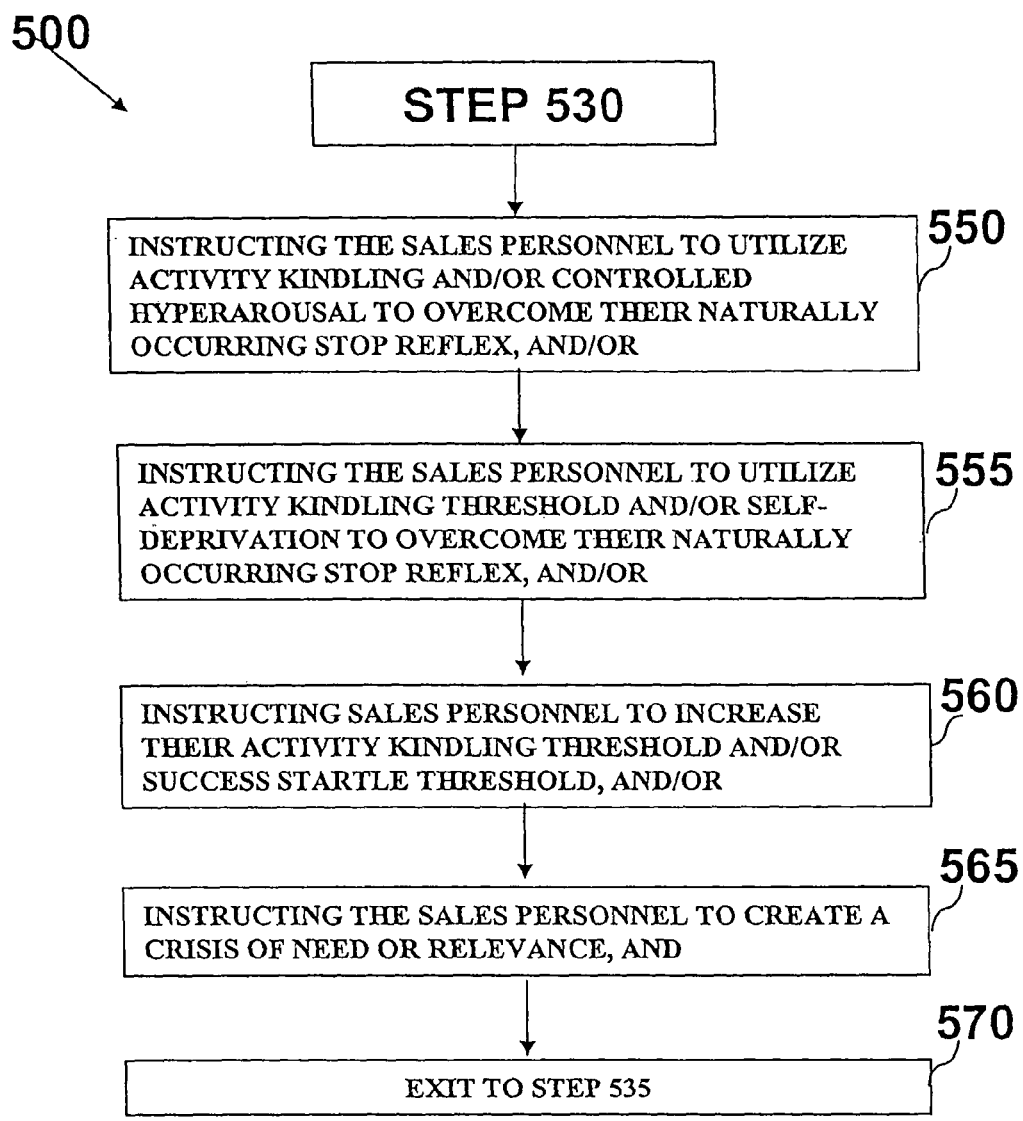
FIG. 8 depicts a method for using techniques to overcome the stop reflex in students, such as sales personnel, according to embodiments of the present invention.
Figure 9:
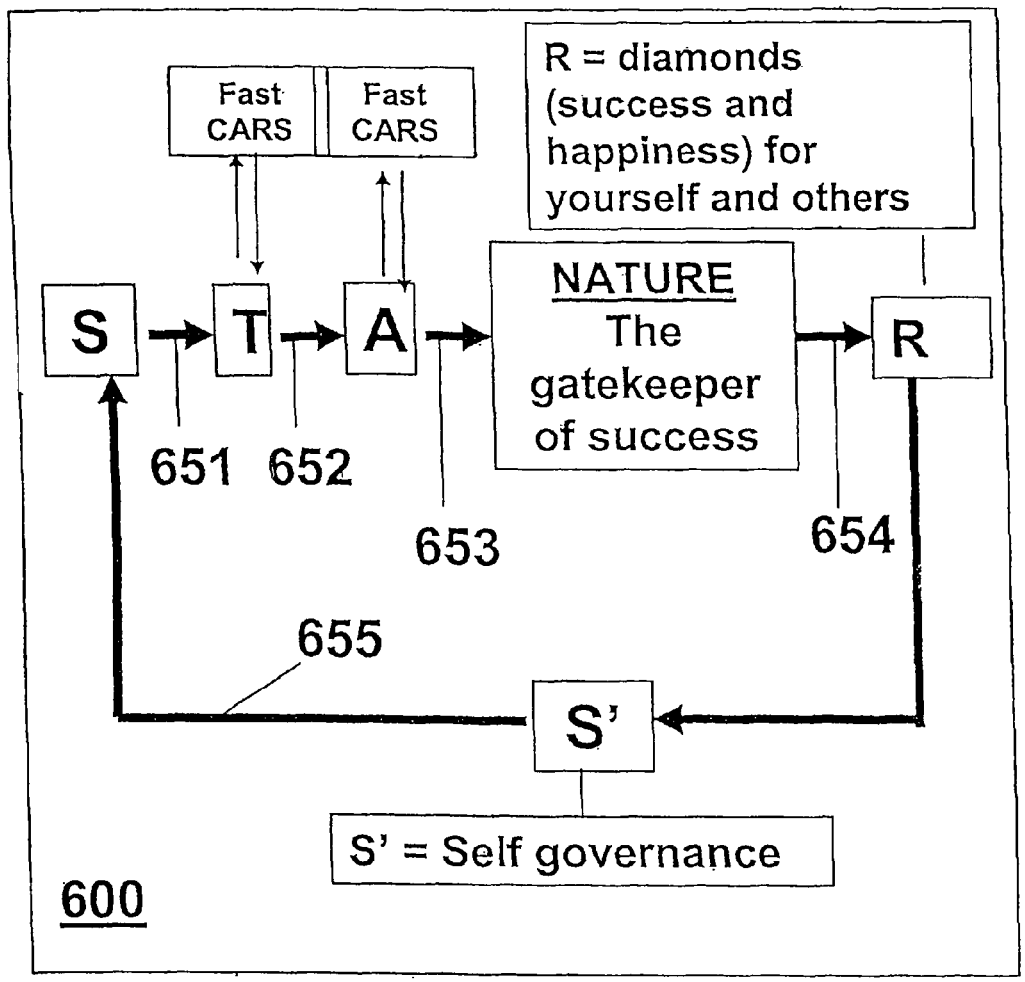
FIG. 9 is a pictorial representation illustrating a Success Roadmap for students, such as sales personnel, according to the present invention.

FIG. 8 depicts embodiments of the step 530 of the method 500, "instructing the students, such as sales personnel, to utilize the success roadmap 50 as depicted in FIG. 1E supra, 414 as depicted in FIG. 6 supra or 600 as depicted in FIG. 9, and described infra, to achieve FAST CA·rs," comprising: a step 550, instructing the students, such as sales personnel, to utilize activity kindling or controlled hyper-arousal to overcome a naturally occurring stop reflex in themselves or their customer; or a step 555, instructing the students, such as sales personnel, to utilize self-deprivation to overcome, suppress or override their naturally occurring stop reflex in themselves or their customer; or a step 560, instructing the students, such as sales personnel, to increase their success startle threshold or activity kindling threshold; or a step 565, instructing the students, such as sales personnel, to create a crisis of need or relevance; and a step 570, instructing the students, such as sales personnel, to proceed to the step 535 of the method 500.

In the step 550, the sales personnel is taught that utilizing the activity kindling or controlled hyper-arousal to overcome the naturally occurring stop reflex in their customer may include utilizing association hyperarousal, that may fuel behavior of their customer to use a product. The sales personnel may be taught to intensify the association hyperarousal of their customer by making it easy for the customer, such as a physician, to obtain information about a drug, such as, for example, by accessing the manufacturer's web site, thereby increasing the customer's attachment and inducing the customer to "buy-in" to their product.

In the step 550, the sales personnel may be taught that utilizing the activity kindling or controlled hyper-arousal to overcome the naturally occurring stop reflex in their customer, such as a physician, may include positive comments from patients and families about the product, that cause the customer to have a positive feeling that results from being identified as a "smart doctor", fewer call-backs from patients for the customer and the customer's staff to manage, and combinations thereof.

In the step 555, the sales personnel is taught that utilizing self-deprivation to overcome, suppress or override the naturally occurring stop reflex in their customer includes utilizing self-deprivation of their customer, wherein the sales personnel may be taught that utilizing self-deprivation of their customer may include giving up perks given by alternative suppliers of a product that the sales personnel sells.

FIG. 9 depicts a success roadmap 600, that the student, such as the sales personnel, may have been taught to use as in the steps 530-570 of the method 500, infra, in order to overcome a set point, or a stop reflex or homeostasis in order to overcome their natural resistance to change, such as, for example, the Natural Protective Resistance (NPR) to change or novelty. Students, such as the sales personnel, may be instructed to achieve their compelling desire, their personal goal and success by instructing them to utilize the Success Roadmap 600. As defined in the present invention, "STARS" is an acronym, wherein "S" represents said students' "Ideal Self," and/or "Spirited Living or Sustained Spirit Energy," "T" represents said students' "thoughts or sustained right thinking," "A" represents said students' "actions or sustained right actions," or "activities" and "S'" in the acronym represents "surveillance," "self-monitoring," and/or "self-governance." As defined in the present invention, instructing students to utilize "STARS" means instructing them to power their thoughts or sustained right thinking, "T", "actions or sustained right actions," "A", and "results," "R," inter alia, from the students' creative energy of their "Ideal Self" and/or "Spirited Living or Sustained Spirit Energy." As defined in the present invention, the method, wherein the students' thoughts or sustained right thinking, "T", "actions or sustained right actions," "A", and "results," "R," are powered by their creative energy of their "Ideal Self" and/or "Spirited Living or Sustained Spirit Energy" and subsequently subjected to "surveillance" and/or "self-monitoring" and/or "self governance," "S'" may include the steps 651-655 of the Success Roadmap 600, as depicted in FIG. 9, and described in associated text and may be named "FAST CA·rs MAKE HOLLYWOOD STARS." The FAST CA·rs are the students' creative energy that may be inputted into "S," "T." "A," to fuel or power creative spirit ("S"), thoughts ("T"), and Actions ("A"), as depicted by the arrows in the direction from the FAST CA·rs toward "S," "T," and "A." Alternatively, the "S," "T," and "A" may provide right spirit, right thoughts and right action, respectively, to fuel or power re-distribution of the students', such as sales personnels', creative energy toward their Creative Ambitions, CA to achieve their FAST CA·rs, as depicted by the arrows in the direction from the "S," "T," and "A" toward their respective FAST CA·rs. Hollywood STARS include all their extraordinary successes. As defined in the present invention, the term "Fast CA·rs Make Hollywood STARS" is a slogan that may mean the students' extraordinary successes, i.e., Hollywood STARS, may depend upon their ability to access their creative energy Fast CA·rs. Students may become a STAR by never allowing their minds to dwell upon either, too much partying (recreation), or excessive concerns about their survival. Students may become STARS by centering their minds and actions upon pursuits of a creative nature.

In some embodiments success may require the interaction of the students' Spirit and mind (Thoughts) to set off a sequence of Creative Actions, CA, that bind together the students' desired Results under their watchful Surveillance and/or Self-monitoring and/or Self/governance.

In some embodiments, "STARS" includes powering the students' thoughts or sustained right thinking, "T" and "actions or sustained right actions," "A" by providing the students' creative energy from FAST CA·rs resulting from the Success CA·rs redistributions 15, 16, and 35, as depicted in FIGS. 1C, 1D, and 1F, as depicted, infra, and described in step 115 of the method 1, as depicted in FIG. 1A, supra.

EXAMPLE 1

Use of the Success Roadmap 600 as in the step 530 of the method 500 when the students', such as the sales personnels' desire or personal goal is compelling.

Referring to FIG. 9, the students, such as sales personnel, may be taught to explore their Soul or Spirit "S" as the ultimate source of all their successes or Results "R". The students, such as sales personnel, may be asked "What do George Washington, Denzel Washington, and Madonna all have in common?" The students, such as sales personnel may be taught that passion geared toward the specific thing, i.e. Results "R," made people such as, for example, George Washington, Denzel Washington and Madonna so successful. The students, such as sales personnel may be taught "to find your own passion." The students, such as sales personnel, may be taught to ask themselves, "What's going to stir you? What's going to jazz you up and what is the thing that you can't, or you don't want to go through life and not accomplish?" The students, such as sales personnel, may be taught to explore their Soul or Spirit "S" as the ultimate source of all their successes, i.e. Results "R". The students, such as sales personnel, may be taught a method 700 for aligning their goals with their passion, comprising a step 710, in which the students, such as sales personnel, may be asked to create a "must" list of things they want to accomplish before their life is over. For example, in the step 710 of the method 700, the students, such as sales personnel, may complete the statement: "Before my life is over I must _____, wherein the students, such as sales personnel, may complete the statement verbally or in writing. The students, such as sales personnel, may be taught that intuitively, they know what their goals are. They may be warned that a lot of people may say, "I don't know what my goals are, or I don't know what I want to do." The students, such as sales personnel, may be taught that they may identify more than one compelling desire or personal goal, and that the goals may not be related, have a common theme, be in harmony with the other identified goals, or lead them to the same place. Alternatively, the goals may arise as remedies for dissatisfaction or sources of happiness. Repairing, re-establishing or creating relationships, losing weight, changing professions or occupations, learning a new skill, earning a degree, community service, becoming a caregiver, developing a talent are examples of compelling desires and personal goals. In the step 720 of the method 700, the students, such as sales personnel, may be taught to challenge the statement in order to test whether the stated goal is a compelling goal or personal desire. Alternatively, in the step 720 of the method 700, the students, such as sales personnel, may be taught to challenge each other, whether in order to test whether the stated goal is a compelling goal or personal desire? If the students, such as the sales personnel, determine that their goal is compelling, the students, such as the sales personnel may be instructed to proceed to the step 730 of the method 700, in which the students, such as sales personnel, may be taught to get into and maintain a state of passion. The key to success might be summarized in one word, passion. If you get into and maintain a state of passion, you'll experience everything else in life as a distraction. Passion creates focus. It is power. Passion knows not fear, guilt or shame. Passion is a stranger to self-doubt and inadequacy. It draws you towards creativity and creativity generates action. Passion is wasted on no one and herein lies the danger of suppressing passion. If you continue to ignore you calling in life, then eventually your flame of passion will die. Although the embers of your passion will continue to glow, eventually the light extinguishes and your passion dies. In time your spirit also dies. You then become an empty shell of your true self, awaiting the passage of time until your death. Your heart aches with sadness and longing for the bright future that could have been. You mourn the past and long for the possibilities of a future vibrant and full of life, a future filled with success and laughter. In the step 740 of the method 700, the students, such as sales personnel, may be taught to take action.

Alternatively, if the students, such as the sales personnel, determine that their goal is not compelling, the students, such as the sales personnel may be instructed to proceed to the step 750 of the method 700, in which the students, such as sales personnel, may be taught to get into and maintain a state of passion even if they are not certain that their goal or desire is compelling. Hereinafter, a not compelling goal may be vague or not clearly formed in the students', such as the sales personnels' mind.

EXAMPLE 2

Referring to FIG. 9, Use of the Success Roadmap 600 as in the step 530 of the method 500 when the students', such as the sales personnels' desire or personal goal may not be compelling.

Figure 11:
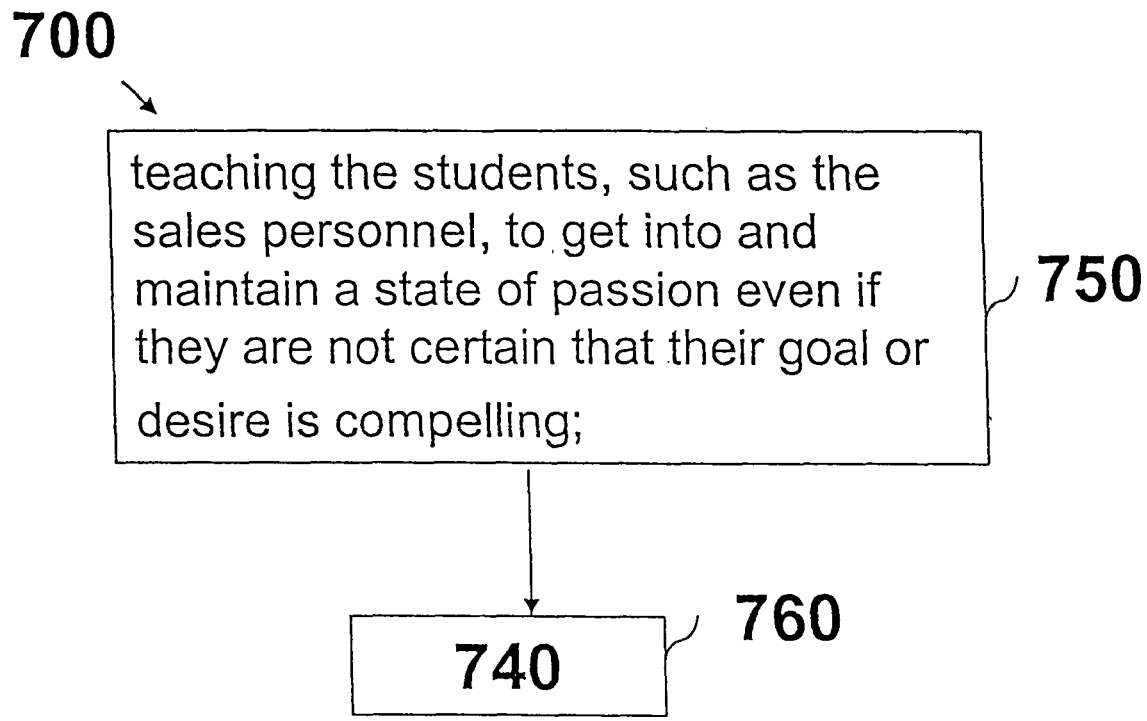

FIGS. 10 and 11 depict the method 700 for teaching success. In the step 750 of the method 700, the student, such as the sales personnel may be instructed to determine whether they have a sense of something they want to do, and to determine whether they have a enough passion, i.e., to follow the steps 651-655 of the Success Roadmap 600, as depicted in FIG. 9 and described in associated text, herein. In some embodiments, success means taking action, as in the step 740 of the method 700. In the step 730 of the method 700, the student, such as the sales personnel, may be instructed start determining whether they have passion. The student, such as the sales personnel may be instructed that determining whether they have sufficient passion to act in the step 730 of the method 700 is for the student to state, "Okay, time is expiring and we are too." In the step 730, the students, such as the sales personnel may be instructed to determine whether they can start making some evaluation, some assessment whether time is running short to accomplish their compelling desire or personal goal. For example, the students, such as the sales personnel may be instructed to just go to the library and just explore something. Alternatively, the students, such as the sales personnel may be instructed to sit down with someone and talk through a vague general goal or desire that they have. In the step 740, the students, such as the sales personnel, may be instructed to ask "is there some specific action they can start to take because it's a question of creating momentum. In the step 740, the students, such as the sales personnel, may be instructed they don't have to think they have their goal or desire fully formed in their minds. For example, in the step 740, they don't' need to know "I've got to know that I want to go and get a Ph. D. in astronomy and then I've got to go off to university." In the step 750, the students, such as the sales personnel, may be instructed to get into and maintain a state of passion even if they are not certain that their goal or desire is compelling. In the step 760, the students, such as the sales personnel, may be instructed to go to step 740, i.e., to ask is there some specific action they can start to take even if they are not certain their identified goal is compelling or a personal goal.

EXAMPLE 3

Use of Self-Modeling in the Success Roadmap 600 as in the step 530 of the method 500.

Figure 13:
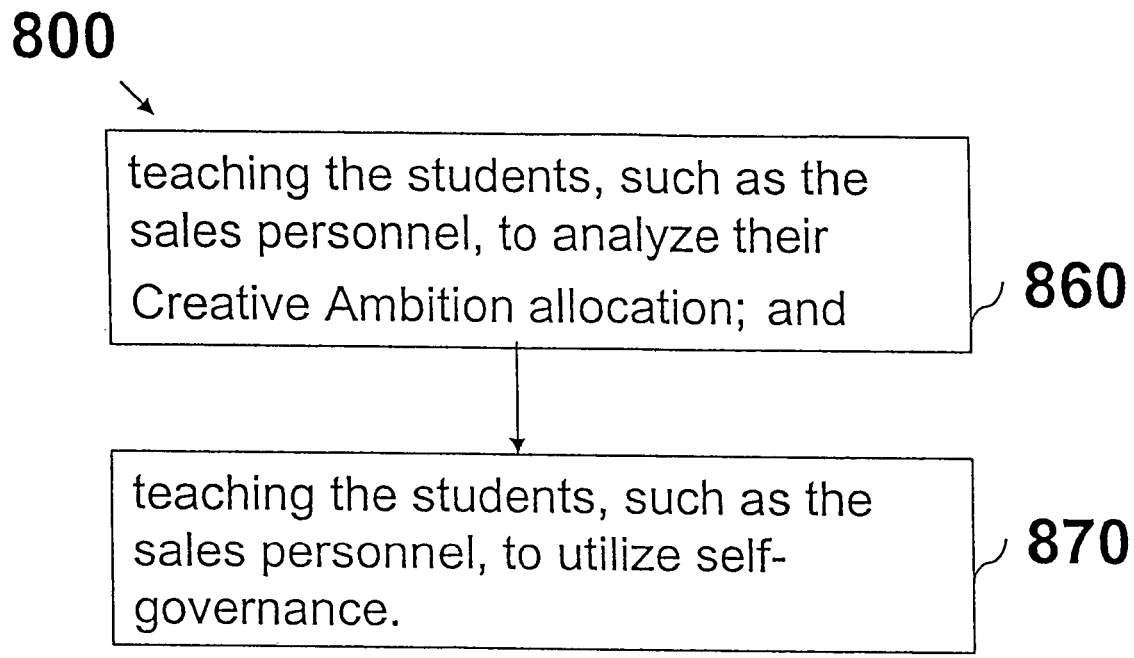

FIGS. 12-13 depicts a method 800 for teaching success to a student, such as sales personnel, using Self-Modeling in the Success Roadmap 600 as in the step 530 of the method 500. In the step 810, the student, such as sales personnel, may be instructed to reflect all the successes . . . big and small . . . you've already accomplished in your life. In so doing, I hope that you realize that you are no stranger to success. In the step 820, the student, such as sales personnel, may be instructed to determine where you are at, at this moment. In the step 820, the student such as sales personnel, may determine a starting point, i.e., point "A." The starting point is their current level of accomplishment of their compelling desire or personal goal. In the step 820, the student such as sales personnel, may assess what's working in their lives, and what's not. In the step 820, the student, such as sales personnel, may be taught that those areas which may not be working may be areas that need improvement . . . that those areas that may not be working may become their lever or opportunity for creating success. In the step 830, the student such as sales personnel, may be taught to determine where they'd like to be, or, define their success goals. The latter point, where they'd like to be, may be called their point "B," their destination. The students should be taught that they don't want to get into their car and not knowing where they are heading, i.e., not knowing where their point B or destination may be. Neither do they want to follow steps 651-655 as in the success roadmap, 600, as in FIG. 9, not knowing where they are heading, i.e., not knowing where their point B or destination may be. In the step 830, the student, such as sales personnel, may be taught to identify the people in their support community who may really help them here, by asking questions and challenging them, such as, for example:

"Why are these goals important to you?"

"How will they make you happier than you are now?"

"What are the personal and global payoffs of your success goals?"

In the steps 810-830, the student, such as sales personnel may be taught that once they've determined point "A" and "B"—they can then begin their journey to success, in accordance with the steps 651-655 of the success roadmap 600, as in FIG. 9. In the step 840, the student, such as sales personnel, may be taught to determine "sustained activities" that will lead them to their success. A "sustained activity" is one that may be maintained or "kept in existence" for a long duration. For example, moderately paced, sustained activities promote weight loss more effectively than brief, high-intensity health club workouts based on the "no pain, no gain" mantra. Walking, bicycling, even climbing stairs during TV commercials can contribute to weight loss if performed consistently, the researchers said. The activities can be as simple as parking at the far end of the mall and walking the long route to the store. Determining the sustained activities, as in the step 840 can be a difficult process. But again, your group can provide you with a lot of insight and feedback here . . . someone might suggest a method or approach that you never would have thought of before- and that might spark an idea in someone else. Before you know it, you have built up a whole list of sustained activities that can put you on the road to achieving your success, as in the steps 651-655 of the roadmap of success 600 and step 840 of the method 800. After the student, such as sales personnel, have identified at least one sustained activities in, for example, a list, the next step 850 in the method 800 should be for the student, such as sales personnel, and their group to recognize the strengths they already possess that may assist them in achieving their success goals. The step 850 may be called self-modeling success. In the step 850, the student, such as sales personnel, can learn from themselves and from their past successes. And self modeling, as in the step 850 of the method 800 may provide a boost or advantage for a new success endeavor. In the step 860, the student, such as sales personnel may be taught to take inventory on how they're currently allocating their daily energy, and analyzing where there is room to reallocate or shift their energy away from survival "s" or recreation "r" wasteful activities, toward their creative ambitions or creative activities "CA", that is, removing their feet from the brakes. Students, such as sales personnel, may be taught to want to take their feet off the brakes and move towards activities of Creative Ambition, "CA", as depicted in FIG. 8, supra. Students, such as sales personnel, may be taught that performing the Success CA·rs redistributions 15 and 16, as depicted in FIGS. 1B and 1C and described supra, may result in success in achieving their personal goals. Alternatively, in the step 860 of the method 800, the student, such as sales personnel, may be taught to "marshall or husband" their total energy to allocate more energy toward Creative Ambitions or Creative Activities, CA. "Husbanding or marshalling" their energy in the step 860 of the method 800 means the student, such as sales personnel, may find they don't need 8 hours of sleep every night. Maybe they only need 7.5 hours. Well, by reducing their sleep by just a half hour each night, they've created three and a half extra hours for themselves each week to engage in success-oriented activities.

Referring to FIGS. 7-9 and the step 655 of the success roadmap 600, supra, in the step 870 of the method 800, the student, such as the sales personnel may be taught to utilize self-governance. Self-governance occurs when the students, such as sales personnel, take active control of their creative energy, their creative ambitions, CA, their focus and their thoughts to channel their actions towards creating the results you desire. For example, if the students, such as sales personnel, need to increase their sales to, for example, the prescribing physician, they may be taught in the Success Roadmaps 50, 414, and 600, that their stop reflex may cause them to stop moving along the paths of the success maps 50 and 414, and 600, such as getting stuck in the at least one of the steps 51-56 of the Success Roadmap 50, or the steps indicated by the perpendicular lines between the STARS categories: Spirit, Thought, Action, Results, and Surveillance, self-monitoring and or self-governance 413 of the Success Roadmap 414, or getting stuck in the at least one steps 61-65 of the Success Roadmap 600. In the steps 51-56 of the Success Roadmap 50, in the step 413 of the Success Roadmap 414, in the step 655 of the Success Roadmap 600, the student, such as the sales personnel, may be taught self-governance in order to overcome a set point, or a stop reflex or homeostasis in order to overcome their natural resistance to change, such as, for example, the Natural Protective Resistance (NPR) to change or novelty. This is self-governance. The best way for the students, such as the sales personnel, to achieve self-governance, as in the steps 51-56 of the Success Roadmap 50, in the step 413 of the Success Roadmap 414, in the step 655 of the Success Roadmap 600, is to teach the students, such as the sales personnel to maintain a balance in favor or redistributing their creative energy such that their Creative Ambitions and Creative Activities "CA" are favored over survival "s" or recreation "r". For example, teaching the students, such as the sales personnel, that maintaining this balance favorable to CA is what they are trying to achieve. As the students, such as the sales personnel, actively increase the CA activities that promote their success and achieve their goal, the students, such as the sales personnel, need to simultaneously decrease those activities that are not contributing to thier success and are not essential to their survival. In a sense, "maintaining this balance" means trade "instant pleasures" for "long term pleasures." For example, Apple Pie is a symbol for short term pleasures because the pleasure only lasts while you are enjoying its sweetness and other good tastes. Alternatively, diamonds are a symbol for long term pleasures, such as achieving compelling desires or personal goals, because diamonds last forever. The students, such as the sales personnel may give up the short term pleasure of working fewer hours for the long term pleasure of knowing you have increased your sales two months from now, by working longer hours in order to make personal contacts with, for example, the prescribing physician. Alternatively, the students, such as the sales personnel may give up the short term pleasure of eating a piece of cake for the long term pleasure of knowing how great you will look at a class reunion or a wedding two months from now. "Maintaining this balance" means shifting the students', such as the sales personnel's enjoyment away from short term pleasures such as lying on the couch to indulge their long term pleasures such as Creative Ambitions, CA, by working-out or exercising at a sustained frequency, such as, for example, daily. Of course it is always a challenge to take the steps 810-870 of the method 800. How do you get yourself off the couch into the gym? It is the same question of how do you get used to driving a racecar at 160 mph when you are only used to driving your car at 60 mph. First of all, your desire to change must be compelling enough. For example, once you have determined that looking great for a wedding or your class reunion in two months is extremely important to you, you have conquered the first obstacle. However, the next step is to figure out what you need to do to get to your goal, by putting your brain on notice that you must change, you will set success in motion, in accordance with the steps 810-870 of the method 800.

In the steps 810-870 of the method 800, the student, such as sales personnel may be taught to challenge themselves to ask: "Which is more important to you? Long term pleasures such as Diamonds or short term pleasures such as apple pie?" In the steps 810-870 of the method 800, the student, such as sales personnel may be taught that the self-deprivation, and self-sacrifice, i.e. foregoing short term pleasures, such as instant gratification or Apple Pie that may be required to achieve the results "R" along the route of the success roadmap, as in the steps 51-56 of the Success Roadmap 50, in the Spirit, "S", Thought, "T," Action, "A," and Results, "R" steps of the Success Roadmap 414, and in the steps 651-655 of the Success Roadmap 600, may be to teach the students, such as the sales personnel that they may not need to continue the deprivation, and self-sacrificing at the same high level in order to maintain their new success, i.e., their Point B.

In the steps 810-870 of the method 800, the student, such as sales personnel may be taught to pay attention to how important trophies are in our culture and in our lives. We like to honor great performances. There is:

The Stanley Cup for the best hockey team

The Academy awards for best actor

The Pulitzer prize for literature
The Nobel prize for contributing to world peace
The list goes on and on.

In the steps 810-870 of the method 800, the student, such as sales personnel may be taught that accomplishing their goal makes them feel good. In the steps 810-870 of the method 800, the student, such as sales personnel may be taught that they all want to be the best at something or at least to know that in life, they have given their best! The personal goal may be being the best stay home mom, the best quarterback, the best trombone player or the greatest president. In the steps 810-870 of the method 800, the student, such as sales personnel may be taught that these are all worthwhile goals.

In the steps 810-870 of the method 800, the student, such as sales personnel may be taught that always doing your best and giving your best in every endeavor matters. In the steps 810-870 of the method 800, the student, such as sales personnel may be taught to determine how safe do they want to play it, when they are challenged. Of course, achieving creativity and success using the steps 810-870 of the method 800 usually requires the students, such as sales personnel, some type of risk taking. And they need to be conscious of that. But, the students, such as sales personnel, may be taught to ask themselves, "do they want to drive the roadmap to success 50, as depicted in FIG. 1E, supra, the Success Roadmap 414, as depicted in FIG. 6, supra, or the Success Roadmap 600, as depicted in FIG. 9 supra, in an armor-plated tank? In the steps 810-870 of the method 800, the students, such as sales personnel, may be taught to determine how safe do they need to be? If they can you get comfortable with getting into a Ferrari and stepping on the gas, this is what they need to do in order to accelerate their successes, in accordance with the steps 810-870 of the method 800. In the steps 810-870 of the method 800, the students, such as sales personnel, may be taught to bring along their success team, since going on a trip all alone isn't so much fun. You can always use the support of a good friend to make the journey through steps 810-870, as in the method 800, that much easier. In the steps 810-870 of the method 800, the students, such as sales personnel, may be taught working in groups makes the journey through steps 810-870, as in the method 800, that much easier. In the steps 810-870 of the method 800, the students, such as sales personnel, may be taught their success team can be an amazing source of support and inspiration. In the steps 810-870 of the method 800, the students, such as sales personnel, may be taught their success team can help keep them on the roadmap of success 50, as depicted in FIG. 1E, supra, the Success Roadmap 414, as depicted in FIG. 6, supra, or the Success Roadmap 600, as depicted in FIG. 9 supra. In the steps 810-870 of the method 800, the students, such as sales personnel, may be taught, at times when they are confronted with the choice of trading short-term pleasures for long-term pleasure, to ask, "Are they willing to give up diamonds for apple pie?"

Figure 14:
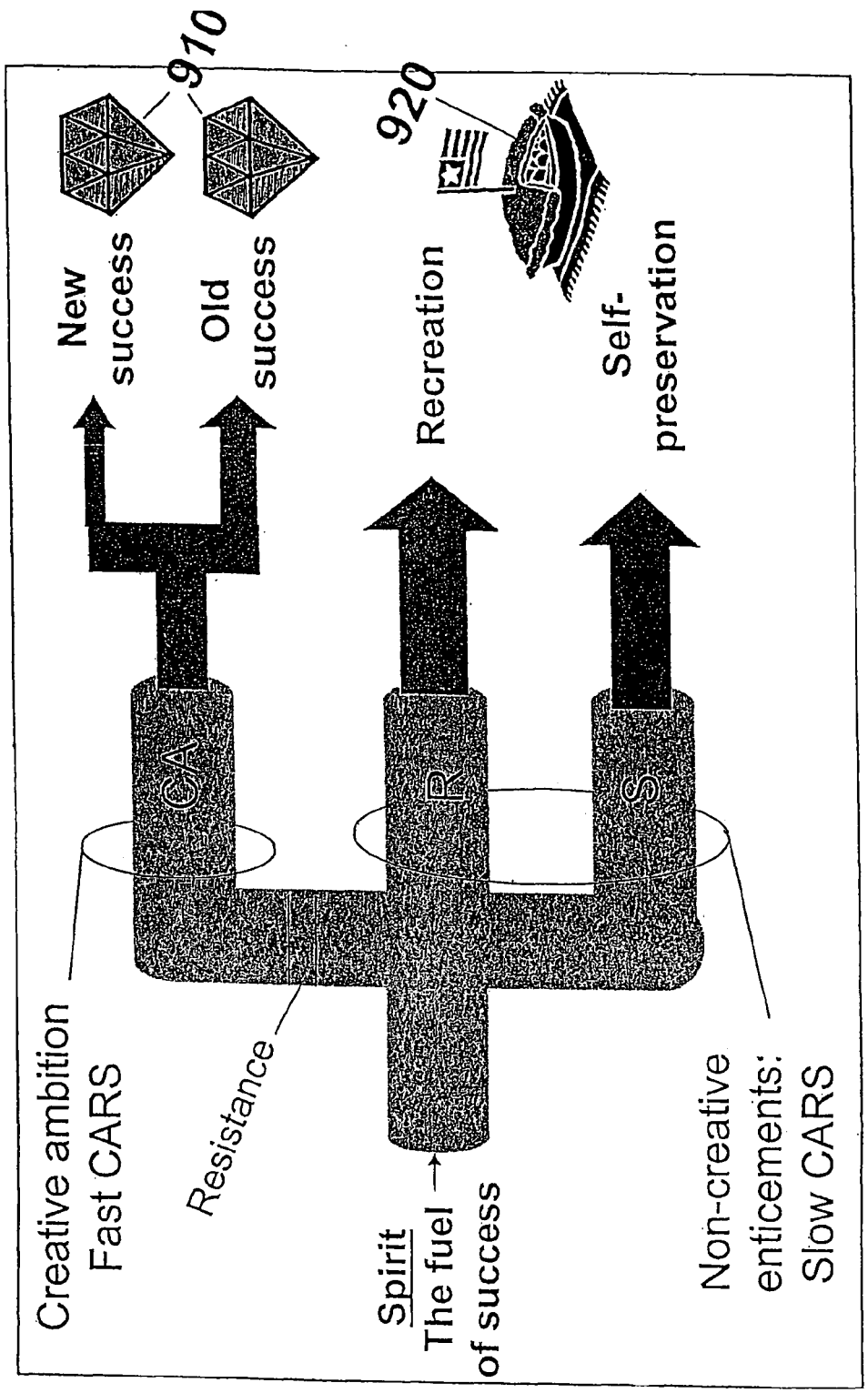
FIG. 14 depicts a process for re-allocating creative energy, according to the present invention.

FIG. 14 depicts a process 900 for re-allocating creative energy, such as, for example, Spirit, The Fuel of Success, into Creative Ambition Fast CARS or into Non-Creative Enticements: Slow CARS, wherein CA arrows indicate a direction of flow of the creative energy to fuel the symbols "diamonds" 910 that symbolize long term pleasures such as New Successes and Old Successes, and R and S arrows indicate a direction of flow of the creative energy to fuel the symbols "Apple Pie" 920 that symbolize Recreation, "r" and Survival, self preservation, self-gratification, and short term pleasures, "s". Risistance is shown as a restriction for creative energy that may be directed to CA.

Referring to FIGS. 12-13, "Apple pie certainly is nice—it is sweet (which is the element of instant pleasure) and it will satisfy my hunger (the survival, or Self-preservation aspect, s,). In the steps 810-870 of the method 800, the students, such as sales personnel, may be taught to conclude they are after something that is solid and long lasting; to conclude, "I want that trophy called success. Once I eat apple pie, it is consumed and nothing's left, while, diamonds are forever."

In one embodiment of the step 530 of the method 500 as depicted in FIG. 8, students, such as sales personnel, may be taught that performing the Success CA·rs redistributions 15 and 16, as depicted in FIGS. 1B and 1C and described supra, may result in success in achieving their personal goals. Students, such as sales personnel, may be taught that performing the Success CA·rs redistributions 15 and 16, may result from increased use of the new brain activities and a decreased use of the old brain activities in their day to day lives, transforming their SLOW CA·rs to FAST CA·rs, in accordance with the method 500 of the present invention.

Old brain activities of the sales personnel may be selected from the group consisting of lack of an understanding of what forces motivate individual prescribing physicians, lack of confidence, lack of self-esteem, poor morale, rejection sensitivity, the students, such as sales personnel not knowing their true worth to the physician, not buying into a sales message or philosophy, impatience or too easily discouraged, fear of using support systems, fear of exposure, and combinations thereof.

New brain activities of the sales personnel may be selected from the group consisting of diligently applying techniques of creative self-governance to increase success efficiency, feeling attached to the product that the sales personnel sell, having a positive attitude, overcoming rejection and combinations thereof.

Teaching sales personnel to overcome rejection may include teaching them to breach a communications gap or teaching them to have empathy or to improve reliability. Teaching sales personnel to breach the communications gap may include teaching them to read between the lines in conversations with the prescribing physician and teaching them how to perceive what has been unspoken. Teaching the sales personnel to have empathy may include teaching them to understand that prescribing may be based upon habit or folklore, to understand that physicians may be inundated or overwhelmed with problems with practice management and patient management, to understand that physicians feel they have been marketed to death, to understand that physicians have a fear of trying something new, to understand that physicians have a resentment or anger towards the entire pharmaceutical industry, and combinations thereof. Teaching the sales personnel to have empathy may include teaching them to overcome old brain activities of a prescribing physician that may include hostility, bitterness, skepticism, cynicism, burnout, disrespect towards the sales personnel, unwillingness to hear a message or to listen to the sales personnel, poor self confidence and combinations thereof. Teaching the sales personnel to have empathy may include teaching them to overcome old brain activities of a prescribing physician that include that the prescribing physician may be afraid of killing or harming his patients, afraid of being sued, afraid of being ridiculed by his colleagues, or the prescribing physician may be unwilling to forgo hidden incentives from HMOs not to prescribe.

In the step 530 of the method 500, the students, such as sales personnel, may be instructed to allocate more creative energy and Dwelling Time to power and achieve his or her Creative Ambitions and/or Creative Actions or sustained right actions and/or Success-Creative Activity, according to the Success CA·rs 15 and 16 redistributions as depicted in FIGS. 1B and 1C and described supra, to achieve their personal goals, success, happiness and legacy. When students, such as sales personnel, are instructed to allocate more Creative Ambition and/or Creative Actions or sustained right actions energy, $E_{CA}$, and Dwelling Time to power and achieve their Creative Ambitions and/or Creative Actions or sustained right actions and/or Success-Creative Activity in the CA·rs redistribution as depicted in FIGS. 1B and 1C, supra, and described herein, they may achieve their personal goals, success, happiness and legacy. In the CA·rs redistribution, the students, such as sales personnel, may increase his or her Creative Ambitions and/or Creative Actions or sustained right actions Dwelling Time, $DT_{CA'}$ relative to the student's, such as the sales personnel's Creative Ambitions and/or Creative Actions or sustained right actions Dwelling Time, $DT_{CA}$, as depicted in FIG. B, supra, and described in associated text. Hereinafter, Dwelling Time may be the time that the students, such as sales personnel, invest thinking about and performing any activity. Dwelling Time can be constructive or destructive. Constructive Dwelling Time may be rooted in Creative Ambitions and/or Creative Actions or sustained right actions and in Success-Creative Activity. Constructive Dwelling Time may be time that directly powers success. Destructive Dwelling Time may be rooted in self-preservation and recreation. Destructive Dwelling Time may displace Success-Creative activity. Students, such as sales personnel, may be taught to do surveillance and/or self-monitoring and/or self-governance, in which they are taught to optimize a probability of success of achieving their personal goals by monitoring their Constructive Dwelling Time. Students, such as sales personnel, may be instructed to perform the Success CA·rs redistributions 15 and 16, as depicted in FIGS. 1B and 1C and described supra, to de-emphasize recreation and survival activities by re-distributing and re-balancing their Dwelling Time so that more of the sales personnels' Success-Creative activity may be allocated toward Creative Ambitions and/or Creative Actions or sustained right actions. New brain activities are helpful in achieving the students', such as a sales person's personal goal; old brain activities are detrimental to achieving the student's, such as the sales person's personal goal.

In some embodiments of the present invention, in step 530 of the method 500, students, such as sales personnel, may be instructed to de-emphasize old brain activities by allocating more creative energy and dwelling time to power and achieve their personal goals and FAST CA·rs based on the listing of new and old brain activities that result in Fast CA·rs, listed in the step 515, supra, of the method 500.

FIG. 1H, supra, depicts an embodiment of the step 530 of the method 500, wherein the students, such as sales personnel, may be instructed to redistribute and rebalance their initial foreground creative energy, $FGE_i$, as in a Success CA·rs redistribution 35 in a direction of the arrow 37, as depicted in FIG. 1G, supra, and described herein. In FIG. 1H, the students, such as sales personnel, may have redistributed their initial foreground energy, $FGE_i$, such that $FGE_{CA}>FGE_{CA}$ to accomplish the students', such as the sales personnels' moment-to-moment thoughts or sustained right thinking and behaviors. Creative energy includes foreground creative energy. "Foreground energy" is a portion of the students', such as the sales personnels' creative energy that may be allocated to power in-progress activities in order to achieve the students', such as the sales personnels' personal goal. The students, such as sales personnel, may be instructed to distinguish between personal goals that may have an immediate need from personal goals that may be achieved later. In this foreground creative mode, a task executing in foreground is one able to accept input from and return output to the user in contrast to one running in the background. Normally, there may be more than one foreground task per sales person to be accomplished. Hereinafter, accomplishing more than one task per sales person may be termed "multi-resulting." In the foreground creative mode, instructing the sales personnel, as depicted in FIGS. 1G and 1H, supra, and described, herein, to allocate their "foreground energy" to accomplish their moment-to-moment thoughts or sustained right thinking and behaviors may avoid confusion that may result from multi-resulting.

FIG. 1H, supra, depicts an embodiment, Overcoming Resistance, of the step 530 of the method 500, comprising a step 550, instructing the students, such as sales personnel, to utilize activity kindling or controlled hyper-arousal to overcome their naturally occurring stop reflex, or a step 555, instructing the students, such as sales personnel, to utilize self-deprivation to overcome, suppress or override their naturally occurring stop reflex, or a step 560, instructing the students, such as sales personnel, to increase their success startle threshold or activity kindling threshold, or a step 565, instructing the students, such as sales personnel, to create a crisis of need or relevance. In the step 550, the students, such as sales personnel, may be instructed to utilize activity kindling or hyper-arousal to overcome their naturally occurring stop reflex that may be a barrier preventing allocation of their creative energy, $E_f$, in order to achieve their Creative Ambitions and/or Creative Actions or sustained right actions, as in a Success CA·rs redistributions 15, 16, and 35 as in FIGS. 1C, 1D and 1F, supra. Hereinafter, kindling means the electrophysiological changes that occur in the brain as a result of repeated intermittent exposure to a sub-threshold electrical or chemical stimulus (as one causing seizures) so that there develops a usually permanent decrease in the threshold or barrier to action or activity. Hereinafter, "hyper-arousal" means a state of elevated or increased alertness, focus, interest, awareness or wakefulness. "Hyper-arousal" may also mean an enhanced state of sensory sensitivity accompanied by an exaggerated intensity of behaviors whose purpose is to detect threats, for example, hyper-vigilance. Hereinafter, the "stop reflex" is a reflex that arises from the sales personnels' natural resistance to change, such as, for example, the Natural Protective Resistance (NPR) to change or novelty. The "stop reflex" may arise from homeostasis, a term that describes the sales personnels' bodies' natural tendency to preserve their physiological equilibria, such as, for example, a homeostatic regulator that preserves the current state of affairs, such as the body's ability and drive to maintain a constant fixed body temperature. The students, such as sales personnel, may prepare for action if they are threatened by the environment (or informed of an approaching pleasure or danger). The students, such as sales personnel, may activate reserves of energy that may be a barrier preventing allocation of their creative energy, $E_f$, to achieve their Creative Ambitions and/or Creative Actions or sustained right actions, as in a Success CA-rs redistributions 15, 16, and 35 as in FIGS. 1C, 1D and 1F, supra, and produce certain hormones such as adrenalin, which prepares the students, such as sales personnel, for conflict or flight, such as for example, the survival instinct reflex. This activation can be manifested in visible physiological reactions or sustained right actions of the students, such as the sales personnel. Heart beat and respiration rate of the students, such as the sales personnel, may quicken in the presence of emotion, perceived danger, or physical effort. The faces of the students, such as sales personnel, may turn red or pale and their bodies may perspire. The students, such as sales personnel, may experience shortness of breath, cold sweats, shivering, or trembling legs. In preparation for fight or flight, physiological change gets converted into feelings of anxiety which increase the anxiety and/or fear of the sales personnel. The anxiety and/or fear then become the resistance to creativity.

Homeostasis can be a voluntary response to paired stimuli, e.g., to drink when the students, such as sales personnel, may be thirsty, to eat when hungry, to put on clothing when cold, to open a window when the students, such as sales personnel, may be too warm, or involuntary response to paired stimuli, e.g. shivering, or sweating when the students, such as sales personnel, may have a fever or may be too cold or hot. Here, the "paired stimuli" mean the stimulus of the pleasure to drink in response to the stimulus to relieve the pain of thirst, the stimulus of the pleasure to eat in response to the stimulus to relieve the pain of hunger, etc. In either voluntary or involuntary cases of homeostasis, the students, such as sales personnel, may be taught that the likelihood that they may overcome the stop reflex of homeostasis may depend on their control of the "paired stimuli," that may be opposite human sensations such as pleasure and pain, hunger and satiety, or emotions, such as love and hate.

FIG. 1I, supra, may depict the students', such as the sales personnels' creative energy, such as their perceived pleasure, as in equation (1), supra, versus time that may power the sales personnels' Creative Ambitions. The students', such as the sales personnels' perceived pleasure is shown as being either greater than, equal to or less than the students', such as the sales personnels' activity kindling or de-kindling threshold or hyper-arousal or hyper-dearousal threshold versus time. Hereinafter, "activity dekindling threshold" and "hyper-dearousal threshold" are opposite of "activity kindling threshold" and "hyper-arousal threshold," respectively. The broken curve of FIG. 1I, supra, depicts activity dekindling or controlled hyper-dearousal, wherein a high r/s (i.e., high recreation, r, and/or survival, s,) activity having the sales personnels' creative energy inefficiently allocated to survival, s, and/or recreation, r, activity may be dekindled, i.e. directed below the "activity dekindling threshold" and "hyper-dearousal threshold" over time by instructing the students, such as sales personnel, to link the high r/s activity to a low perceived pleasure, that may be less than 50%, as defined in equation (1) supra. By instructing the students, such as sales personnel, to link the high r/s activity to the low perceived pleasure, the students, such as sales personnel, may be taught to stop doing the high r/s activity. It has been found that students, such as sales personnel will stop doing the high r/s activity when the perceived pleasure is less than 50%, resulting in directing the high r/s activity from an "activity field," as in FIG. 1I, to a thought field. In contrast, the solid curve of FIG. 1I depicts activity kindling or controlled hyper-arousal, wherein a high Creative Ambitions, CA, activity may be kindled, i.e. directed above the "activity kindling threshold" and "hyper-arousal threshold" over time by instructing the students, such as sales personnel, to recognize that the activity linked to the high Creative Ambitions, CA activity may have a high perceived pleasure, as defined in equation (1) supra. By instructing the students, such as sales personnel, to link the high Creative Ambitions, CA activity to the high perceived pleasure, the students, such as sales personnel, may be taught to start doing the high CA activity. It has been found that students, such as sales personnel, will start doing the high CA activity when the perceived pleasure is greater than 50%, resulting in directing the high CA activity from the "thought field" as in FIG. 1I, supra, to the "activity field," as in FIG. 1I, supra. It has been found that teaching students, such as sales personnel, to identify high CA activities that have a perceived pleasure greater than 50% enable them to gain leverage over barriers to implementation of the creative activities they have identified to help them achieve their compelling desire or personal goal. The technique in FIG. 1I, supra, may be used by the students, such as sales personnel, to transform their creative thought into creative action. FIG. 1I, supra, teaches the students, such as sales personnel, that Perceived Pleasure, as in equation (1), supra, may increase when the students, such as sales personnel, kindle their high CA activities resulting in doing the activities that the students, such as sales personnel, have identified may be required to achieve their compelling desires or personal goal, i.e. success. In like manner, FIG. 1I, supra, teaches the students, such as sales personnel, that Perceived Pleasure, as in equation (1), supra, may increase when the students, such as sales personnel, redistribute and re-balance their creative energy to allocate more creative energy to their Creative Ambitions, CA, thereby losing r/s, as depicted in FIG. 1I, supra. FIG. 1I teaches the students, such as sales personnel, to allocate r/s energy to provide the energy to transform their creative thought into creative action. It has been found that the loss in r/s energy may be equivalent to the gain in CA energy, which may also be equivalent to the gain in perceived pleasure energy.

It has been found that students, such as sales personnel, should increase activity kindling or hyper-arousal intensity to an activity kindling or hyper-arousal threshold level of perceived pleasure associated with an activity, in order to overcome the stop reflex due to homeostasis in order to cause students, such as sales personnel, to engage in the activity and/or carry it out. It has also been found that a likelihood that students, such as sales personnel, will engage in the activity may be proportional to an activity kindling level or a controlled hyper-arousal level of the students.

Therefore, in the step 550 of the method 500, as depicted in FIG. 8, supra, students, such as sales personnel, may be taught activity kindling or controlled hyper-arousal techniques and that they may overcome either voluntary or involuntary homeostasis, and that may promote the sales personnels'FAST CA·rs activities such as, for example, new success. This may be because it has been found that activity kindling or controlled hyper-arousal in excess of the activity kindling or hyper-arousal threshold and in excess of the energy of aroused interest in recreation, r, or survival, s, or self-preservation, s, may overcome the sales personnels' stop reflex due to homeostasis, thereby causing students, such as sales personnel, to engage in the activity and/or carry it out. In some embodiments in which the students, such as the sales persons' personal goal may include behavior displacement, it has been found that teaching the students, such as sales personnel, to associate more pleasure with the behavior to be activated and more pain with the behavior to be suppressed may be an effective activity kindling or controlled hyper-arousal technique. The students, such as sales personnel, may be taught that activity kindling or controlled hyper-arousal that associates pleasure with activities to be activated attracts the students, such as sales personnel, to engage in the activity, but activity dekindling or controlled hyper-dearousal that associates pain or discomfort with activities to be suppressed causes the students, such as sales personnel, to withdraw from the activity to be suppressed. It has been found that activity kindling or controlled hyper-arousal may effectively stimulate activities such as working to finish a task on time in competition with other activities selected from the group consisting of watching television, playing, or reading, going to the gym, new success and combinations thereof. Alternatively, activity kindling or controlled hyper-arousal may effectively stimulate new success, effectively displacing other activities selected from the group consisting of watching television, playing, or reading, going to the gym, working and combinations thereof. In some embodiments, the controlled hyper-arousal may be the sales personnels' conviction that their personal goal justifies "going all out," such as, for example deciding to enroll in a educational program because the student, such as sales personnel, can not accept their current state of not knowing enough about the benefits of prescribing or using their medical treatment product in order to persuade or convince a physician or other medical personnel to buy the medical treatment product.

The students, such as sales personnel, may be taught that activity kindling or hyper-arousal may be utilized for energizing new success when it may be internally controlled. Alternatively, activity kindling or hyper-arousal may be externally controlled, for example, by the advertising industry. Advertising expensive clothing such as women's fashion may be an example of externally controlled hyper-arousal or externally controlled activity kindling, wherein customers may be enticed to buy articles by advertisers representing the articles to possible or potential customers as unnaturally or unrealistically desirable, beautiful, or sexually appealing. This could cause the students, such as sales personnel, to displace, suppress, or abandon activities of Creative Ambition, CA. Students, such as sales personnel, may be taught a benefit to internally controlling hyper-arousal or internally controlling activity kindling, is that the students may choose to pursue new success instead of being enticed to buy articles by advertisers who represent the articles to possible or potential customers as unnaturally or unrealistically desirable, beautiful, or sexually appealing. Students, such as sales personnel, may be taught to increase the likelihood of achieving their creative pursuits and/or personal goal by manipulatively increasing a hyper-arousal adrenaline effect the students, such as sales personnel, may associate with their creative pursuits and/or personal goal. Students, such as sales personnel, may be taught to associate pleasure to present success and new success activities, and associate pain for recreation or survival activities such as working, playing, watching television, or going to the gym since it has been found that increasing the intensity of pleasure associated with an activity increases the likelihood that students, such as sales personnel, will engage in it and/or carry it out.

In the step 555 of the method 500, as depicted in FIG. 8, supra, the students, such as sales personnel, may be instructed to utilize activity kindling threshold and/or self-deprivation to overcome their naturally occurring stop reflex due to homeostasis, thereby causing students, such as sales personnel, to engage in the activity and/or carry it out. In the step 555, the students, such as sales personnel, may be taught that utilizing kindling threshold means utilizing activity kindling or controlled hyper-arousal techniques, as taught to the students, such as the sales personnel in the step 550, of the method 500, described supra, and that they may overcome either voluntary or involuntary homeostasis, and that may promote the sales personnels' FAST CA·rs activities such as, for example, new success. In the step 555, the students, such as the sales personnel, may be taught that their stop reflex arises from their lack of confidence, their lack of self-esteem, their poor morale, their rejection sensitivity, e.g., they may be too sensitive to rejection as if their skin were too thin, their not knowing their true worth to the physician, their not buying into the sales message/philosophy, their impatience or being easily discouraged, change is quantum, and their being afraid to use support systems because of, for example, their fear of being exposed as being afraid. Next, the student, such as the sales personnel, may be instructed to overcome the stop reflex by utilizing the Success Roadmap 50, as depicted in FIG. 1E, supra, the Success Roadmap 414, as depicted in FIG. 6, supra, or the Success Roadmap 600, as depicted in FIG. 9 supra. In the Success Roadmaps 50, 414, and 600, the students, such as the sales personnel, may be taught that their stop reflex may cause them to stop moving along the paths of the success maps 50 and 414, and 600, such as getting stuck in the at least one of the steps 51-56 of the Success Roadmap 50, or the steps indicated by the perpendicular lines between the STARS categories: Spirit, Thought, Action, Results, and Surveillance, self-monitoring and or self-governance 413 of the Success Roadmap 414, or getting stuck in the at least one steps 61-65 of the Success Roadmap 600. In the step 555 of the method 500, the students, such as the sales personnel, may be taught that utilizing the success roadmaps 50 and/or 414 may mean overcoming the stop reflexes that cause the students, such as the sales personnel to stop or get stuck in the at least one of the steps 51-56 of the Success Roadmap 50, or the steps indicated by the perpendicular lines between the STARS categories: Spirit, Thought, Action, Results, and Surveillance, self-monitoring and or self-governance 413 of the Success Roadmap 414. In the step 555 of the method 500, the student, such as the sales personnel, may be taught the following methods for overcoming the barriers to sales to overcome the stop reflexes that cause the students, such as the sales personnel, to stop or get stuck in at the at least one of the steps 51-56 of the Success Roadmap 50, or the steps indicated by the perpendicular lines between the STARS categories: Spirit, Thought, Action, Results, and Surveillance, self-monitoring and or self-governance 413 of the Success Roadmap 414.

FIG. 8 depicts the steps 550-565 of the method 500, wherein the students, such as sales personnel, may be taught that utilizing the techniques, as in the steps 550-565 of the method 500, may result in pursuing or allocating the students', such as the sales personnel's creative energy, to power new brain activities, such as work, creative pursuits, and/or self-improvement, by deferring or delaying r/s activities such as going to the movies, watching television, going on vacation, or entertainment. For example, the students, such as the sales personnel may be taught to to enroll in an educational program. Such educational program may teach the student, such as the sales personnel, that cultural forces may deter the prescribing physician from prescribing the sales personnel's medical product. Such educational program may teach the student, such as the sales personnel, that the cultural forces may include habit or bias resulting from favorable outcomes from use of older drugs. Alternatively, such educational program may teach the student, such as the sales personnel, that the cultural forces may include the prescribing physician being inundated and/or overwhelmed with problems with practice management and patient management. Alternatively, such educational program may teach the student, such as the sales personnel, that the cultural forces may include that the prescribing physician may doubt there is a need for a the sales personnel's medical product, such that the prescribing physician may view listening to the sales personnel's sales message may be a waste of the prescribing physician's time. Alternatively, such educational program may teach the student, such as the sales personnel, that the cultural forces may include that the prescribing physician may be risk averse to prescribing a new drug with which he has no first hand experience. Alternatively, such educational program may teach the student, such as the sales personnel, that the cultural forces may include that the prescribing physicians may feel that their objectivity may be compromised by interactions with the students, such as the sales personnel, especially those that involve gratuities and other pleasantries. Hereinafter, "other pleasantries" include pens, Post-Its, clocks, calculators and clipboards, good cheer, appreciation and invitations to pleasant experiences. In the past their offers included sports events, live theater, a round of golf, even a weekend at a plush resort. More recently, under tighter guidelines promoted by the AMA and others, these have been toned down to more modest educational lunches or dinners (minus spouses), though usually presented at upscale restaurants and occasionally accompanied by consulting fees offered in exchange for feedback about the company's current advertising campaigns.

In the steps 550-565, the student, such as the sales personnel, may be taught that the cultural forces deterring the prescribing physician from prescribing the medical product may arise from overpowering the prescribing physician intellectually (or in any other way) and that the primary result of such overpowering the prescribing physician are resistance, skepticism, cynicism, burnout, disrespect towards the student, such as the sales personnel, refusal to listen, poor self-confidence and/or resentment. Hereinafter, "burnout" means physical or emotional exhaustion.

In the steps 550-565, the student, such as the sales personnel, may be taught that the cultural forces deterring the prescribing physician from prescribing the medical product may be neutralized or defeated by first, listing possible causes or actions that may result in: 1) a communication gap; 2) a lack of empathy for the prescribing physician and/or 3) a lack of understanding how to relate to the prescribing physician. Secondly, teaching the students, such as the sales personnel, to avoid or remove said causes or actions by: 1) not speaking about apples instead of oranges; 2) not hiding benefit or risks; and/or 3) alluding to benefits or risks of using the medical product, but not making them clear.

In the step steps 550-565 of the method 500, the student, such as the sales personnel may be taught that a communication gap may develop between them and the prescribing physician because the physician perceives the sales personnel may be proposing medical products that don't remedy the patient's malady or need for treatment. Hereinafter, a "communication gap" means a breakdown or error in communication between a speaker and a listener, that results in the subject matter that the speaker conveys not being perceived by the listener the same as the subject matter conveyed by the speaker. Such communication gaps may result when the listener, e.g., the prescribing physician, may think or conclude that the speaker, e.g., the sales personnel, may be speaking about a medical product that offers "X" benefits (by analogy, "apples") when the listener, e.g., the prescribing physician wants to hear about "Y" benefits (by analogy, "oranges") to treat his patient. Therefore, by analogy, the speaker, e.g., the sales personnel, may be speaking about "apples" when the listener, e.g., the prescribing physician, may want to hear about "oranges." Hereinafter, "speaking apples instead of oranges" means the communication gap that may result when the speaker, e.g., the sales personnel, may be speaking about a medical product that offers "X" benefits (by analogy, "apples") when the listener, e.g., the prescribing physician may want to hear about "oranges."

Alternatively, in the steps 550-565 of the method 500, the students, such as the sales personnel, may be taught that a communication gap may result when unspoken communication may interfere or conflict with associated spoken communication. The students, such as sales personnel, may be taught that the communication gap may result if the listener disbelieves or doubts the truthfullness of a spoken communication because the listener may filter or interpret the spoken communication, by using unspoken language to test the spoken language such as, for example, as to it's truthfullness or sincerity. The students, such as the sales personnel, may be taught that unspoken language may be non-reinforcing when it causes the listener to disbelieve or doubt the truthfulness of the spoken language. The listener may be the prescribing physician or alternatively, may be students, such as the sales personnel. The students, such as the sales personnel, may be taught that unspoken language may be body language, wherein facial expressions, hand gestures, and/or stance of the body of a speaker may communicate a message to the listener. The students, such as the sales personnel, may be taught that such unspoken language, such as, for example, whether the speaker looks directly into the listener's eyes may be a test used by the listener to determine truthfullness of the speaker's spoken language associated with the unspoken language. The students, such as the sales personnel, as speakers, may be taught to eliminate or avoid the communications gap by teaching the students, such as sales personnel, to refute or traverse the doubt or disbelief expressed by the listener, such as, for example, to "read between the lines" of the listener, such as the prescribing physician.

Alternatively, in the steps 550-565 of the method 500, the students, such as the sales personnel, as speakers, may be taught that the communication gap may result if the listener disbelieves or doubts the truthfullness of the spoken communication because the listener may filter or interpret the spoken communication, by gauging the speaker's empathy for the listener to test the spoken language, such as, for example, as to it's truthfullness or sincerity. Hereinafter, "empathy" means identification with and understanding of another's situation, feelings, and motives. Alternatively, "empathy" may mean the attribution of one's own feelings to an another. The students, such as the sales personnel, may be taught that such unspoken language, such as, for example, whether the speaker empathizes with the listener may be a test used by the listener to determine truthfullness of the speaker's spoken language associated with the unspoken language. The students, such as the sales personnel, as speakers, may be taught to eliminate or avoid the communications gap by teaching the students, such as sales personnel, to refute or traverse the doubt or disbelief expressed by the listener, such as, for example, to empathize with the listener, such as the prescribing physician.

Alternatively, in the steps 550-565 of the method 500, the students, such as the sales personnel, as speakers, may be taught that the communication gap may result if the listener disbelieves or doubts the truthfullness of the spoken communication because the listener may filter or interpret the spoken communication, by gauging the speaker's relatability to the listener to test the spoken language, such as, for example, as to it's truthfullness or sincerity. Hereinafter, "relatability" means ability to ally by connection or kindred. Alternatively, "relatability" may mean having or establishing a relationship. The students, such as the sales personnel, may be taught that such unspoken language, such as, for example, the speaker's relatability to the listener may be a test used by the listener to determine truthfullness of the speaker's spoken language associated with the unspoken language. The students, such as the sales personnel, as speakers, may be taught to eliminate or avoid the communications gap by teaching the students, such as sales personnel, to refute or traverse the doubt or disbelief expressed by the listener, such as, for example, by fostering relatability to the listener, such as the prescribing physician.

In the steps 550-565 of the method 500, self-deprivation includes voluntarily giving up or losing relative or perceived pleasure associated with the activity being deprived. Therefore, self-deprivation and instant gratification may be opposites because self-deprivation may be a new brain activity and instant gratification may be an old brain activity. The students, such as sales personnel, may be taught to have confidence in self-deprivation and/or delayed gratification if they are given a larger reward for engaging in and/or carrying out the activity using the step than if they engage in and/or carry out the same activity immediately, such as, for example, deferring pre-marital sex until they are committed to a monogamous relationship, instead of accepting a higher risk of being exposed to a sexually transmitted disease from a polygamous partner.

In the step 116 of the method 1, as depicted in FIG. 1H, supra, the students, such as sales personnel, may be instructed to focus their attention on the Creative Ambitions, CA, and/or Creative Actions or sustained right actions, CA, and/or productive activities related to carrying out their compelling desire and/or personal goal, as in the step 95 of the method 1, supra. By focusing on activities, the students, such as sales personnel, identify that will help them achieve their compelling desires and/or personal goal, students may induce success startles that are specific to carrying out their compelling desires and/or their personal goal. A problem is that normal human brains generate competing voluntary and involuntary success startles. In healthy brains, involuntary success startles may be controlled by a balance of adrenaline and dopamine and/or endorphins. We have described how brains with unhealthy lesions in the frontal lobe or people diagnosed with attention deficit syndrome have random uncontrolled success startles such that they try to give their attention to every activity they imagine. Focusing accomplishes two results that help students, such as sales personnel, achieve their compelling desires and/or their personal goal. Firstly, focusing on creative activities increases an intensity of their success startles, and secondly, focusing on creative activities increases their success startle threshold and/or kindling and/or activity thresholds for Creative Ambition, CA, Creative Action, CA and/or productive actions or sustained right actions identified by the students, such as sales personnel, for carrying out their compelling desires and/or their personal goal. As to the first result, focusing on the activity to be carried out increases the success startle intensity for that activity relative to the numerous other competing success startles in a normal or unhealthy brain. As to the second result, it has been found that focusing raises the success startle threshold and/or kindling and/or action threshold for success creative activities relative to recreation (or pleasure) r, and self-preservation, s activities. Therefore, instructing students, such as sales personnel to focus on creative activities increases their success startle intensities so that the creative activity may be stimulated to action even though focusing also raises the success startle threshold and/or kindling and/or action threshold for success creative activities relative to recreation (or pleasure) r, and self-preservation, s activities and relative to the competing success startles in the normal and unhealthy brains.

It has been found that the success startle and/or kindling and/or activity threshold for recreation (or pleasure) r, and self-preservation, s, activities such as play, watching television, or instant gratification for immediate pleasure or play may be lower than for working on Creative Ambitions, CA, and/or Creative Actions or sustained right actions, CA, and/or productive actions or sustained right actions activities that may have time pressure due to a near term deadline. Procrastination, where students, such as sales personnel, defer working on Creative Ambitions, CA, and/or Creative Actions or sustained right actions, CA, and/or productive actions or sustained right actions, but instead pursue recreation (or pleasure) r, and self-preservation, s, activities such as play, watching television, or instant gratification for immediate pleasure or play such that the Creative Ambitions, CA, and/or Creative Actions or sustained right actions, CA, and/or productive actions or sustained right actions may be finished late or just in time, may exemplify this lowered success startle and/or kindling and/or action threshold for recreation (or pleasure) r, and self-preservation, s, activities such as play, watching television, or instant gratification for immediate pleasure or play. Therefore, teaching the students, such as sales personnel, to focus on the Creative Ambitions, CA, and/or Creative Actions or sustained right actions, CA, and/or productive actions or sustained right actions in contrast to recreation (or pleasure) r, and self-preservation, s, thereby increasing the students', such as the sales persons' success startle for the Creative Ambitions, CA, and/or Creative Actions or sustained right actions, CA, and/or productive actions or sustained right actions may overcome the students', such as the sales persons' naturally occurring stop reflex due to homeostasis, thereby causing students, such as the sales personnel, to engage in the Creative Ambitions, CA, and/or Creative Actions or sustained right actions, CA, and/or productive actions or sustained right actions activities and/or carry them out.

Alternatively, in the step 116 of the method 1, the student, such as the sales personnel, is taught that their choice of creative activity over recreation, r, and/or survival, s, may be based on a perceived relative rewards associated with each activity and that there is a natural attraction towards activities with the greatest perceived relative rewards.

In step 116, the student is taught the concept of Perceived Relative Reward. Perceived Relative Reward can be defined as a ratio of perceived pleasure to perceived pain as in equation (1) supra:

$$\text{Perceived Relative Reward} = \frac{\text{Average Perceived Pleasure}}{\text{Average Perceived Pain}} \quad (1)$$

where:
Perceived Pleasure includes enjoyable activity drives such as love, happiness, altruism, Creative Ambition comfort, Creative Ambition excitement, Creative Ambition wealth, Creative Ambition sex, success, positive legacy and inspiration. Here, activity drives such as Creative Ambition wealth and sex are not drives for recreation, r, or survival, s, wealth and drives for recreation, r, sex for instant gratification. Perceived Pain includes un-enjoyable recreation, r, and/or survival, s, withdrawal drives such as from fear, physical or emotional pain, discomfort, shame, guilt, worry, and regret.

In step 116, the students, such as the sales personnel, may be taught to ascribe an intensity for each of the Perceived Pleasures listed supra for a given activity on a scale of 0-10, wherein 0 means no pleasure, a 5 means average pleasure, and 10 means the greatest intensity of pleasure that the students, such as the sales personnel, ascribe to the given activity to determine the quantity "Perceived Pleasure." In like manner, the students, such as the sales personnel, may be taught to ascribe an intensity for each of the Perceived Pains listed supra for a given activity on a scale of 0-10, wherein 0 means no pain, a 5 means average pain, and 10 means the greatest intensity of pain that the students ascribe to the given activity to determine the quantity "Perceived Pain." Each of "Average Perceived Pleasure" and "Average Perceived Pain" may be determined by averaging each of "Perceived Pleasure" and "Perceived Pain" for the given activity, wherein any appropriate method of statistical averaging such as equal weighting or non-equal weighting may be used to determine each of "Average Perceived Pleasure" and "Average Perceived Pain."

In step 116, the student, such as the sales personnel, is taught that a high Perceived Relative Reward (high Perceived Pleasure) promotes action in those activities and a low Perceived Relative Reward (high Perceived Pain) promotes avoidance of actions or sustained right actions in those activities. The student, such as the sales personnel, is taught that the probability of action thus increases as Perceived Relative Reward increases. In step 116, the student, such as the sales personnel, is taught how to increase or decrease their Perceived Relative Reward. On one hand, increasing their perceptions of love, happiness and the greater good served by fulfilling their Creative Ambition and/or Creative Actions or sustained right actions, can increase a students', such as a sales persons' Perceived Relative Reward. On the other hand, decreasing their perceptions of pain, fear, shame, guilt, discomfort and regret associated with not fulfilling their Creative Ambitions can decrease a students', such as the sales persons' Perceived Relative Reward.

In the step 118 of the method 1, as depicted in FIG. 1H, supra, the students, such as the sales personnel, may be instructed to create a crisis of need or relevance to overcome their naturally occurring stop reflex. The students, such as the sales personnel, may be taught that time may expire before they have achieved their compelling desire and/or their personal goal. Students, such as the sales personnel, may be taught to project or estimate a timeline for achieving their compelling desire and/or their personal goal. Students, such as the sales personnel, may be taught to make a plan for completing their compelling desire and/or their personal goal and to determine if the estimated time to the plan exceeds the time they want to wait. Students, such as the sales personnel, may be taught to recognize their dissatisfaction with the length of the timeline for completion may be a crisis of need or relevance that may motivate them shift their energy for their plan. FIG. 2, infra, depicts a crisis of need or relevance.

FIG. 2 is a pictorial representation illustrating a crisis of need or relevance. In FIG. 2 the likelihood of reaching a goal is plotted versus time. It is immediately apparent that the likelihood of reaching a goal increases with the amount of time spent in activities powering reaching the goal. The time axis is split into the past and the future by the present time. The present is time T0. Without the method of the present invention, the projected slope of the line of likelihood of reaching a goal over time is the result of old habits and routines of dwelling time between new brain and old brain activities remains the same as in past time (left of T0) and the goal is accomplished at time T2. With the method of the present invention, the projected slope of the line of likelihood of reaching a goal over time is the result of new habits and routines of creative energy or dwelling time shifted from old brain activities to new brain activities increases and the goal may be accomplished at time T2, taking less time. In FIG. 2 the energy shift represented by the steeper slope of the line of likelihood of reaching a goal over time that is the result of new habits and routines of creative energy or dwelling time (present to T1) is an increased efficiency in achieving the goal. FIG. 2 may be presented to students as part of the method 1 of the present invention.

The techniques taught to the students, such as the sales personnel, to overcome the stop reflex due to homeostasis in order to cause students to engage in the activity and/or carry it out in the steps 112, 114, 116, and/or 118 of the method 1 may be used in any order. Alternatively, the students, such as the sales personnel, may be taught to use at least one of the steps 112, 114, 116, and/or 118, or any combinations thereof. In the steps 112, 114, 116, and/or 118 of the method 1, the students, such as the sales personnel, may be taught to use the following techniques to overcome the stop reflex in order to cause students to engage in the activity and/or carry it to override all obstacles and barriers: identify their talent-matched desired contribution to others; identify parallel pleasure anchors, i.e., rewards to promote and sustain your pursuit interest; elevate their gravitational energy. Hereinafter, gravitational energy is their creative energy that may unify and focus the students', such as the sales persons' mental, physical and spiritual energies, i.e., their attention, interest, pleasure, determination and endurance; increase their mental and physical processing speed; and increase their closure rate for achieving or accomplishing their compelling desire and personal goal.

In step 130, students, such as the sales personnel, may be instructed to self-monitor themselves whether they have achieved their compelling desire or personal goal, as identified in the step 95, supra.

If, as a result of surveillance and/or self-monitoring and/or self-governance, the students, such as the sales personnel, conclude they may not have achieved their compelling desire or personal goal, the students, such as the sales personnel, are instructed as in step 140, of the method 1, to reiterate steps 100 to 130. Alternatively, if, as a result of surveillance and/or self-monitoring and/or self-governance, the students, such as the sales personnel, conclude they may have may have achieved their compelling desire or personal goal, or if the students, such as the sales personnel, decide they no longer want to pursue their compelling desire or personal goal, the students, such as the sales personnel, are instructed to proceed to step 145, of the method 1, described infra.

In the step 145 of the method 1, the students, such as the sales personnel, may be instructed to reiterate steps 95 to 130 of the method 1, as depicted in FIG. 1A, supra. FIG. 1F, supra, depicts another embodiment of the step 115 of the method 1, wherein the students, such as the sales personnel, may be instructed to redistribute and rebalance their initial foreground recreation energy, $FGE_r$, as in a success CA·rs redistribution 45 in a direction of the arrow 47. In FIG. 1F, supra, the students, such as the sales personnel, may have redistributed their initial foreground recreation energy, $FGE_r$, such that a portion of their initial foreground recreation energy, $FGE_r$, may be reallocated as new success final foreground Creative Ambitions and/or Creative Actions or sustained right actions energy $FGE_{CA'}$, such that their final Creative Ambitions and/or Creative Actions or sustained right actions energy, $FGE_{CA'}$, includes present success $FGE_{CA'}$, and new succes $FGE_{CA'}$ to accomplish the students' moment-to-moment thoughts or sustained right thinking and behaviors. The students may be instructed that such new success may require management and reallocation of their initial recreation or survival foreground creative energy, $FGE_{r,s}$, rather than diminishing final present success foreground creative energy, $FGE_{CA'}$. Here final foreground creative energy, $FGE_{r',s'}$ is equal to the final foreground creative energy the students allocate to recreation, $FGE_{r'}$, and the final foreground creative energy the students allocate to survival, $FGE_{s'}$. Therefore, the students may be instructed that one goal of success is to preserve present success.

Alternatively, in the step 145 of the method 1, the students may be instructed to reiterate steps 95 to 130 of the method 1, as depicted in FIG. 1A, supra, such that the students may be instructed to redistribute and rebalance their initial recreation energy, $FGE_r$, as in a success CA-rs redistribution 15 and 16, as in FIGS. 1C and 1D, supra. In this embodiment, the students may have redistributed their initial recreation energy, $E_r$, such that a portion of their initial recreation energy, $E_r$, may be reallocated as new success final Creative Ambitions and/or Creative Actions or sustained right actions energy $E_{CA''}$, such that their final Creative Ambitions and/or Creative Actions or sustained right actions energy, $E_{CA''}$, includes present success $E_{CA'}$ and new succes $E_{CA'}$ to accomplish the students' moment-to-moment thoughts or sustained right thinking and behaviors. The students may be instructed that such new success may require management and reallocation of their initial recreation or survival creative energy, $E_{r,s}$, rather than diminishing final present success creative energy, $E_{CA''}$. Here final creative recreation and survival energy, $E_{r',s''}$, is equal to the final creative energy the students allocate to recreation, $E_{r'}$, and the final creative energy the students allocate to survival, $E_{s'}$. Therefore, the students may be instructed that one goal of success is to preserve present success.

The students may be taught that redistributing and rebalancing their dwelling time can reclaim their loss of their boundary-less or free spirit. The student is further taught that success can be achieved by the combination of rebalancing dwelling time, de-emphasizing self-preservation and recreation (or pleasure), reclaiming their carefree creative nature, promoting adventure and change and promoting success-creative activities.

FIG. 3 is a diagram of a worksheet that may be used to practice the present invention. The worksheet in FIG. 10 may be used by either the student to apply what they have learned or as a tool in the teaching of the method of the present invention to the student. The worksheet in FIG. 3 comprises eight Fields that may be filled in by a student of the method of the present invention in sequential order. In Field (1) Personal Goal, the student is instructed to enter their personal goal. In Field (2) Potential Activities, the student is instructed to enter possible or potential activities they believe, if performed diligently, will lead to success in accomplishing the goal. In Field (3) Old or New, the student is instructed to categorize each activity based on whether the activity is a new brain activity or and old brain activity as described supra. In Field (4) Select, the student is instructed to select at least one of the possible or potential activities to actually implement based on the corresponding categorization made in Field (3). In Field (5) Increases to Reward, the student indicates what they can do to increase their perceived pleasure by implementation of the selected activities as taught supra. This may include inclusion and/or examination of sub-activities within the selected possible or potential activities. In Field (6) Decreases to Reward, the student indicates what to look out for that will increase their perceived pain by implementation of the selected activities as taught supra. The student then told to develop strategies to minimize these increases to perceived pain. In Field (7) Dwelling Time Negatives, the student is instructed to list what self-monitoring and/or self-governance should be done to minimize the potentially destructive dwelling time as taught supra. In Field (8) Dwelling Time Positives, the student is instructed to list what self-monitoring and/or self-governance should be put in place to maximize the potentially constructive dwelling time, as taught supra.

FIG. 4 is an overall flowchart of a method for integrating the teaching success according to the present invention and the worksheet of FIG. 3 into an interactive method of teaching the present invention. For the purposes of describing FIG. 4, the terms "present, to present and presenting" are defined to mean projecting on a wall screen or a television screen using, for example, a slide or foil projector as well as displaying on a computer screen under the direction of a computer program the subject matter being taught. The terms "enter and entering" are defined to mean writing on a paper worksheet or typing through a keyboard (or moving or clicking a pointing device) linked to a computer adapted to display the information entered on a screen.

FIG. 4 depicts a method for presenting the method 1 for teaching success, as depicted in FIG. 1A, supra. In step 300, the introductory material described supra in reference to FIG. 1A, steps 95-100 may be presented to the students. In step 305, a worksheet (for example that illustrated in FIG. 3 and described supra may be presented to the students for the students to enter their personal goal and possible or potential activities to achieve the personal goal as described supra in reference to FIG. 1A, step 95. In step 310, the new brain/old brain material described supra in reference to FIG. 1A, step 100 may be presented to the students. In step 315, the worksheet for the student to enter their determination of which of the possible or potential activities are new brain activities and which are old brain activities as described supra in reference to FIG. 1A, step 100 may be presented to the students. In step 320, the methodology to achieve success material described supra in reference to FIG. 1A, step 115 may be presented to the students. In step 325, the worksheet for the student to select which of the possible or potential activities to implement as described supra in reference to FIG. 1A, step 95 is presented to the students. In step 330, the methodology to achieve success material described supra in reference to FIG. 1A, step 115 may be presented to the students. In step 335, the worksheet for the student to enter increases and decreases to rewards described in FIG. 1E, steps 51, 52, and 54 may be presented to the students. In step 340, the FAST CA·rs MAKE HOLLYWOOD STARS material described supra in reference FIG. 1E, steps 51, 52, and 54 and dwelling time material described supra in reference to FIGS. 1D and 1E, steps 51, 52, and 54 is presented to the students. In step 345, the worksheet for the students to enter negatives and positives to dwelling time is presented to the student. Finally, in step 350, the material describing ultimate success and consequences displayed supra in reference to FIG. 1E, step 54 may be presented to the student. The students now have a plan, constructed according to the present invention, for successfully achieving the personal goal that they may implement.

Generally, the method 1 described herein, using the worksheet illustrated in FIG. 3 and described supra, may be practiced with a general-purpose computer and the method may be coded as a set of instructions on removable or hard media for use by the general-purpose computer. FIG. 5 is a schematic block diagram of a general-purpose computer for practicing the present invention. In FIG. 5, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445. In a first example, the slides illustrated in the Appendix may be written to a storage media and self-presented by a student. In a second example, the slides illustrated in the Appendix and the worksheet of FIG. 3 may be written to a storage media and self-presented by a student, the worksheet being presented at appropriate intervals during the presentation of the slides of the Appendix and student input accepted for predetermined fields of the worksheet at predetermined points in the presentation of the slides.

FIG. 6 depicts an embodiment in which the Success Roadmap 414, as in step 115 of the method 1, may be a "Success Roadmap—Team Up For Life" process, comprising the following "STAR" categories: Spirit, Thought, Action, Results, and Surveillance, self-monitoring and or self-governance 413 (for monitoring Creative Ambitions and/or Creative Action or Dwelling Time, DT). Each thought or action may receive input from a "CA·rs" category, wherein the CA·rs categories are Creative Ambitions and/or Creative Actions or sustained right actions, Recreation and Survival. FIG. 6 depicts External Synergistic and Internal Creative Inputs to the CA·rs categories, wherein the inputs may be possible or potential old and new brain activities and the student may be taught to identify the activities as old and new brain activities and to characterize the inputs into new brain Creative Ambitions and/or Creative Actions or sustained right actions by increasing his dwell time for new brain activities. External Synergistic Input may be input from a source "outside of" and "external to" the student that creates an enhanced combined effect. The student may be instructed to find External Synergistic Input from a book, work of art, a person who is a kindred spirit, a person who is a professional colleague, a person who is a loved one, another student, and combinations thereof. The External Synergistic Input may be suggestions and inspirations for Creative Ambitions and/or Creative Actions or sustained right actions for the student when it is the External Synergistic Input to the CA·rs categories. Cooperative interactions or sustained right actions between agencies such as the student and the External Synergistic Input may result in "synergism," where synergism means a simultaneous action of separate agencies that, together, have greater total effect than the sum of their individual effects. Internal Creative Input may be input arising from within the student resulting from instructing the student to be original, expressive, artistic, clever, cool, demiurgic, deviceful, fertile, formative, gifted, hip, ingenious, innovational, innovative, innovatory, inspired, inventive, original, originative, productive, prolific, stimulating, visionary, and imaginative that may be suggestions and inspirations for Creative Ambitions and/or Creative Actions or sustained right actions for the student when the Internal Creative Inputs are input into the CA·rs categories.

The combined inputs from External Synergistic and Internal Creative Inputs may be a talent pool that may be a total talent that results from the allocation of that the student allocates to the STAR Steps as depicted in FIG. 6, when the student is instructed in step 115 of the method 1, supra. Thus, the present invention provides a method and system for teaching people to achieve success in meeting goals that effect their spiritual, emotional or physical well-being.

Figure 15:
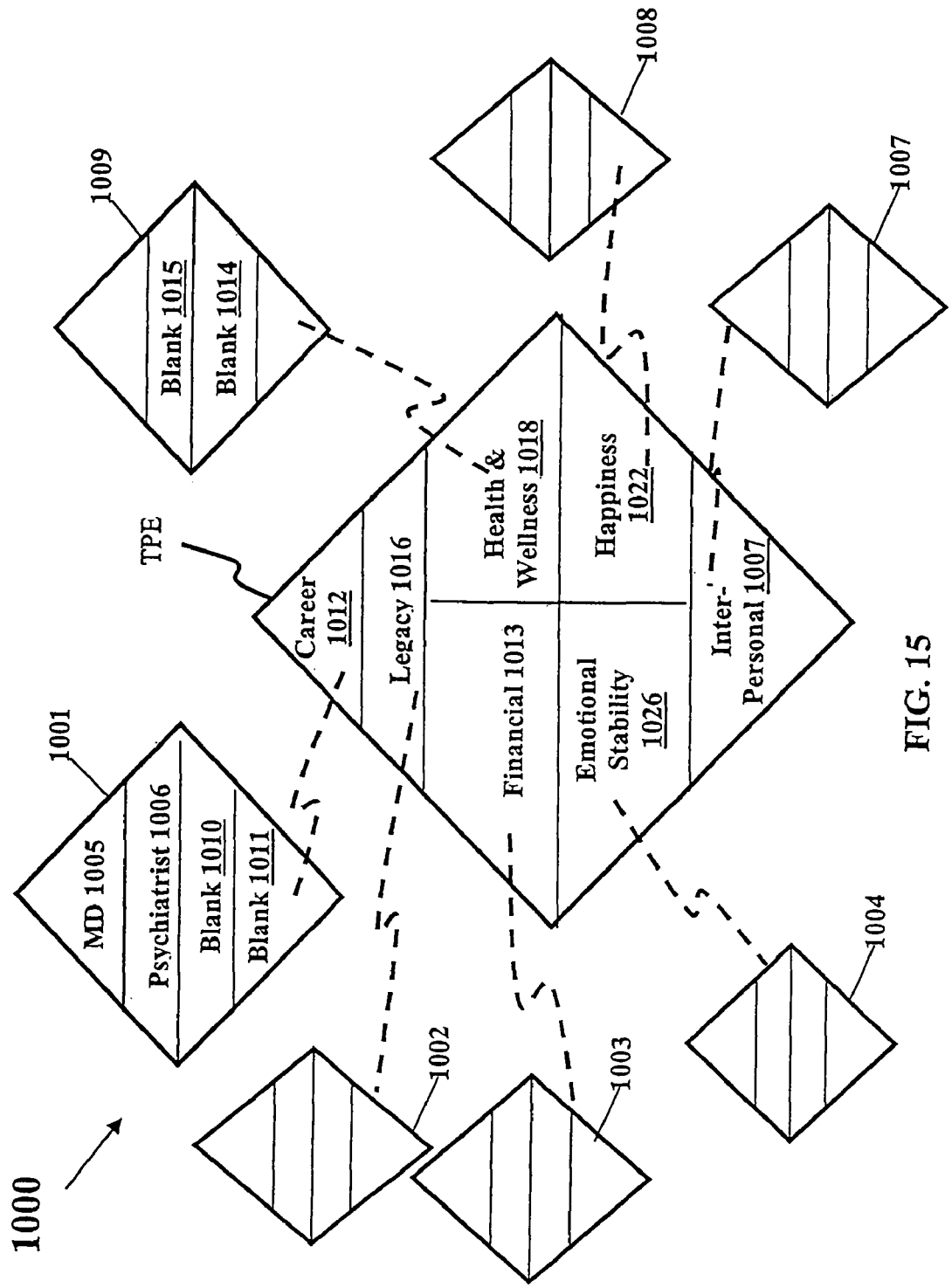
FIG. 15 is a Total Personal Excellence (TPE) diagram, according to the present invention.

FIG. 15 is a Total Personal Excellence (TPE) diagram 1000 depicting compartmentalization of the student's success. The diagram 1000 comprises: TPE compartments 1012, 1016, 1013, 1026, 1022, 1007, and 1018, such as, for example, Career 1012, Legacy 1016, Financial Security 1013, Emotional Stability 1026, Happiness 1022, Interpersonal Relationships or Skills 1007, and Health and Wellness 1018. Expanded views of the TPE compartments Career 1012, Legacy 1016, Financial Security 1013, Emotional Stability 1026, Happiness 1022, Interpersonal Relationships or Skills 1007, and Health and Wellness 1018 are represented by 1001, 1002, 1003, 1004, 1009, 1008, 1007, and 1026. In the expanded view of TPE compartment Career 1012, the student may be instructed to list the student(s) achievements in associated TPE fields 1005, 1006, 1010 and 1011 of TPE compartment Career 1012. If the student has only two (2) career 1012 achievements, associated fields 1010 and 1011 may remain blank, as depicted in FIG. 15. In one embodiment, the student is instructed to list at least one de-compartmentalized achievement in a blank TPE field, such as fields 1014 and 1015, of a TPE compartment other than career 1012, such as, for example, the TPE compartments Health & Wellness 1018, Legacy 1016, Financial Security 1013, Emotional Stability 1026, Happiness 1022, Interpersonal Relationships or Skills 1007, and Health and Wellness 1018, if the TPE diagram is not balanced. That is, they might become very successful financially but not be successful based on happiness 1022 or wellness 1018. For example, the student(s) may work long hours but not spend enough time working on Relationships or Skills 1007 or their own personal Health and Wellness 1018, such as self-care.

Figure 16:
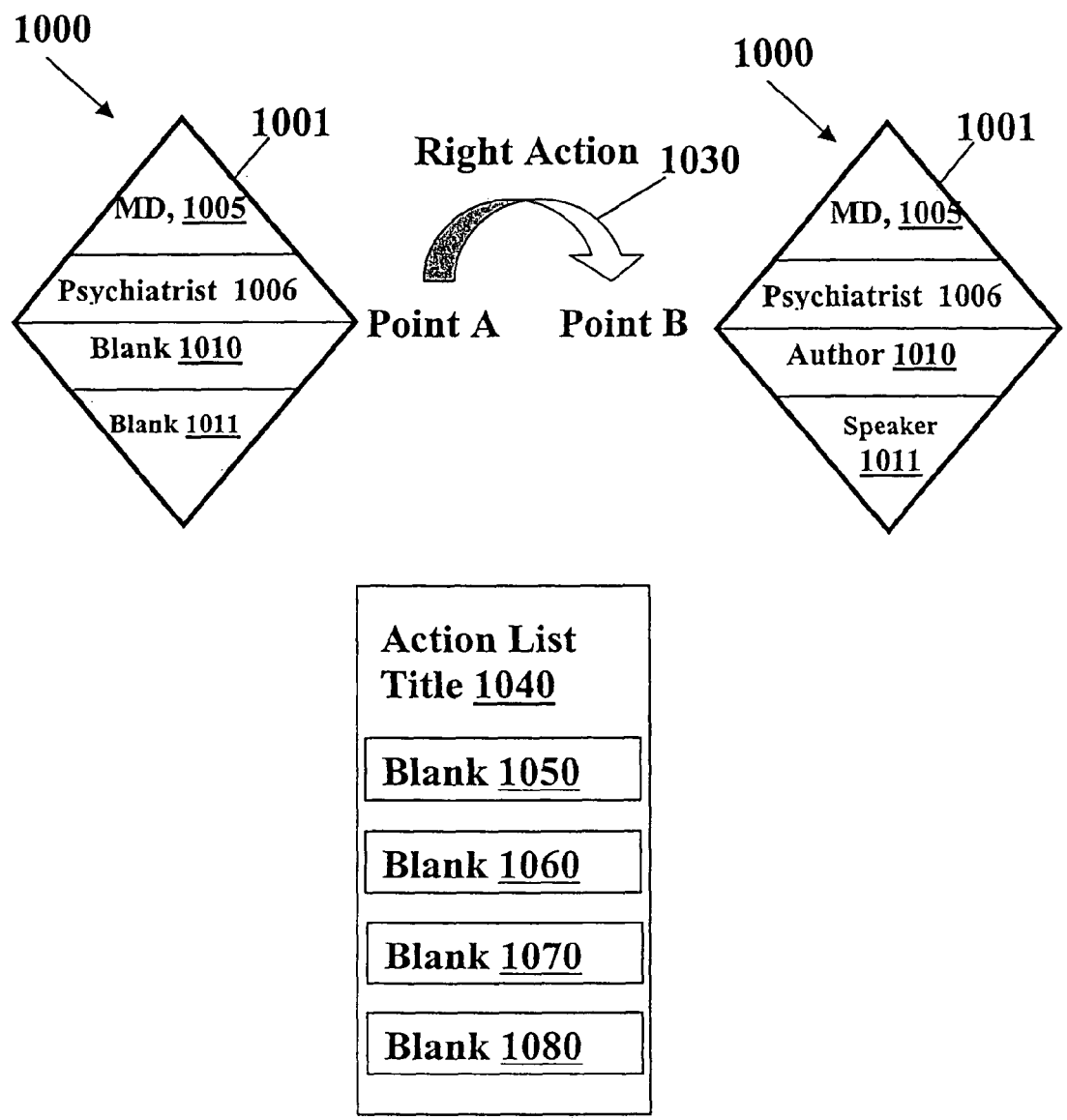
FIG. 16 depicts the TPE diagram of FIG. 15, illustrating de-compartmentalization of success, according to the present invention.

FIG. 16 depicts the TPE diagram 1000 of FIG. 15, wherein the student has been instructed to de-compartmentalize his success of having achieved becoming a medical doctor (MD) 1005 and a psychiatrist 1006, as represented by listing "Author" in the blank TPE field 1010 and "Speaker" 1020 in the blank TPE field 1011 in the expanded view 1001 of the Career Compartment 1012. An arrow 1030 indicates de-compartmentalization of the Career Compartment 1012, as represented by displacement of the expanded view Career Compartment 1001 in a direction from point A to point B, wherein "Author" has been listed in the TPE field 1010 and "Speaker" has been listed in the TPE field 1020 of the expanded view career compartment 1001. In FIG. 16, the student(s) have been instructed that de-compartmentalization of the Career Compartment 1012 is an example of willed right action.

Good results require consistent and positive actions. While there are no guarantees, in order to get the results you desire, you must consistently energize yourself toward success, discipline your mind toward achieving your goals, and continually take action in the right direction.

The Law of Natural Consequences ultimately governs results. Simply stated, this law portends that outcome is the natural outflow from action or inaction-if you take right action you will get desired results; if you fail to take action you will not get these same results. The Law of Natural Consequences also dictates and controls outcomes based on all of your interactions with the world around you, yielding both positive results and negative results. Positive results come from positive action and negative results come from negative action. For example, if you consistently work at learning a new skill you will ultimately achieve that goal and create opportunities for future success using your newfound knowledge and abilities. If you consistently treat people badly, you will lose their admiration and respect, thereby limiting your opportunities for success. The Law of Positive Natural Consequences states that good outcome requires consistent and positive action. In accordance with this law, success is largely a consequence of cause and effect. It is a matter of aligning your right energy with right thought and right action to get right results. These are the ingredients and recipe for success. Much like baking a cake, you must use these ingredients and follow the recipe in order to achieve success. Unlike baking a cake, you can follow this sequence, but not always accomplish your intended goals. You may end up with a different flavor of success than you envisioned or it simply may take longer to bake. However, if you do not use the required ingredients or follow the recipe, there is little, if any, likelihood that you will achieve substantive success.

We all have areas in our lives where our positive thoughts, energy, and efforts have yielded positive results and laid the groundwork for future success. We also have areas in our lives where we have failed to take action and, in some cases, where we have expended negative thought and energy or took wrong action and therefore limited our opportunities for success. But as long as you are living and breathing, you have the opportunity to generate the required energy, thought, and action to obtain positive results, increase your opportunity for success, and avoid future regret.

In Example 4, the student is instructed to explore the impact of the Law of Natural Consequences outcomes on their lives. The students are instructed to examine the energy, thoughts and actions that yielded these results and identify ways to increase positive outcomes and their opportunities for achieving future success.

EXAMPLE 4

Exploring the Impact of the Law of Natural Consequences Outcomes on Their Lives—Willed Right Action 1. Make a list of positive outcomes in your life that were the direct result of right energy, right thought, and right action. Include past successes where you set a goal and energized yourself to achieve this goal through positive, focused thought and consistent action. Describe your process for achieving these outcomes and the energy, thoughts, and actions required.
2. Make a list of past opportunities you were able to take advantage as a result of your preparation for success. Include successes that were unintended outcomes or a byproduct of your right energy, thoughts and actions towards a different goal or future success. (Ex., receiving a promotion or getting a job due to learning a new skill or developing expertise) Describe your process for preparing for this opportunity and the energy, thoughts, and actions required.
3. Make a list of opportunities that you feel you were not able to take advantage of due to the absence of preparation. Include past goals and opportunities that you neglected to act on and current opportunities where you don't have the confidence, skills or knowledge to pursue certain goals. (For example, were you ever passed up for a promotion because someone else had more training than you?)

What could you do to take advantage of similar opportunities in the future?
4. Make a list of any negative outcomes in your life that you believe resulted from the absence of positive energy, thought, and action. Include outcomes due to negative energy, unfocused thought, or misdirected action.

What can you do or have you done to turn these outcomes into positive results?

Describe the energy, thought, and action required.

5. Review your responses above. What can you do to increase your level of positive outcomes to obtain desired results, expand your opportunities, and promote future success? Outline a strategy for positive thought energy, thought, and action to achieve desired results. Include a list of things to avoid.

In FIG. 16, the student has been instructed to prepare an Action List 1040 comprising blank fields 1040, 1050, 1060, 1070, and 1080, wherein each action on the Action List 1040 may be an Action step, e.g., a right action, of the STARS roadmap. For example, the student may be instructed to list "Research Requirements for becoming a "Author" or a "Speaker", "Prerequisite courses", "Attend Workshops," "Hire Mentor" and the like in the fields 1040, 1050, 1060, 1070, and 1080 of the Action List 1220 of the TPE diagram 1000, as in FIG. 16.

Figure 17:
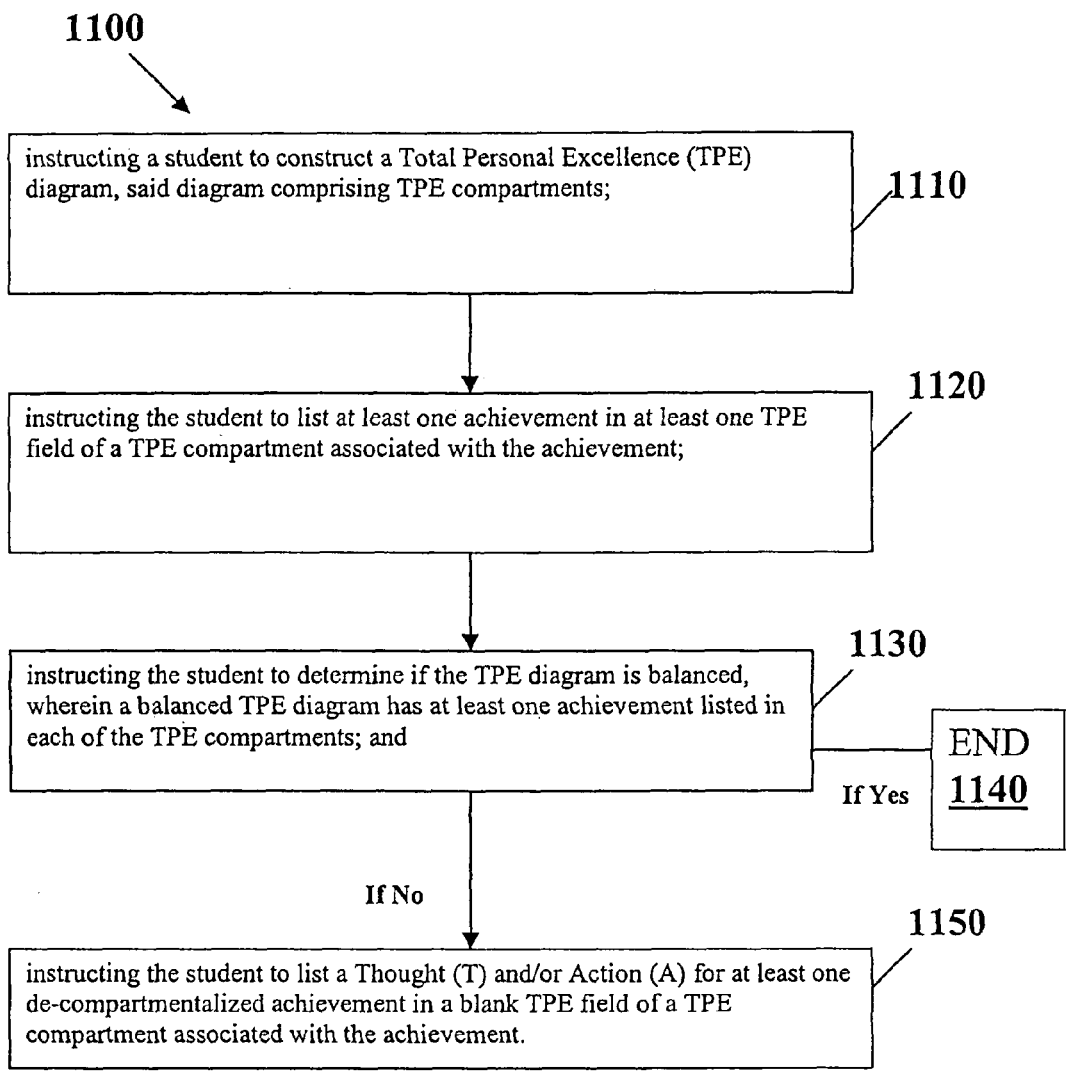
FIGS. 17-18 depict flowsheets of a method utilizing a STARS roadmap to achieve a higher Success Ratio by de-compartmentalizing success, according to the present invention.

FIG. 17 depicts a method 1100 utilizing a STARS roadmap to achieve a higher Success Ratio by de-compartmentalizing success, comprising: a step 1110, instructing a student to construct a Total Personal Excellence (TPE) diagram 1000, as depicted in FIG. 15. The diagram 1000 may comprise TPE compartments 1001, 1002, 1003, 1004, 1009, 1008, 1007, and 1026, as depicted in FIG. 16. Each TPE compartment may list the student(s) achievements in fields, e.g. 1010 and 1011 in TPE compartment Career 1001, in fields, e.g., 1014 and 1015 in TPE compartment Health and Wellness 1018, or in fields (not shown) in TPE compartments 1001, 1002, 1003, 1004, 1009, 1008, 1007, and 1026 associated with the achievements. A number of TPE compartments and a number of fields per TPE compartment may be represented by any positive integer.

In a step 1120 of the method 1100, the student is taught to list at least one achievement in at least one TPE field, such as 1005, 1006, 1010 and 1011 of TPE compartment Career 1012, or in any other field of a TPE compartment associated with the achievement. If the student has only two (2) career 1012 achievements, associated fields 1010 and 1011 may remain blank, as depicted in FIG. 15.

In a step 1130 of the method 1100, the student is instructed to determine if the TPE diagram 1000 is balanced, wherein a balanced TPE diagram 1000 has at least one achievement listed in each of the TPE compartments 1012, 1016, 1013, 1026, 1022, 1007, and 1018. In one embodiment, the TPE diagram 1000 may be balanced if the TPE diagram 1000 has at least one achievement listed in from about one third to two thirds of the TPE compartments. In another embodiment, the TPE diagram 1000 may be balanced if the TPE diagram 1000 has at least one achievement listed in from about one third to one half of the TPE compartments. If the TPE diagram 1000 is balanced, i.e., the answer to the question whether the TPE diagram 1000 is balanced is "Yes", in the step 1140 of the method 1100, the student is instructed to end the decompartmentalization process.

If the TPE diagram 1000 is not balanced, i.e., the answer to the question whether the TPE diagram 1000 is balanced is "No," the student is instructed to list a Thought (T) and/or Action (A) for at least one de-compartmentalized achievement in a blank TPE field of a TPE compartment associated with the achievement, as in the step 1150 of the method 1100.

In one embodiment, if the TPE diagram 1000 is not balanced, the student is instructed to list a Thought (T) and/or Action (A) for at least one de-compartmentalized achievement in a blank TPE field, such as fields 1014 and 1015, of a TPE compartment other than career 1012 that is associated with the achievement, such as, for example, listing "losing weight" or "eating more nutritional food" as a de-compartmentalized achievement in a blank field of the TPE compartment Health & Wellness 1018.

Alternatively, if the TPE diagram 1000 is not balanced, the student is instructed to list a Thought (T) and/or Action (A) for at least one de-compartmentalized achievement in a blank TPE field of a TPE compartment other than career 1012 that is associated with the achievement, such as "helping a family member" or "volunteering for community service" as a de-compartmentalized achievement in a blank field of the TPE compartment Legacy 1016.

Alternatively, if the TPE diagram 1000 is not balanced, the student is instructed to list a Thought (T) and/or Action (A) for at least one de-compartmentalized achievement in a blank TPE field of a TPE compartment other than career 1012 that is associated with the achievement, such as "increasing savings" and/or "investing the savings" as a de-compartmentalized achievement in a blank field of the TPE compartment Financial Security 1013.

Alternatively, if the TPE diagram 1000 is not balanced, the student is instructed to list a Thought (T) and/or Action (A) for at least one de-compartmentalized achievement in a blank TPE field of a TPE compartment other than career 1012 that is associated with the achievement, such as "consulting a nutritionist" as a de-compartmentalized achievement in a blank field of the TPE compartment Emotional Stability 1026.

Alternatively, if the TPE diagram 1000 is not balanced, the student is instructed to list a Thought (T) and/or Action (A) for at least one de-compartmentalized achievement in a blank TPE field of a TPE compartment other than career 1012 that is associated with the achievement, such as "changing occupations to pursue a long felt need" as a de-compartmentalized achievement in a blank field of a TPE compartment Happiness 1022.

Alternatively, if the TPE diagram 1000 is not balanced, the student is instructed to list a Thought (T) and/or Action (A) for at least one de-compartmentalized achievement in a blank TPE field of a TPE compartment other than career 1012 that is associated with the achievement, such as "meeting a new person" in a blank field of the TPE compartment Interpersonal Relationships or Skills 1007.

Figure 18:
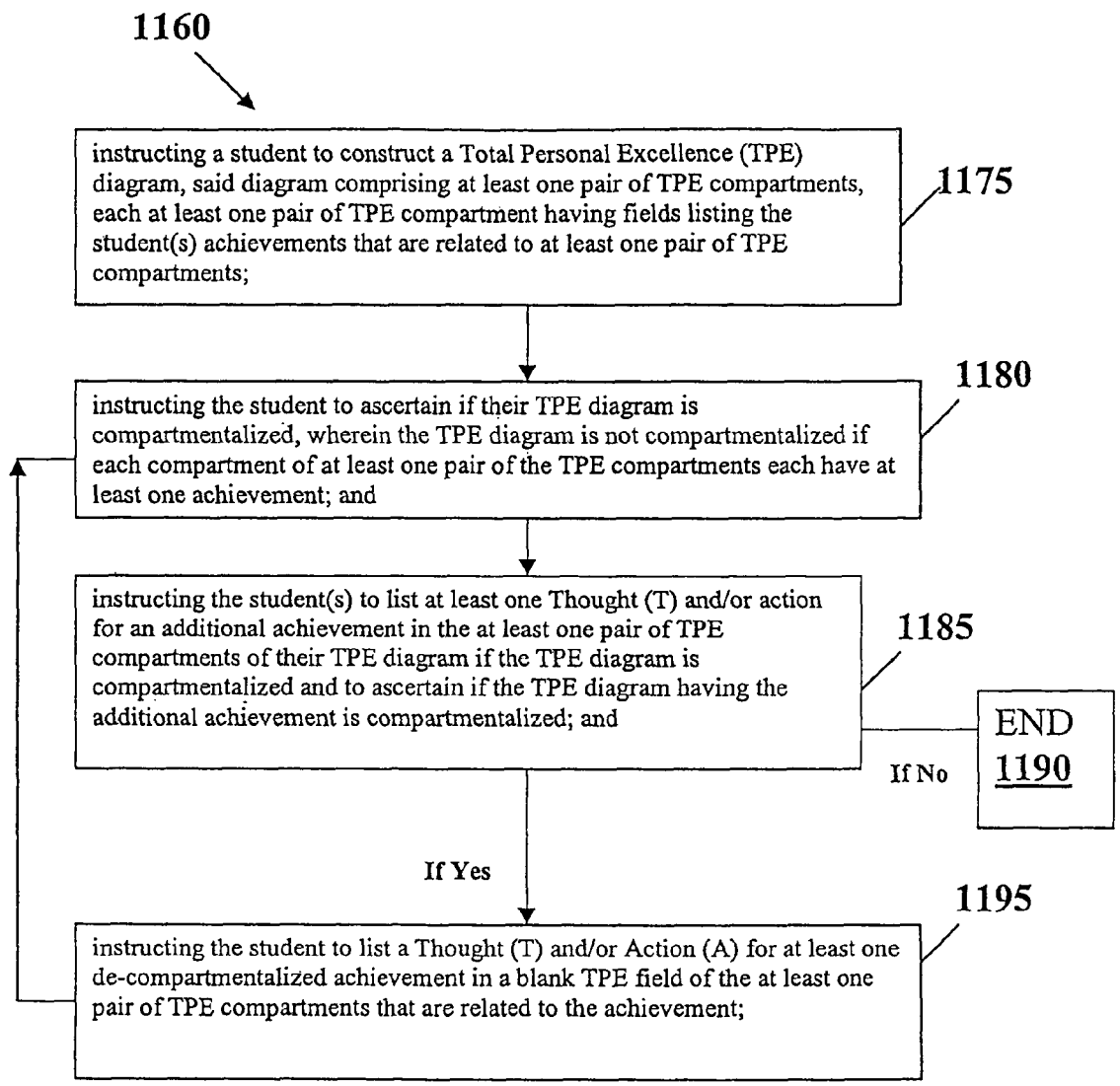

FIG. 18 depicts a flowsheet illustrating a step 1175 of a method 1160 for de-compartmentalization instructing student(s) to construct a Total Personal Excellence (TPE) diagram, said diagram comprising at least one pair of TPE compartments, each at least one pair of TPE compartment having fields listing the student(s) achievements that are related to at least one pair of TPE compartments.

In the step 1180 of the method 1160 the student(s) are instructed to ascertain if their TPE diagram is compartmentalized, wherein the TPE diagram is not compartmentalized if each compartment of at least one pair of the TPE compartments have at least one achievement.

In the step 1185 of the method 1185, the student(s) are instructed to list at least one Thought (T) and/or Action (A) for an additional achievement in the at least one pair of TPE compartments of their TPE diagram if the TPE diagram is compartmentalized and to ascertain if the TPE diagram having the additional achievement is compartmentalized.

In the step 1190 of the method 1160, the instructing the student(s) to list at least one Thought (T) and/or Action (A) for an additional achievement step is repeated if the answer to the question whether the TPE diagram having the at least one Thought (T) and/or Action (A) listed is compartmentalized is "Yes".

Alternatively, in the step 1195 of the method 1160, the method of de-compartmentalizing the TPE diagram is ended if the answer to the question whether the TPE diagram having the at least one Thought (T) listed is compartmentalized is "No".

The student may be a professional, a teenager, a senior citizen, a couple and any combination.

Referring to FIG. 16, in the methods 1100 and 1160, the student may be instructed to utilize a willed right action, as described in Example 4, herein, to move the Thought (T) to Action (A) of the STARS roadmap.

Figure 19:
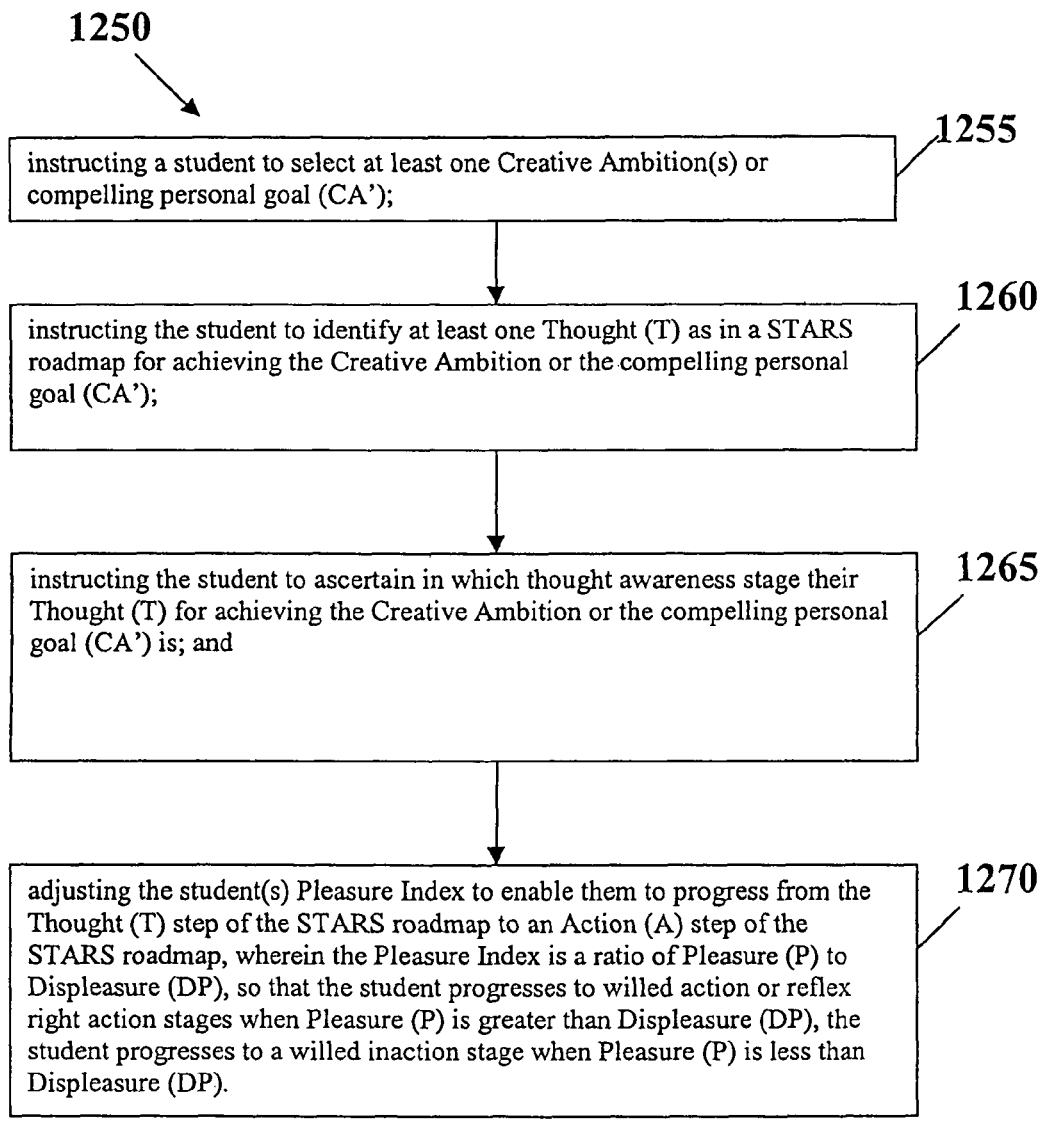
FIGS. 19 and 23 depict flowsheets of a method for moving Thought (T) to Action (A) of the STARS roadmap, according to the present invention.

FIG. 19 depicts a flowsheet of a method 1250 for moving Thought (T) to Action (A) of the STARS roadmap. In the step 1255 of the method 1250, a student is instructed to select at least one Creative Ambition(s) or compelling personal goal (CA'). In the step 1260, the student is instructed to identify at least one Thought (T) as in a STARS roadmap for achieving the Creative Ambition or the compelling personal goal (CA'). In the step 1265, the student is instructed to ascertain in which thought awareness stage their Thought (T) for achieving the Creative Ambition or the compelling personal goal (CA') is. In the step 1270, the student is instructed to adjust the student(s) Pleasure Index to enable them to progress from the Thought (T) step of the STARS roadmap to an Action (A) step of the STARS roadmap, wherein the Pleasure Index is a ratio of Pleasure (P) to Displeasure (DP), so that the student progresses to willed action or reflex right action stages when Pleasure (P) is greater than Displeasure (DP), the student progresses to a willed inaction stage when Pleasure (P) is less than Displeasure (DP).

Hereinafter, CA' means the at least one Creative Ambition(s) or compelling personal goal that may be fueled or energized or derived or sourced from the Spirit (S) of the student(s) as in the STARS roadmap. The student(s) are taught that their Spirit(s) may draw CA' from the Supreme Collective Intelligence (SCI') or from a collective group of people (SCI).

Hereinafter Supreme Collective Intelligence' (SCI') means the intelligence and knowledge of human society based on faith. SCI admits of many degrees up to full assurance of faith, in accordance with the evidence on which it rests. Faith is the result of teaching (Rom. 10: 14-17). Knowledge is an essential element in all faith, and is sometimes spoken of as an equivalent to faith (John 10:38; 1 John 2:3). Yet the two are distinguished in this respect, that faith includes in it assent, which is an act of the will in addition to the act of the understanding. Assent to the truth is of the essence of faith, and the ultimate ground on which our assent to any revealed truth rests is the veracity of God. Historical faith is the apprehension of and assent to certain statements which are regarded as mere facts of history. Temporary faith is that state of mind which is awakened in men (e.g., Felix) by the exhibition of the truth and by the influence of religious sympathy, or by what is sometimes styled the common operation of the Holy Spirit. Saving faith is so called because it has eternal life inseparably connected with it. It cannot be better defined than in the words of the Assembly's Shorter Catechism: "Faith in Jesus Christ is a saving grace, whereby we receive and rest upon him alone for salvation, as he is offered to us in the gospel." The object of saving faith is the whole revealed Word of God. Faith accepts and believes it as the very truth most sure. But the special act of faith which unites to Christ has as its object the person and the work of the Lord Jesus Christ (John 7:38; Acts 16:31). This is the specific act of faith by which a sinner is justified before God (Rom. 3:22, 25; Gal. 2:16; Phil. 3:9; John 3:16-36; Acts 10:43; 16:31). In this act of faith the believer appropriates and rests on Christ alone as Mediator in all his offices. This assent to or belief in the truth received upon the divine testimony has always associated with it a deep sense of sin, a distinct view of Christ, a consenting will, and a loving heart, together with a reliance on, a trusting in, or resting in Christ. It is that state of mind in which a poor sinner, conscious of his sin, flees from his guilty self to Christ his Saviour, and rolls over the burden of all his sins on him. It consists chiefly, not in the assent given to the testimony of God in his Word, but in embracing with fiducial reliance and trust the one and only Saviour whom God reveals. This trust and reliance is of the essence of faith. By faith the believer directly and immediately appropriates Christ as his own. Faith in its direct act makes Christ ours. It is not a work which God graciously accepts instead of perfect obedience, but is only the hand by which we take hold of the person and work of our Redeemer as the only ground of our salvation. Saving faith is a moral act, as it proceeds from a renewed will, and a renewed will is necessary to believing assent to the truth of God (1 Cor. 2:14; 2 Cor. 4:4). Faith, therefore, has its seat in the moral part of our nature fully as much as in the intellectual. The mind must first be enlightened by divine teaching (John 6:44; Acts 13:48; 2 Cor. 4:6; Eph. 1:17, 18) before it can discern the things of the Spirit. Faith is necessary to our salvation (Mark 16:16), not because there is any merit in it, but simply because it is the sinner's taking the place assigned him by God, his falling in with what God is doing. The warrant or ground of faith is the divine testimony, not the reasonableness of what God says, but the simple fact that he says it. Faith rests immediately on, "Thus saith the Lord." But in order to this faith the veracity, sincerity, and truth of God must be owned and appreciated, together with his unchangeableness. God's word encourages and emboldens the sinner personally to transact with Christ as God's gift, to close with him, embrace him, give himself to Christ, and take Christ as his. That word comes with power, for it is the word of God who has revealed himself in his works, and especially in the cross. God is to be believed for his word's sake, but also for his name's sake. Faith in Christ secures for the believer freedom from condemnation, or justification before God; a participation in the life that is in Christ, the divine life (John 14:19; Rom. 6:4-10; Eph. 4:15,16, etc.); "peace with God" (Rom. 5:1); and sanctification (Acts 26:18; Gal. 5:6; Acts 15:9). All who thus believe in Christ will certainly be saved (John 6:37, 40; 10:27, 28; Rom. 8:1). The faith=the gospel (Acts 6:7; Rom. 1:5; Gal. 1:23; 1 Tim. 3:9; Jude 1:3).

As we explore ways to generate more effective groups, organizations, institutions, and other human systems, it may help to begin by taking a closer look at Supreme Collective Intelligence (SCI). Supreme Collective Intelligence (SCI) is defined as follows: 1) The capacity of human communities to co-operate intellectually in creation, innovation and invention. 2) The cognitive powers of a group—e.g., perception, action planning and coordination, reasoning, prediction, memory, imagination and hypothesis generation, inquisitiveness, problem solving and, above all, learning capacity. 3) A form of universally distributed intelligence, constantly enhanced, coordinated in real time, and resulting in the effective mobilization of skills . . . No one knows everything, everyone knows something. 4) Human communities, organizations and cultures exhibiting "mind-like" properties, such as learning, perceiving, acting, thinking, problem-solving, and so on. This embraces phenomena variously known as distributed cognition, distributed knowledge systems, global brain, super-brain, global mind, group mind, ecology of mind, hive mind, learning organization, connected intelligence, networked intelligence, augmented intelligence, hyper-cortex, symbiotic man, etc. . . . Emotions, bodies, medias, sign systems, social relations, technologies, biological environment and physical supports also play roles in Supreme Collective Intelligence (SCI) processes. 5) The capability for a group to organize itself in order to decide upon its own future and control the means to attain it in complex contexts. 6) The oldest human social organization where individuals decide to mutualize their knowledge, know-how and experience in order to generate a higher individual and collective benefit than if they remained alone. 7) Supreme Collective Intelligence (SCI) is the foundation of positive-sum economies where the whole is more than the sum of its parties. 8) The capability of a collective/social system to hold questions and language too complex for any individual intelligence to hold, and to work out strategies, visions, goals, and images of a desired future, etc. 9) A specific property of a social structure, initialized when individuals organize, acquiring the ability to solve more complex problems than individuals can. This property amplifies if the social structure improves its synergy. 10) An unconscious, random, parallel and distributed computational process run by a social structure [such that the] social structure seems to be working well for a wide spectrum of beings (from bacterial colonies up to human social structures). 11) People of different backgrounds or talents working together so as to help optimize the meshing of those talents in organizations. 12) The capacity of families, groups, organizations, communities and entire societies to act intelligently as whole, living systems. 13) The capacity of communities to evolve towards higher order integration and performance through collaboration and innovation. 14) That which overcomes "groupthink" and individual cognitive bias in order to allow a relatively large number of people to cooperate in one process—leading to reliable action. 15) Empowerment through the development and pooling of intelligence to attain common goals or resolve common problems.

Collective

In its most generic sense, "collective" refers to any entity constituted by other entities—a whole with all its parts.

When used in the term "Supreme Collective Intelligence (SCI)," the word "collective" can refer to any or all human wholes—social entities such as relationships (friends, couples), families, groups, organizations, communities, networks, polities (cities, counties, states, provinces, nations), cultures, social systems (markets, governments, health care systems) or humanity as a whole.

By using the term "Supreme Collective Intelligence (SCI)," people are usually suggesting that some form(s) of intelligence characterize or can operate in or through such human collectives. In some definitions of Supreme Collective Intelligence (SCI), words like "group" are used in a generic sense meaning any social collective—a community, an organization, etc. For clarity here, I will use the terms "human collective" or "social collective" to cover that territory, while reserving the word "group" to refer to "people gathered in a room or for a specific activity" or "people of a certain type" without the unique connotations carried by words like "organization," "community" or "polity."

In some approaches to Supreme Collective Intelligence (SCI) the term "collective" is not limited to human collectives. It may refer to animal collectives such as flocking birds or nesting ants—or even to a larger living system like a forest. The term can also refer to groups of virtual artificially intelligent agents in computer environments. Perhaps most broadly, it can refer to the functioning of the entire planet or universe as an intelligent entity, whose intelligence is fed by and expressed through the entities in it.

The term "collective" is used to complexify our thinking about entities we most often think of as individuals, such as human persons. Supreme Collective Intelligence (SCI) in this case can refer to the intelligence arising from the diverse systems, intelligences or voices that make up a single individual person, seen as a composite being.

In short, the word "collective" in the term "Supreme Collective Intelligence (SCI)" may be most broadly thought of as referring to a holon—that is, any object seen as a whole made up of parts. Of course, such a whole is part of larger wholes, and such parts are also wholes in their own right. So the term "holon" contains within it the parts-within-wholes-within-larger-wholes pattern that pervades the universe. And "Supreme Collective Intelligence (SCI)" is the intelligence that relates to that pattern, at any and all levels.

Intelligence as a Capacity

Intelligence is defined as "the capacity to acquire and apply knowledge." Intelligence is "the ability to adapt effectively to the environment, either by making a change in oneself or by changing the environment or finding a new one." Many non-experts prefer simple, practical definitions like "the ability to solve problems." Intelligence includes "the ability to create, maintain, change and apply mental models so that they align with reality," "the capacity to respond creatively, appropriately and successfully to varied (or varying) circumstances," and even "the capacity to guide each subsequent unfolding of life or understanding into new, useful forms of coherence."

Intelligence may be characterized as capacities or functions that are variously ascribed to intelligence, and then to say that any instance of these characteristics, capacities or functions constitutes an example of intelligence. That means we would welcome into our "Supreme Collective Intelligence (SCI)" anyone who was exploring the collective expression of any of these characteristics, capacities or functions.

Intelligence includes: problem solving, learning, perception, applying knowledge, strategic skill; action planning, coordination and mobilization of resources, action that is reliable, successful, appropriate-to-context, response and adaptation to changing conditions, altering existing conditions to meet one's needs or, accomplish one's goals, reasoning, logic, analysis; information sorting and categorization, integration, synthesis, vision, prediction and scenario creation, intuition memory; retrievable storage of perceptions, ideas and knowledge, experience, consciousness, awareness, reflection, evaluation, deliberation, judgment, weighing options, decision-making, especially based on reason and evidence, accurate estimation of effort, generation, maintenance, application and revision of mental models/hypotheses imagination, visualization, creation, innovation, invention, inquisitiveness; information gathering, distinguishing the relevant from the irrelevant, seeing differences, similarities and identities, articulation, making sense and meaning; comprehension, understanding, capacitance (ability to contain complexity, nuance, uncertainty, and dissonance) evolution towards higher order integration and performance, and sense of timing.

Perhaps we can say that the more of these we find present, the more agreement we would probably get among diverse practitioners and scholars that "intelligence" is present.

While individual intelligence weaves many of these functions together more or less seamlessly, social forms of Supreme Collective Intelligence (SCI) often have these functions being often held by different parts of a social whole. For example, we can view researchers and investigators as the perceptual aspect of the society's intelligence, while academics do the analysis; ethicists, activists, judges and novelists do evaluations; managers and administrators do the planning and coordination; and so on. To their work is added the work of people and systems that care for and transmit information—educators, communications systems, libraries, media, etc. All these actors, activities and institutions together add up to a whole-society or whole-organization], institutionally-embedded form of Supreme Collective Intelligence (SCI) far beyond the capacities of any individual, which individuals can access.

Intelligence as Strategic Information

The other primary definition of intelligence is not a capacity but a quality of information—strategically useful information—"highly relevant, current information gathered, selected, distilled and/or evaluated to facilitate timely, high quality decision-making on important challenges, usually in a strategic context." This is the kind of intelligence that "intelligence agencies" generate for decison-makers in government and the military. Through the lens of our model above, we could say that it is information that has been put through a lot of the above-noted functions—gathering, evaluation, analysis, comprehension, etc.—so that all that remains is decision, planning and action.

Although "intelligence professionals" make up only a small percentage of those explicitly concerned with "Supreme Collective Intelligence (SCI)," their entire profession is a de facto manifestation of Supreme Collective Intelligence (SCI): Creating strategic intelligence requires many different people in a coordinated effort—an effort usually colored by the profession's traditional obsessions with secrecy, security and battle. In fact, many of the intelligence professionals who are exploring "Supreme Collective Intelligence (SCI)" are explicitly interested in freeing the "intelligence community" from those obsessions and enhancing the open Supreme Collective Intelligence (SCI) of the entire society. To engage their participation, their usage of the word "intelligence" needs to be folded in to our larger sense of what intelligence is all about.

Sources of Supreme Collective Intelligence (SCI)

Practitioners differ widely on where Supreme Collective Intelligence (SCI) (as a capacity) comes from and where it resides. There are often unacknowledged assumptions about this which can seem to divide practitioners but which, when teased out and articulated, may in fact overlap or complement each other. In any case, all these perspectives can be considered valid for our purposes—within the overarching definition given above—and can be explored in more depth when they come together in dialogue. I've listed a number of these perspectives below; more can be written. Many approaches to Supreme Collective Intelligence (SCI) combine several of these perspectives.

Supreme Collective Intelligence (SCI) belongs to or is a property of the whole in which individuals are embedded or of which they are an expression. It transcends and is in some way "other than" the intelligence of those individuals. From this [usually spiritual or deep-ecological] perspective, the intelligence pre-dates and will survive those individuals, although they may be involved in its evolution. It is often experienced by some of those individuals as a larger intelligence that operates through them, especially when they are individually or collectively attuned to it (as one tunes a radio to pre-existing radio waves).

Supreme Collective Intelligence (SCI) is a background field of intelligence co-generated by the minds that make it up, which influences and can be accessed by those minds (as in Sheldrake's morphogenic fields and Jung's collective unconscious).

Supreme Collective Intelligence (SCI) is an emergent property of the collective as a (social) system. As such, it has some significantly different characteristics than the intelligences that are embedded in it. It is generated from (and, in a sense, resides in) the dynamics of the system as a whole, of which those individual intelligences are one aspect, along with information gathering, collective records, communication systems, educational and co-learning systems, cultural patterns (of collaboration or competition, for example), and other factors.

Supreme Collective Intelligence (SCI) is a group phenomena in which the intelligences of individual participants who are in tune with each other merge into a larger form of intelligence within which meaning and action flow and evolve smoothly, more or less as one mind. This is experienced vividly by most participants as a form of self-transcendence and a source of wonder, often called "group magic."

Supreme Collective Intelligence (SCI) is cognitive synergy—the synergistic product of appropriately diverse perspectives in conversation (dialogue, deliberation, shared reflection) where that diversity stimulates new insights or is used to paint a more inclusive picture of reality rather than a more fragmented one. The Supreme Collective Intelligence (SCI), in this case, embraces the conversational group and any individuals, groups or communities whose thoughts, feelings and behaviors are shaped by that group's output.

Supreme Collective Intelligence (SCI) is a phenomenon associated with distributed individual intelligences who have access to their collective output and thought processes through their co-generative participation (e.g., in the World Wide Web). There is a gigantic feedback loop in which the whole feeds the parts and the parts feed the whole. However, the whole, in this case, is little more than the accumulated intelligences of the participating individuals. Any enabling systems facilitate, but do not contain or source, the resulting Supreme Collective Intelligence (SCI), which resides in the individuals considered collectively and does not have a coherence of its own.

Supreme Collective Intelligence (SCI) resides in bodies of information, know-how, ideas, etc., that are collectively generated, processed and made accessible to all as needed. (This is another view of the WWW, as well as libraries, science, education, etc. It is like the previous perspective, but centers on the information, itself. Thus, it is also the perspective most aligned with visionaries in "the intelligence community.")

Supreme Collective Intelligence (SCI) is a natural product of the independent opinions or behaviors of diverse individuals or groups in a decentralized system (flock, market, guessing game) that aggregates those opinions or behaviors. Given sufficient diversity, independence and local sources of information, the Supreme Collective Intelligence (SCI) arises from an almost statistical cancelling of errors on either side towards an average of correctness—or from automatic whole-system adjustments arising from simple rules of relationship and self-interest.

Finally, these two perspectives of the Supreme Collective Intelligence (SCI) field:

Supreme Collective Intelligence (SCI) is an augmentation of individual intelligence obtained through cooperation, communication, or participation in systems or activities designed to do that. Any increased intelligence manifests ONLY through the activities of individuals. (Calling this phenomenon "Supreme Collective Intelligence (SCI)" may be a misnomer, as it is more mutual than collective.)

Supreme Collective Intelligence (SCI) is a natural epiphenomenon of successful cooperative action toward shared goals. In this sense, it is viewed less as an independent capacity and more as a way of describing, in retrospect, what went into that success.

Referring to problems that we face in the world today, we seldom find that individual evil is a central cause. More often we find basically good, intelligent people collectively generating discord and disaster—in families, groups, organizations, nations and the world. Meanwhile, in their own lives, from their own perspective (and usually that of their loved ones), most of them are doing perfectly good, decent things. How can this be?

Clearly individual intelligence is not enough. If we wish to successfully deal with the various social and environmental challenges we face today, we need to develop far more Supreme Collective Intelligence (SCI) as a society and as a global civilization and then apply that Supreme Collective Intelligence (SCI) with wisdom.

There are many different kinds of Supreme Collective Intelligence (SCI), including
  the Supreme Collective Intelligence (SCI) generated by high quality conversations among diverse people working together
  the Supreme Collective Intelligence (SCI) generated by independent consumers in a market
  the Supreme Collective Intelligence (SCI) of global information systems we reach through computers
  the psycho-spiritual fields of Supreme Collective Intelligence (SCI) we can reach through meditation and deep dialogue
  the Supreme Collective Intelligence (SCI) of whole societies who weave all of these into their cultures and into their political, governmental and economic institutions.

To date, much has been learned about how to develop Supreme Collective Intelligence (SCI) within organizations-usually to help corporations become more competitive in the global market. Good work has also been done to increase Supreme Collective Intelligence (SCI) in civil society at the community level, especially to deal with local environmental conflicts.

This much is clear: Given the right conditions—conditions which have been created in numerous environments around the world on many occasions—communities and societies can collectively reflect on their problems and possibilities, and collectively choose and implement effective, even brilliant solutions and initiatives. Understanding Supreme Collective Intelligence (SCI) can help us fulfill the original dream of democracy: the participatory determination of our collective fate.

The following is a list of human systems which are capable of Supreme Collective Intelligence (SCI). Note that these are HUMAN systems. Other organisms, social species and ecosystems—and even computer systems—are also capable of Supreme Collective Intelligence (SCI).

At the very least, right now, we can be conscious of the level(s) or system(s) we're focusing on, and realize that others may be focusing on other levels or systems—and that that may be a significant reality. One embodiment of the Supreme Collective Intelligence (SCI) focuses on community and whole society Supreme Collective Intelligence (SCI). A tremendous amount of work has been done on Supreme Collective Intelligence (SCI) in organizations, because corporations have the funds and motivation to support such work. What sorts of Supreme Collective Intelligence (SCI) are most vital for our survival and survival as a civilization? What needs to happen for those sorts of Supreme Collective Intelligence (SCI) to evolve and grow rapidly?

After the list, you will find some examples of Supreme Collective Intelligence (SCI) at various levels of society.

Some Human Systems in which We Can Observe and Nurture Supreme Collective Intelligence (SCI):
1) INDIVIDUAL Supreme Collective Intelligence (SCI) (Supreme Collective Intelligence (SCI) among our own internal subjective parts and voices); 2) INTERPERSONAL/RELATIONSHIP Supreme Collective Intelligence (SCI); 3) GROUP Supreme Collective Intelligence (SCI); 4) ACTIVITY Supreme Collective Intelligence (SCI); 5) ORGANIZATIONAL Supreme Collective Intelligence (SCI) NETWORK Supreme Collective Intelligence (SCI); 6) NEIGHBORHOOD Supreme Collective Intelligence (SCI); 7) COMMUNITY Supreme Collective Intelligence (SCI) CITY Supreme Collective Intelligence (SCI); 8) COUNTY/SHIRE Supreme Collective Intelligence (SCI); 9) STATE/PROVINCE Supreme Collective Intelligence (SCI) REGIONAL Supreme Collective Intelligence (SCI); 10) NATIONAL/WHOLE SOCIETY Supreme Collective Intelligence (SCI); 11) INTERNATIONAL GROUP/NETWORK/ORGANIZATION Supreme Collective Intelligence (SCI); and 12) GLOBAL HUMANITY Supreme Collective Intelligence (SCI). Examples of Supreme Collective Intelligence (SCI) at Different Levels of Society Given the central importance of Supreme Collective Intelligence (SCI), let us take a closer look at this phenomenon. The following examples show how Supreme Collective Intelligence (SCI) might be applied at a variety of levels: in groups, organizations, communities, states, and whole societies.

Groups

An individual IQ test compares individuals' problem-solving skills with the problem-solving capabilities of others their age. In a similar manner, we could demonstrate the existence of group intelligence by comparing how well various groups solve problems.

In a classic experiment, group intelligence was measured by presenting small groups of executives with a hypothetical wilderness survival problem. All-female teams arrived at better solutions (as judged by wilderness experts) than all-male teams. The women's collective problem-solving capabilities were enhanced by their collaborative style, while the men's efforts to assert their own solutions led them to get in each other's way. Significantly, the resulting difference in Supreme Collective Intelligence (SCI) did not occur because the individual women were smarter than the individual men, but rather because of a difference in gender-related group dynamics.

This example also shows how collaborative intelligence can enhance a group's Supreme Collective Intelligence (SCI). When people align their individual intelligences in shared inquiries or undertakings, instead of using their intelligence to undermine each other in the pursuit of individual status, they are much more able to generate Supreme Collective Intelligence (SCI).

In the pursuit of Supreme Collective Intelligence (SCI), organizations often invest in many kinds of "team-building" approaches in order to generate greater collaboration within groups. There are also many simple, low-cost approaches that can be used to help neighborhood, community, and activist groups develop greater collaborative and Supreme Collective Intelligence (SCI).

Organizations

Can a whole organization exhibit intelligence? In November 1997, 750 forest service employees used a technique called Open Space Technology to create, in just three days, a shared vision of change, including action plans. The vision that this group generated covered all facets of forest service activity, and the employees were genuinely excited about implementing the action plans they themselves had developed. This one-time exercise had a lasting effect upon the larger system.

Several organizations and networks, such as the Society for Organizational Learning, research and promote the capacity for organizational intelligence by helping corporations build a culture of ongoing, high-quality dialogue that examines the whole-system dynamics in and around the organization. Just as group intelligence depends on things such as group process, organizational intelligence depends on organizational factors. These factors range from an organizational culture that promotes dialogue to organizational memory systems (files, records, databases, minutes, etc.). They include systems that collect and utilize feedback (learning inputs) from inside and outside the organization, as well as efforts to understand the feedback dynamics (cycles and interdependencies) that govern the organization as a living system. When such things are in place, an organization can create, accumulate and use understandings and solutions which become part of the organization itself-knowledge that outlasts the tenure of individual employees and executives. In other words, the organization is learning, exercising its intelligence and applying it in life the same way an individual does.

One particularly interesting innovation is chaordic organization. The term "chaordic" was coined by Visa co-founder Dee Hock to describe complex, self-organizing systems that manifest both chaotic and orderly qualities. In The Birth of the Chaordic Age, he describes how a chaordic organization, such as the Internet, is not so much a thing as a pattern of agreements about interactions which help voluntary participants achieve certain shared goals or visions, guided by certain agreed-on principles. Such organizations provide workable alternatives to conventional command-and-control structures. The Chaordic Commons is a non-profit organization dedicated to making this work available in the world.

As mentioned earlier, much of the research on how to generate Supreme Collective Intelligence (SCI) has taken place within the private sector. Unfortunately, all too many corporations are still playing a destructive role within our larger system, and are using their enhanced Supreme Collective Intelligence (SCI) to consolidate power and consume resources faster. This is in part because society has yet to change the fundamental "rules of the game," including how corporations are chartered and monitored.

Nonetheless, if we are to survive as a species, we need to apply our knowledge of Supreme Collective Intelligence (SCI) to larger and nobler ends than profit. Our non-profit, community, and social change organizations can improve their capacity for creating effective change by applying the knowledge that has been gained about collaborative leadership, whole-system planning, self-directed work teams, and a host of other innovations.

Communities

What would community intelligence look like? Perhaps we see a budding example of it in Chattanooga, Tenn., which in the early 1980s was reeling from local recession, deteriorating schools, and rising racial tensions. Several dozen citizens formed Chattanooga Venture, an on-going, cross-class, multiracial organization that involved hundreds of people in an inclusive effort to set and achieve community goals. Of 34 specific city-wide goals set in 1984, 29 were completed by 1992, at which point Chattanooga Venture again convened hundreds of citizens to create new community goals. Among the goals realized through this process was the creation of Chattanooga's Neighborhood Network, which organized and linked up dozens of neighborhood associations to help people co-create a shared future right where they lived, enhancing their community intelligence even further. Chattanooga Venture provides a glimpse of the sort of ongoing Supreme Collective Intelligence (SCI) we could build to solve problems, to learn together, and to generate a better life right at home.

There are many other inspiring examples of the effort to develop community intelligence. Many of these have been carried out using the approach of Asset Based Community Development (ABCD). This community organizing approach does not directly address a community's problems or treat citizens as clients in need of services from government and nonprofit agencies. Rather, it sees citizens as assets and as co-creators of their community. ABCD organizers help citizens discover, map and mobilize the assets that are hidden away in all the people who live in their community, as well as in the community's informal associations and formal institutions. Those resources, brought out of their isolation and into creative synergy with each other, are then used to realize the community's visions. See John P. Kretzmann and John L. McKnight's Building Communities from the Inside Out or nwu.edu/IPR/abcd.html.

States and Provinces

A statewide example of Supreme Collective Intelligence (SCI) can be found in the efforts of the non-profit Oregon Health Decisions (OHD), which involved thousands of diverse, ordinary Oregonians in in-depth conversations about how to best use limited health care funds. Hundreds of such meetings in the 1980s resulted in the legislature mandating in 1990 the use of community meetings to identify the values that should guide state health care decisions. With experts "on tap" to provide specialized health care knowledge, citizens weighed the trade-offs involved in over seven hundred approaches to deal with specific medical conditions, and decided which should be given preference.

In general, approaches that were inexpensive, highly effective, and needed by many people (which included many preventative measures) were given priority over approaches that were expensive, less effective and needed by very few people. Although clearly some people would not get needed care under this system, it was pointed out that some people did not get needed care under the existing system. The difference was that in the old system, it was poor people who fell through the cracks by default. In the new system, Oregonians were trying to make these difficult decisions more consciously, openly and justly. So they tapped into the Supreme Collective Intelligence (SCI) of their entire state, weaving together citizen and expert contributions into a wisdom greater than any person or group could have generated separately.

Nations and Whole Societies

Admittedly, increasing the level of Supreme Collective Intelligence (SCI) on a national or societal level can be a daunting proposition. How can we begin to involve everyone in a dialogue about the issues we face, when working at such a large scale? I offer the following paragraphs as a "preview" of an approach described elsewhere on this site that offers some ideas about avenues to explore if we wish to invite a deeper national dialogue.

One weekend in June 1991, a dozen Canadians met at a resort north of Toronto, under the auspices of Maclean's, Canada's leading newsweekly. They had been scientifically chosen so that, together, they reflected all the major sectors of public opinion in their deeply divided country. Each of these people had accepted the invitation to attend this weekend event, where they would be engaging in dialogue with people whose views differed from their own strongly-held beliefs. The dialogue was facilitated by Harvard University law professor Roger Fisher, co-author of the classic Getting to Yes, and two colleagues. These ordinary citizens had never engaged in a process like this before. They started with widely divergent positions, and little trust among them. The process took place under tremendous time pressure, as well as under the eye of a camera crew from CTV television who was recording the event for a special public-affairs program. Nonetheless, these folks succeeded in their assignment of developing a consensus vision for the entire country of Canada. Their vision was published in four pages of fine print, part of the thirty-nine pages that Maclean's devoted to describing their efforts in their Jul. 1, 1991 issue.

This experience was a very moving event for all who participated in it or witnessed it. Maclean's editors suggested that "the process that led to the writing of the draft could be extended to address other issues." Assistant Managing Editor Robert Marshall noted that earlier efforts, including a parliamentary committee, a governmental consultative initiative, and a $27 million Citizens'Forum on Canada's Future, all failed to create real dialogue among citizens about constructive solutions, even though those efforts had involved 400,000 Canadians in focus groups, phone calls and mail-in reporting. "The experience of the Maclean's forum indicates that if a national dialogue ever does take place, it would be an extremely productive process."

The Maclean's experiment is a type of process that may be termed "a citizen deliberative council". These councils are diverse groups, somewhat like a jury, who are called together as a microcosm of "We the People" in order to learn, dream, and explore problems and possibilities together while the rest of society observes their deliberations. This approach can dramatically change the political environment, as subsequent government decisions are made in a context of greater public wisdom, sophistication and consensus. Many types of these citizen councils have been used in at least sixteen countries.

As we have seen, Supreme Collective Intelligence (SCI) is a phenomenon that can occur at various levels. Yet, what do all of these examples of Supreme Collective Intelligence (SCI) have in common? What makes all these forms of Supreme Collective Intelligence (SCI) similar?

Inclusion and the Intelligence of Democracy

At all levels, from groups to whole societies, the degree to which various perspectives are included increases the Supreme Collective Intelligence (SCI) of the whole. Supreme Collective Intelligence (SCI) increases as it creatively and constructively includes diverse relevant viewpoints, people, information, etc., into collective deliberations.

Historically, practical considerations have allowed everyone's voice to be heard only in small groups, such as town meetings. In its ideal form representative democracy was imagined to provide legitimate, manageable small groups (legislative, administrative and judicial bodies) through which (at least theoretically) the voices of whole populations could be channeled. However, over time, our legislatures, executives and judges have become both less representative and less responsive-a situation that has led many of us to reconsider our political and governmental arrangements.

But there is good news: Simultaneous with this development, humanity has been developing powerful tools which could solve these problems. For example, the citizen deliberation councils described earlier could be combined with sophisticated use of media, especially telecommunications and powerful group processes that foster the creative use of diversity. Furthermore, the national councils could be used to spark more and better dialogue at the local level.

This idea combines only a few of the hundreds of approaches that are currently available. This website describes many social innovations that we could weave together in a variety of ways to create remarkable enhancements to our present system. If we take this challenge, I believe we will find ourselves poised on the edge of our next evolutionary leap in democracy—not just as an alternative to tyranny, but as an inclusive path to society-wide Supreme Collective Intelligence (SCI) and wisdom.

What is intelligence? Most importantly, it is our capacity to respond successfully—or at least well enough—to changing circumstances. But how, exactly, do we do that? If we look closely, we find that intelligence is not one thing, but rather a cluster of diverse interrelated capabilities like memory, creativity, learning, and problem-solving.

The same functions that are involved in "individual intelligence" are also be involved in "Supreme Collective Intelligence (SCI)".

The following are the most familiar aspects of intelligence. Supreme Collective Intelligence (SCI) is an expansion of our thinking from individual intelligence to Supreme Collective Intelligence (SCI).

For each of the intelligence capacities I discuss, I first note how it shows up in our individual lives. Then I explore how that capacity is or could be exercised in the Supreme Collective Intelligence (SCI) of communities and societies. I believe that the more successfully we collectively perform each of these functions, and the more successfully we weave them all together, the more Supreme Collective Intelligence (SCI) we will enjoy in our societies and communities.

Eight Capacities that Make Up Supreme Collective Intelligence

The capacities I explore here are perception, communication, memory, reflection, problem-solving, creativity, implementation, and feedback. They are listed in a loose order (we perceive first, then think about what we saw, then implement what we decide, etc.). Keep in mind, however, that these capacities are not really separate or linear. Most of them are deeply involved in each other's functioning. For example, our memories influence what we perceive.

PERCEPTION—Seeing, hearing, feeling, etc.—these are different ways we absorb information from our environment, or gather it from within ourselves. This information is the foundation for everything we do with our intelligence. HOW DO WE DO THIS COLLECTIVELY? News reporters, photographers, satellites and researchers gather information, which shows up as stories, data, statistics, pictures, and so on—adding up to collective perception available to the whole society (more or less). Clearly, the quality of this information—its accuracy, completeness, relevance, diversity, clarity, etc.—has a profound effect on how well our Supreme Collective Intelligence (SCI) can function. Institutions that collect or create good information or monitor its quality, can greatly enhance Supreme Collective Intelligence (SCI). Likewise, social dynamics that degrade information—such as concentrated ownership of media or research facilities, or an undue focus on monetary measures of social health (e.g., Gross Domestic Product, the stock market averages)—tend to degrade or skew Supreme Collective Intelligence (SCI).

COMMUNICATION—For intelligence to operate, information needs to move from one place to another. Inside our brains and bodies, millions of bits of information streak through nerves and cell walls every minute. HOW DO WE DO THIS COLLECTIVELY? Communications media—from telephones to televisions, from print media to powerpoint presentations, from classrooms to billboards, from package delivery systems to networks of conversation (in computers, cafes, homes . . . )—all these carry information from one part of society to another. Supreme Collective Intelligence (SCI) is served by keeping communication lines free of distortion, openly flowing, accessible, diverse and dependable.

MEMORY—Everything we each experience can be preserved for later use. Memory involves both storing information and being able to access it later when we need it. HOW DO WE DO THIS COLLECTIVELY? With files, libraries, databases, the memories of elders and experts, the World Wide Web and dozens of other methods for storing collective information and making it accessible. Society's collective memory survives generations, and is passed on through education, in which one generation is taught to access the collective memory of the culture's earlier generations. Just as individual memory can become distorted or inaccessible, so can collective memory. Efforts to counter memory distortion—such as historical research and media critiques—serve Supreme Collective Intelligence (SCI).

REFLECTION/LEARNING—We think about things, sorting out and processing information. In doing so, we construct or modify our mental models and stories about how the world works. When we have models and stories that feel coherent and useful to us, we feel like we "understand" something. HOW DO WE DO THIS COLLECTIVELY? Academic and scientific research and philosophy, spiritual and ethical inquiry, as well as much art, literature, and performance generate and spread new collective knowledge and new collective insights about how life works. Often this is done by individuals for the larger society, but usually it is part of larger systems of reflection involving institutions of higher learning, think-tanks, various schools of thought, etc. Under the right circumstances, however, the widely distributed reflections of hundreds of thousands of people—or of a specially chosen, highly visible group—can add up to the collective reflection of, by and for a whole society.

PROBLEM-SOLVING/DELIBERATION/JUDGMENT/DECISION-MAKING—Life or teachers present us with problems to solve, options to weigh, decisions to make. In real-life problems, we need to weigh possible solutions against costs, potential consequences, and our values. Intelligence helps us work all this out. HOW DO WE DO THIS COLLECTIVELY? Most of our society's official, visible problem-solving, option-creating and decision-making are done (allegedly) on our behalf by think-tanks, pundits, elected officials, etc. But many decisions that influence the direction of our society are made—less visibly—by unanswerable powerholders and corporate executives, scientists and engineers. Democracy involves more public engagement in collective problem-solving and decision-making. Any institutions that help us do this well—especially by using our diversity well—become part of our society's Supreme Collective Intelligence (SCI) capacity.

CREATIVITY/IMAGINATION—We can step "out of the box"—beyond old ways of seeing, thinking and responding. We can imagine new possibilities and stories about life. This capacity is especially important when circumstances change and we need to adapt. HOW DO WE DO THIS COLLECTIVELY? Since individual creations are often adopted by the society, collective creativity is often rooted in individual creativity. So social and cultural factors that encourage individual creativity—like freedom, social rewards and creative education—can play a major role. A society can also stimulate collective creativity by using its natural dissent, conflict, and diversity well to shake up old ways and conformist dynamics. Certain group processes are especially effective at using diversity well, and the fruits of their group co-creativity can then be passed on to the society as a whole.

IMPLEMENTATION/APPLICATION/ACTION—What we know, believe and decide shape how we act. Furthermore, there are smart and stupid ways to use what we know. Still, as individuals, we tend to act as one agent. Such coherence is harder to achieve when many people are involved. HOW DO WE DO THIS COLLECTIVELY? The old way is command-and-control systems: Everyone is ordered to march to the collective drummer, or else—or simply paid for cooperating. This approach provides collective coherence—but it usually interferes with other factors in Supreme Collective Intelligence (SCI) like creativity and diversity. New approaches to generating collective coherence often involve the co-creation of—or free alignment with—shared visions, values, purposes, goals, stories, etc. Powerful group processes that creatively address everyone's concerns—often called "consensus processes"—tend to naturally align all parties with the effort to implement the resulting decisions. These processes can be institutionalized to impact the whole social system. Furthermore, widely dispersed actions by diverse players can—under certain conditions, both coordinated and uncoordinated—add up to coherent collective behavior.

FEEDBACK/REVIEW—This involves applying our intelligence to the RESULTS of our actions—observing what happened, reflecting on it, creating new options (if necessary) to try again. We call this "learning from our experience." HOW DO WE DO THIS COLLECTIVELY? Review commissions, elections, watchdogs, whistleblowers, ombudsmen, and so on, as well as many academic and advocacy research efforts take a second look at what is going on in society. Review functions institutionalized to reflect on the results of every collective decision can particularly enhance Supreme Collective Intelligence (SCI), if they are done with high quality information and thoughtful conversation.

PARALLEL PROCESSING: "Parallel processing" refers to an arrangement in which many individual agents are simultaneously performing some intelligent function and are linked together in ways that aggregate their efforts into a coherent product. This is a major resource for Supreme Collective Intelligence (SCI) that can be applied to many of the intelligence functions noted above. An example of this would be the Wikipedia, which is a high-quality encyclopedia continually co-created by hundreds of thousands of independent volunteers.

CONSCIOUSNESS: The second aspect of intelligence to note is the existence of conscious and unconscious functions of intelligence. Much of our perception, for example, happens unconsciously. Research shows that our perception is powerfully (and usually unconsciously) shaped by language and our personal and cultural assumptions. Likewise, much reflection occurs unconsciously, sometimes in dreams, other times through intuitions. Many therapies and creative methodologies involve bringing these unconscious dynamics up into our consciousness.

There may be parallels in Supreme Collective Intelligence (SCI). The workings of mainstream media and education as the culture's conscious Supreme Collective Intelligence (SCI)—where the whole society sees itself thinking—whereas the workings of networks, individual efforts, interest group activities, fringe groups, etc., are the unconscious Supreme Collective Intelligence (SCI) of the society.

Enhancing a society's Supreme Collective Intelligence (SCI) may involve improving the quantity and quality of work that is not collectively conscious—that is, wholly visible in the mainstream (e.g., facilitating widespread local conversations on diverse public issues)—AND/OR bringing non-mainstream activities and their fruits more into the mainstream—that is, making the unconscious conscious (e.g., broadcasting successful high quality small-group public deliberations between polarized citizens as featured mainstream news stories).

COLLECTIVE IDENTITY: The final factor to note is the question of WHO is the collective? When we're talking about a community or society, we are including all its members, or at least the full range of roles, interests, viewpoints, etc., that make it up. But a society uses shortcuts—symbols—to represent all that. It creates institutions and cultural icons—from flags to presidents to buildings—to symbolize itself as a collective entity. When the President of the U.S. makes a speech (especially in another country), the news reporters may say "The U.S. has taken a new stance on global warming"—as if the president WERE the country. Shifts in these symbols or how they are constituted can make a big difference, if those shifts are designed to enhance Supreme Collective Intelligence (SCI). For example, we could set things up so that a new randomly selected group of citizens were chosen each year to reflect for a week on the state of the country and report back to the rest of us using mainstream media. Such a periodic temporary group could be "chartered" or legitimized by us as embodying our collective voice—the voice of "We the People." They would be a symbol of us, of our diversity, of our ability to work together.

Deliberative democracy experts sometimes speak of "creating a public"—meaning a citizenry that is involved in dealing with public issues, influencing public decisions, and "doing public work" (e.g., helping in their community or engaging in policy deliberations). Democratic innovator Jim Rough speaks of using certain forms of sustained citizen engagement "to create a We the People"—a diverse but coherent community that self-identifies as a powerful co-creative agent of its own destiny.

This sort of effort is especially important if we wish to make our Supreme Collective Intelligence (SCI) more conscious, intentional and wise—a development I believe is vital to our survival through the 21st Century. But Supreme Collective Intelligence (SCI) will go on as long as society exists, even without these innovations. Supreme Collective Intelligence (SCI), like individual intelligence, just IS. It may be great or small, balanced or skewed. Sometimes aspects of a society's Supreme Collective Intelligence (SCI)—like its scientific and military brilliance—will be outstanding, while its ability to collectively reflect on the results of its actions may be sadly limited. You and I can get a sense of how intelligent a community or country is simply by observing its overall health, its relationships with other communities or societies or nature, its long-term prospects, etc. In this case, we don't need to quibble about WHO that intelligence belongs to; it is the aggregate of all the individuals and groups who generated that result. Our real question is: What do we want to do to improve it?

Supreme Collective Intelligence (SCI) is a holy grail of social change. If we could better understand how to support it, increase it and facilitate it, we would be more able to effectively co-create a better world. Doing that, of course, involves significant political, economic, social, cultural, organizational and spiritual challenges. But the rewards, when these challenges are successfully engaged, are tremendous.

Referring to FIG. 19, in step 1260 of the method 1250, the student is instructed to identify at least one Thought (T) as in a STARS roadmap for achieving the Creative Ambition or the compelling personal goal (CA'). In the step 1265, the student is instructed to ascertain in which thought awareness stage their Thought (T) for achieving the Creative Ambition or the compelling personal goal (CA') is. In the step 1270 the student is instructed to list a Thought (T) and/or Action (A) for at least one de-compartmentalized achievement in a blank TPE field of the at least one pair of TPE compartments that are related to the achievement.

The student(s) are instructed that their thoughts are how they conceptualize and process ideas. The student(s) are taught to create thought awareness in order to conceptualize and process ideas. Methods of creating thought awareness include 1) meditation, 2) prayer, 3) reading, and 4) communicating and discussing creative ambitions and compelling goals in groups of people who share a desire to achieve success such as participation in support groups. Creating thought awareness enables the student to achieve active control of their mind to manipulate their thoughts and generate the mental energy required to support their goals. Success requires disciplined thought and focus to achieve results. The student is taught their spirit generates energy and their mind channels that energy through analysis and planning to facilitate productive activity. The student is taught a benefit of thought awareness is enabling the student to maintain the mental agility. The student is taught to continually channel their spirit energy into sustained action in order to realize their dreams.

Thought can be a double-edged sword. There are ways the student's Thoughts (T) support success and ways the student's Thought's (T) undermine success.

Figure 20:
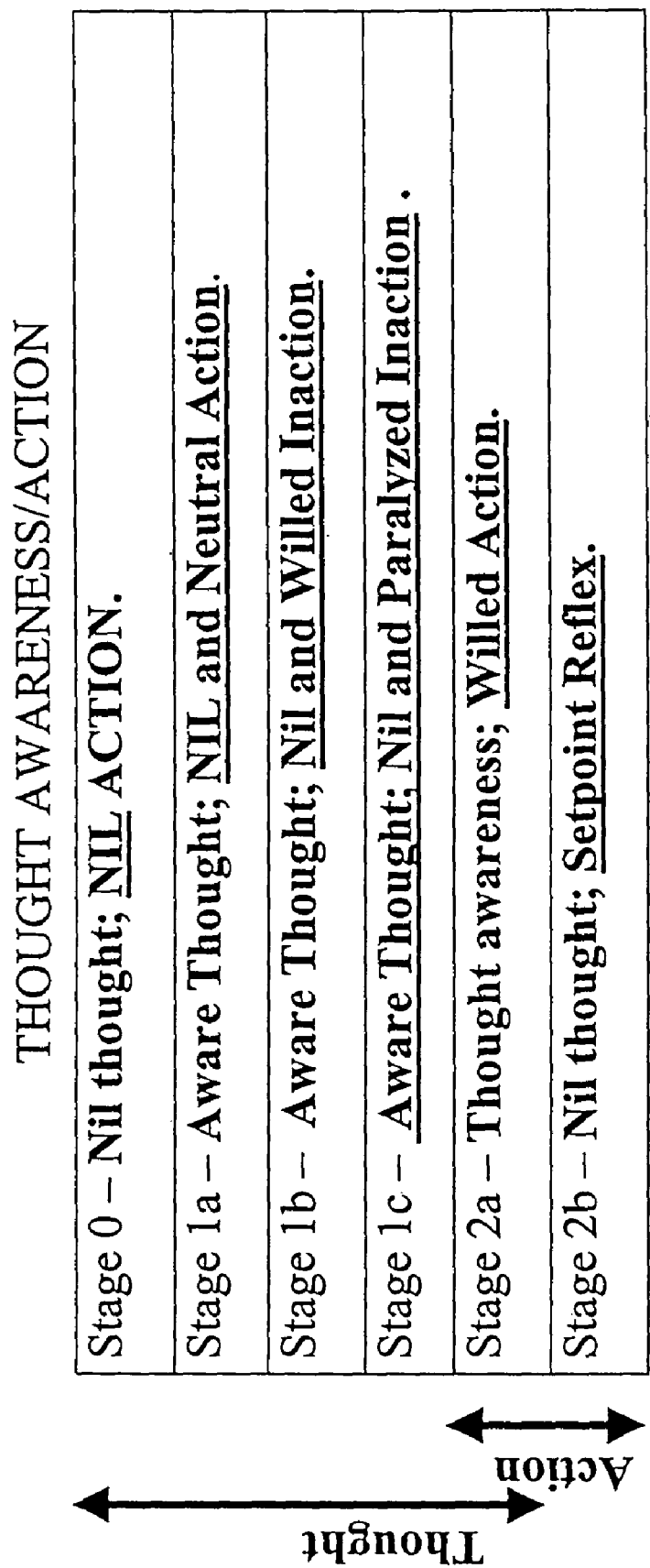
FIG. 20 depicts Thought Awareness/Action stages, according to the present invention.

FIG. 20 depicts Thought Awareness/Action stages, wherein each Thought Awareness/Action stage is selected from the group consisting of a Nil Thought, Nil Action (stage 0); an Aware Thought, Nil and Neutral Action (stage 1 a); an Aware Thought, Nil and Willed Inaction (stage 1b); an Aware Thought, Nil and Paralyzed Inaction (stage 1 c); an Aware Thought, Willed Action (stage 2a); and Nil Thought, Setpoint Reflex Action (stage 2b).

Stage 0 Activity—Nil thought, nil Action

This is the domain of no conscious thought and no action or physical activity. Here you have no awareness of thought. Perhaps thoughts and ideas either never exist or exist only on a subconscious level. Some sort of a trigger or stimulus will bring fort conscious awareness of thought out of this domain or you may experience the spontaneous birth of a thought. Note here that I do not distinguish between subconscious thought and the complete absence of thought. Subconscious thought would be a thought that would undergo the transformation of repression which effectively walls it off like an infection, but it remains present but buried within your psyche. From a practical standpoint here is no difference if neither repressed thought nor repressed thought is having absolutely no bearing upon your behavior. The management of repressed thoughts that do impact upon behavior is too complex for this workbook and is the subject of psychoanalysis and other complex psychological forms of treatment.

Figure 21:
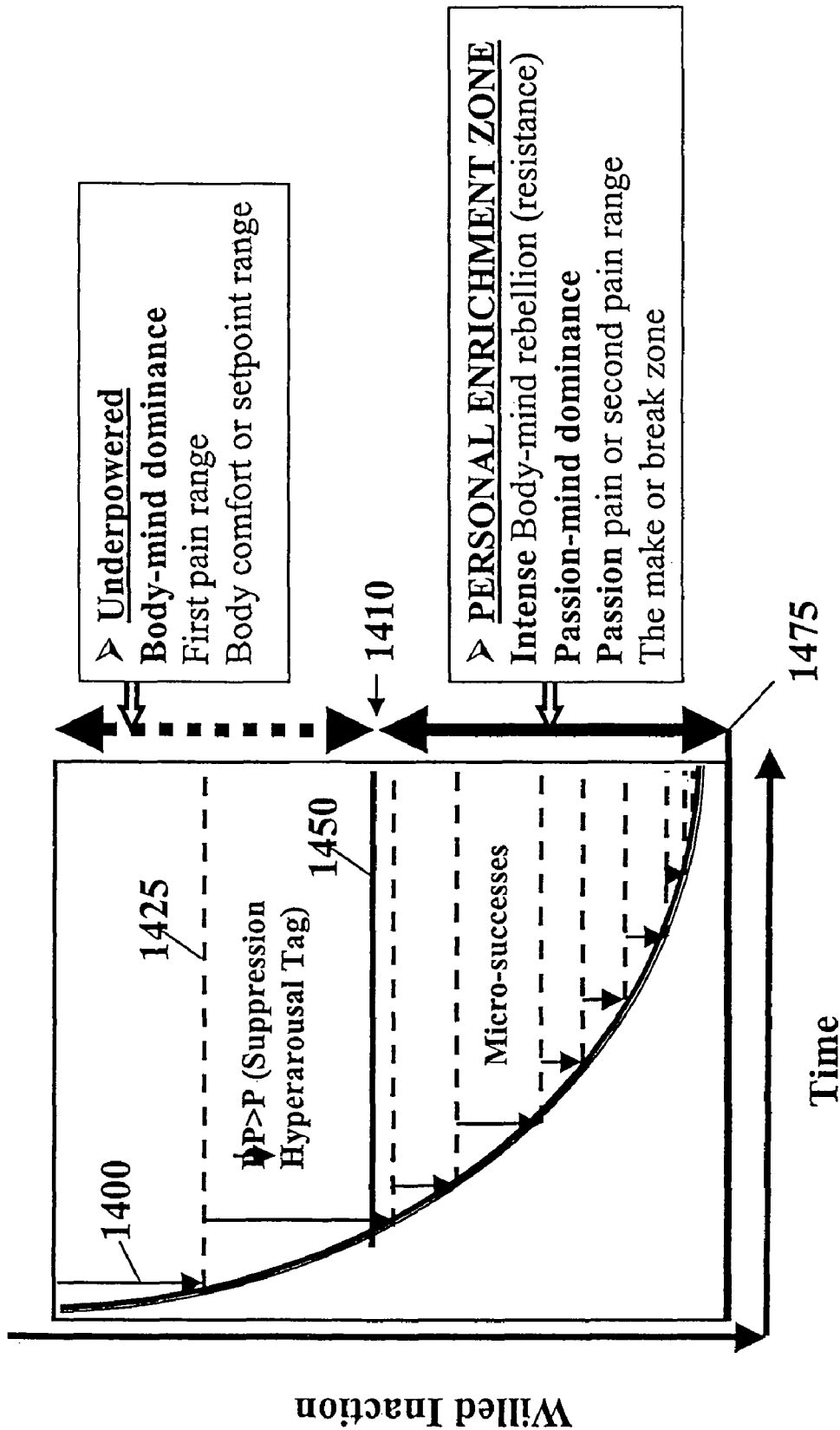
FIG. 21 depicts Stage 1b activity—Thought Awareness, according to embodiments of the present invention.

FIG. 21 depicts Stage 1b activity—Thought Awareness; Willed Inaction. It is very important to understand the interaction between thought and action. Thought and action can take on a variety of forms and these are described in the stages 0, 1a, 1b, 1c, 2a, and 2b. In FIG. 21, we will deal with activities that have the characteristics of being in your conscious awareness but you choose not to take action. For example, you are aware of the urge to use the bathroom but you choose not to go to the bathroom. That is, you exercise your will not to take action. However, this category of thought awareness and willed inaction 1$b$ can take on very significant and powerful proportions. Let's take the case of the alcoholic.

The key challenge of the alcoholic is for him to be able to have a thought about drinking alcohol but to willfully not act upon that thought. Most alcoholics tend to operate in stage 2b. That is, they are drinking without even realizing that they are having a drink. That is, they are so conditioned to drink that they never have the chance to filter the thought and give consideration as to whether or not to consume that drink. Here, I used alcohol as the example but this can apply to any behavior that has become a bad habit, i.e. reflex. You are simply engaged in the activity after having given it little to no thought at all. It's kind of like when your hand touches a hot stove; you wouldn't need to think about pulling your hand away. In fact, by the time you realized that your hand is being burned it's already been pulled away from the stove. This leads nicely into a discussion of first pain and second pain.

First Pain; Second Pain

Figure 22:
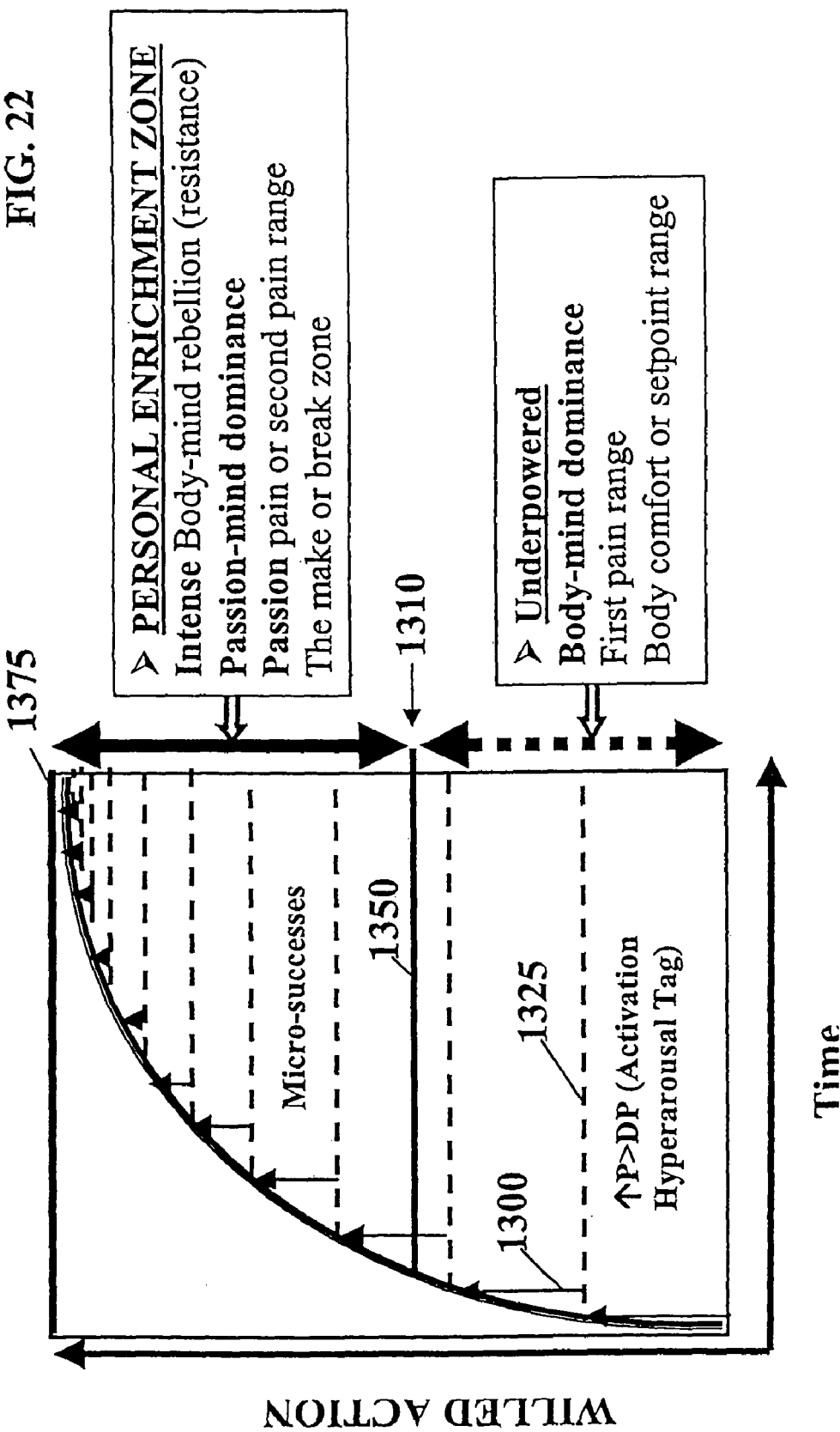
FIG. 22 depicts a graph showing a relationship between willed action 1375 and time, according to embodiments of the present invention.

FIG. 22 depicts a graph showing a relationship between willed action 1375 and time. The Ego's wall of resistance 1355 separates first pain from second pain. The student is taught that micro-successes 1325 on a path to the willed action 1375 occur in progressively smaller increments of forced pleasure 1300 leading to achievement of the willed action 1375. The student is taught that if they are jogging and they plan to run one mile, if they are out of shape, by the time they get to the half mile mark their body begins to send them all sorts of signals telling to stop. The student(s) start to get winded and their legs might start to burn from the production of lactic acid. The student(s) become aware of these signals. The student(s) must decide whether to stop jogging or whether the student(s) should continue on towards their goal of running one full mile today without stopping. But the student(s) make the choice to keep on jogging. In fact, might begin to realize that after running for a two more minutes, the original pain or first pain has subsided. It is as though their body issued its first alert to raise their awareness to potential danger. The student(s) consciously assessed the situation and decided that the student(s) weren't having a heart attack and it was alright for them to continue on their journey towards their goal. Their body then relaxed and the pain diminished. But now as the student(s) jog pass the ¾ mile marker you really begin to gasp for air. Their burning pain in their legs and their lungs begin to intensify. Now the student(s) realize that their body has now issued a new alert in the form of a more intense second pain.

Physiologically, it's telling the student(s) that they are now putting an even greater stress on their body. This might even trigger off some feelings of anxiety that then form part of the second pain syndrome. Again, the student(s) can still decide whether to stop or continue on towards their goal of jogging a mile today. But, the student(s) think the better of it and they decide to stop 50 yard short of their goal. That is, the student(s) selectively entered the realm of stage 1b activity— thought awareness, willed inactivity, as depicted in FIG. 21.

Stage 2b Activity—Nil thought; SETPOINT REFLEX Action (The EGO)

Referring to FIG. 21$a$ relationship between willed inaction 1475 and time is illustrated. The Ego's wall of resistance 1450 separates first pain from second pain. The student is taught that micro-successes 1425 on a path to the willed inaction 1475 occur in progressively smaller increments of forced displeasure 1400 leading to achievement of the willed inaction 1475.

Reflex behaviors or actions such as breathing, require virtually no thought to command them. These are the student(s) subset of personal habits that are not necessarily physiological in nature. With sufficient time to think about them they may be brought into the student(s) conscious awareness. Psychologists refer to the conscious self as the Ego. Hereinafter, Ego means the self, especially as distinct from the world and other selves. In psychoanalysis, Ego is the division of the psyche that is conscious, and most immediately controls thought and behavior, and is most in touch with external reality. Hereinafter, Psychologists refer to the unconscious self as the "Id", the division of the psyche that is totally unconscious and serves as the source of instinctual impulses and demands for immediate satisfaction of primitive needs.

Psychologists refer to the conscious self as the "Ego". Hereinafter, "Ego" means the self, especially as distinct from the world and other selves. In psychoanalysis, "Ego" is the division of the psyche that is conscious, and most immediately controls thought and behavior, and is most in touch with external reality.

Psychologists refer to the division of the unconscious that is formed through the internalization of moral standards of parents and society, and that censors and restrains the ego as the "superego".

For example, the student(s) spouse may need to point out that the student(s) have a habit of not making the bed when the student(s) were the last to get out of it. Or, that the student(s) make noises when they chew their food. But once pointed out, with applied effort the student is instructed to change either behavior, i.e., make the bed, or chew quietly by displacing their Thoughts (T) and/or Actions (A) with willful and diligent practice. In the case of forgetting to make the bed, the student(s) are seeking to nullify a stage 0 activity (nil thought, nil action) with a stage 2a activity of willed action of making the bed. In time, hopefully, the making of the bed becomes reflexive, requiring little to no thought. That means it becomes a stage 2b activity (nil thought, setpoint reflex action).

In the case of unconsciously making noises when the student(s) chew their food, the student(s) have a stage 2b activity (nil thought, setpoint reflex action) that the student(s) wish to move into the stage 1b domain (thought awareness, willed inaction) and eventually, into the stage 0 domain (nil thought, nil action), as depicted in FIG. 21.

Figure 23:
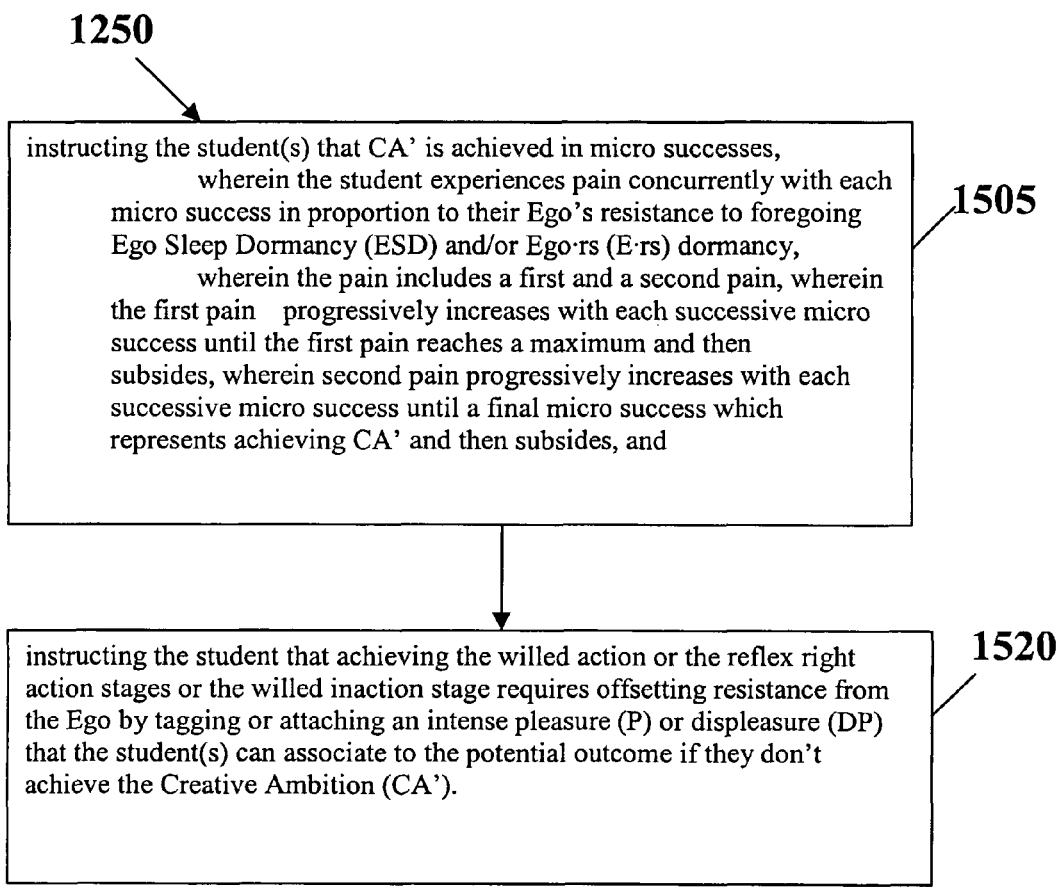

FIG. 23 depicts a flowsheet of the method 1250, further including the step 1505 in which the student(s) are instructed that CA' is achieved in micro successes 1325 and 1425, as depicted in FIGS. 21 and 22. The student(s) experience pain concurrently with each micro success 1325 and 1425 in proportion to their Ego's resistance to foregoing Ego Sleep Dormancy (ESD) and/or Ego·rs (E·rs) dormancy 1350 and 1450, as depicted in FIGS. 21 and 22. The pain includes a first and a second pain, wherein the first pain progressively increases with each successive micro success 1325 and 1425 until the first pain reaches a maximum and then subsides 1310 and 1410, as depicted in FIGS. 21 and 22. The first pain becomes second pain when it subsides. The second pain progressively increases from its origin with each successive micro success until a final micro success is achieved which represents achieving CA' 1375 and 1475, as depicted in FIGS. 21 and 22. The second pain subsides after achieving CA' 1375 and 1475, as depicted in FIGS. 21 and 22.

In a step 1520 of the method 1250 the student is instructed that achieving the willed action 1375 or the reflex right action 1475 stages or the willed inaction stage 1b requires offsetting resistance 1450 or 1350 from the Ego by tagging or attaching an intense pleasure (P) 1300 or displeasure (DP) 1400 that the student(s) can associate to the potential outcome (either willed action 1375 or the reflex right action 1475 stages or the willed inaction stage 1b) if they don't achieve the Creative Ambition (CA'). Hereinafter, tagging or attaching an intense pleasure (P) 1300 or displeasure (DP) 1400 that the student(s) can associate to the potential outcome if they don't achieve the Creative Ambition (CA') is termed pleasure surfing.

Resistance—Roadblocks to Success

The student's Thoughts for change may involve risk. When we try to make changes there is a natural response of resistance to maintain homeostasis and avoid risk. Risk is a perception. It is the degree of perceived threat to our comfort or existence. Resistance is, in essence, our preconditioned reflex to avoid risk and therefore change. Resistance is embedded not only within the human condition, but also within the laws of physics—for every action there is an equal and opposing reaction. Invariably this resistance works against us whenever we stretch ourselves beyond our set point.

Resistance creates roadblocks to success. Resistance is the force that prevents us from making desired changes and it is what pulls us back to old habits once change is initiated. It keeps us from sticking our necks out for a job promotion, losing weight, going back to school, starting a business and sticking to an exercise routine. Its expression varies from person to person. For many, resistance includes procrastination.

For some it is avoidance and for others feelings of inadequacy or fear. Resistance also varies based on the type of change desired. We may avoid some changes and fear others. Invariably resistance involves self-talk, where we tell ourselves all the reasons why we can't or shouldn't do something or critique ourselves on our approach or progress as we seek to achieve. For example, we may tell ourselves that we don't have enough time and/or energy. We might also view ourselves as disorganized or lazy and accept this as a global reason for not accomplishing goals.

Typically we are not conscious of resistance. We are aware that change is difficult. There are things we never get to and goals that we never seem to achieve no matter how much we want them, how long we have envisioned them or how hard we have tried. This rarely means that we are doomed to fail or are incapable of success. More often it signifies that we have not paid attention, adequately addressed or set out to tackle our natural resistance to change.

Once we identify resistance for what it is—a natural, preconditioned response to change—we are better equipped to disable it and move forward. More importantly, we can recognize it as a response and understand that this response is something we can overcome and change.

In Example 5 the student is taught to examine their response to change and what resistance looks like for the student. (NOTE: The student will use this information in Example 5, herein, to explore their modes of resistance.)

EXAMPLE 5

Examining the Student's Response to Change and What Resistance Looks Like for the Student 1. Make a list of goals you would ideally like to accomplish, but doubt that you will be able to achieve in your lifetime. These may include goals you dismiss as impossible and/or that you excluded from previous exercises. Next to each goal, list the reasons why you believe it is not possible for you to achieve.
2. Review your reasons for thinking you can't achieve these goals. What is the basis for your conclusion?
3. Make a list of changes you have desired or tried to accomplish in the past but have not been able to achieve. Include what gets in your way and the reasons you have not been able to accomplish these goals.
4. Make a list of your past accomplishments that seemed difficult to achieve. Make a list of what got in your way and why these changes were so difficult to make.

5. Think about the Life Goals you have identified to work on during this program. Imagine that you need to start on each goal you have chosen today. Record any thoughts and feelings associated with your ability to achieve these goals. Include anything that comes to mind, paying particular attention to thoughts or feelings about why you can't do this, why you don't want to or how hard it would be.

Immediate Goal: Think about starting this goal today and accomplishing it within the next 6 months. Record your thoughts and feelings about your abilities to initiate and complete this process.

Intermediate Goal: Think about starting this goal today and accomplishing it within the next year. Record your thoughts and feelings about your abilities to initiate and complete this process.

Long Range Goal: Think about starting this goal today and accomplishing it within the next 2 years. Record your thoughts and feelings about your abilities to initiate and complete this process.

6. Review your responses above. Consider which of the reasons you listed might actually represent resistance to change. Try to identify patterns, themes and common responses. Answer the following questions:

In general, how do you resist change?
What prevents you from starting projects?
What makes projects difficult to complete?
What most gets in your way when you are trying to accomplish your goals?

Modes of Resistance—the Ways the Student Resists Change

Change and risk are inherent to achieving success. In order to accomplish new goals, the student will need to extend themselves beyond their set point of comfort. Stretching beyond their set point will invariably result in resistance.

The level and type of resistance the student's experience is, in part, an expression of who are, e.g., their personality, their experiences, their perceptions, and their outlook. The student's are taught that resistance varies based on what they are seeking to change, their sense of risk, how far they extend themselves, as well as their life circumstances and a number of environmental factors. For some people, resistance is more powerful when they are contemplating change. For other people, resistance is more powerful when they are in the throes of change. The Students are taught that resistance to changing jobs may vary greatly from their resistance to relocating. Resistance may be more or less of a factor when you have secure employment or when you are in a stable relationship.

While the expressions of resistance vary, there are three common modes of resistance, which include Fear Response, Perceived Risk and Negative Thinking. Fear Response is an emotional response to change that paralyzes you, compels you to avoid or run away from something, or that causes you to actively refuse to do something. Perceived Risk is a response where you have a sense of doom that something bad will happen or that you stand to lose something in the process. The students are taught that Negative Thinking is a response that something is impossible. Negative thoughts typically consist of statements like: "I can't . . . ", "I shouldn't . . . ", "It's not possible . . . " or "It won't ever happen . . . "

In Example 6, the students are taught to examine the responses provided in Example 5 and explore their modes of resistance. The information from Example 5 will be used in the Overcoming Resistance exercise. (Review your responses in Example 5.)

EXAMPLE 6

Examining the Student's Responses in Example 5 and Exploring the Student's Modes of Resistance 1. Examine your reasons for not attempting goals, not accomplishing goals and difficulties encountered when trying to achieve goals. Think about what mode of resistance these reasons represent—a fear response, a perceived risk or negative thinking.

2. Using the reasons you provided, list your specific expressions or symptoms of resistance under the appropriate mode of resistance. Keep in mind that a reason may include more than one mode of resistance with different symptoms under each category. Feel free to add items not included in your previous responses.

Fears
Perceived Risks
Negative Thinking

Examine your responses.

1. Circle the mode of resistance that is most prevalent for you.
2. Place a star next to the specific expression or symptom of resistance that you experience most often.
3. Make note of the symptoms and/or modes that prevent you from starting projects, that make projects difficult to complete and that most get in your way when trying to accomplish your goals.

Overcoming Resistance—Creating a Triumphant Response

Overcoming resistance is an important component of achieving success. The students are taught that managing resistance will greatly increase their ability and willingness to make desired changes. There are several simple things the student can be taught to do to overcome resistance. The key is recognizing that it is simply a natural response to change. These sensations will pass—they won't last forever. More importantly, they will diminish both in duration and intensity as they proceed with achieving their goals and over time as they become more comfortable with change. The students are taught that at some point, resistance to change may become no more than a passing thought.

Another important ingredient to overcoming resistance is teaching the student to conquer their fear. The students are taught that fear results in "fight or flight" response, where the instinctive imperative is to protect themselves in order to remain alive. When they break out in a cold sweat and their heart is pounding, the students are taught to remind themselves that change itself is not going to kill them.

It is important to teach the students to align their sense of perceived risk to reality. Some people do this by examining the worst that could happen and preemptively finding a solution or resolving that they can, indeed, live through whatever happens.

It is also important to teach the students to pay attention to their positive thinking. Resistance often takes the form of defeatist thinking, consisting of all the reasons why we can't or shouldn't do something. The student is taught they can counteract defeatist thinking by replacing negative thoughts with positive statements.

The most effective means for overcoming resistance is to remain focused on the task at hand—to keep moving forward, while trusting that everything will be okay. This invariably requires that you draw on past successes to take action, despite the risk, knowing you have done this before and can do it again.

The ultimate goal is to embrace change and accept risk as an integral part of living, where you are willing to take action despite the odds. This triumphant response will disable resistance and remove roadblocks, while propelling you towards future success.

Review your responses in Example 6 and begin the process of addressing your fears, rethinking perceived risk and countering negative thinking

EXAMPLE 7

Conquering Fear

1. For each fear response that you listed, think of ways to conquer that fear. Examine its validity, and then devise a strategy for ways to counter it when you experience this feeling. For example: you could counter that fear by saying "I am not going to die" or "This won't kill me"; you could diffuse it by reasoning with yourself; or you could diffuse it by reminding yourself that it is part of change and/or that it will pass with time. List your strategies below.

EXAMPLE 8

Rethinking Perceived Risk

1. For each perceived risk that you listed, think of ways to align that risk to reality. Examine its validity and likelihood then devise a strategy for ways to rethink how you perceive this risk.
2. Think about each risk. Consider whether each risk is a natural part of living. Is it just likely to occur? Is this risk so great, a change is not worth trying? What do risk by not making a change?
3. Think about the worst thing that could possibly happen. Counter it with the best thing that could happen. How do they compare? Is the gain worth the risk?
4. List what you could do to protect yourself from each risk, while moving forward with change and taking action to accomplish your goal. Indicate whether you could live through the worst. What would your solution be to your worst case scenario?

EXAMPLE 9

Countering Negative Thinking

We all have negative thoughts. As a mode of resistance, negative thinking makes change difficult and invariably gets in the way of our success.
1. Review your negative thinking and counter it with positive statements.
2. Think about past experiences where you have not been able to make changes and/or either dismissed or abandoned goals. Review your reasons for not achieving these successes. Think about future success and goals you have yet to accomplish. Identify any negative thinking that prevents you from making required changes to achieve these goals.
3. Create positive statements to counter your negative thinking. Replace every "I can't" with an "I can", every "I shouldn't" with "I will" and every "It's impossible" with "It's possible".
4. Review your past successes—your accomplishments, your strengths and your talents. Think about changes that were difficult to make and obstacles that got in your way. Create positive statements about your past successes, you ability to overcome obstacles and make difficult changes.

EXAMPLE 10

Overcoming Resistance Worksheet

As you make changes, use the strategies you have identified for conquering fear, rethinking perceived risks and countering negative thinking. Model the Overcoming Resistance exercise to pre-empt possible resistance as you undertake new goals and reach for increasing levels of successes. (NOTE: Make copies of this worksheet to monitor and overcome obstacles when you experience resistance.)

EXAMPLE 11

Listing Fears Associated with Conquering Fear

List fears you associate with this change. Include your strategy to overcome each fear.

EXAMPLE 12

Rethink Perceived Risk

List risks you associate with this change. Include a strategy for mitigating each risk.

EXAMPLE 13

Personal Success Inventory

List any negative thoughts you have about making this change. Create positive statements to counter your negative thinking. Embrace Change!

In Examples 5-13 the student(s) were taught to examine their thoughts that present obstacles to their success and developed strategies to counter their negative thinking. Positive thinking is a powerful means for achieving success. Focus is another. It is important to teach the student to remain focused on achieving their goals. Focused thinking allows you to avoid diversions, tangents, and spreading themselves too thin. It also increases the effectiveness of their action and their productivity.

Spirit—The Source of the Student's Success

The students are taught that their spirit is their life force. It is what inspires drives and sustains you. It is the source of their dreams and desires. It awakens the students to possibilities and encourages the students to reach for new goals. It compels them to improve themselves, their life and the lives of others. The students are taught their spirit is the source of their creative energy. It is what motivates you to learn, grow and take action. It is the source of their strength. It provides you with the endurance to overcome obstacles and to see things through to the end. It provides you with the resilience to overcome hardships and try, try again in the face of adversity. The students are taught their spirit is the source of their confidence. It gives them a sense of purpose and meaning. The students are taught their spirit is the source of their belief in themselves and the world around you. The students are taught their Spirit is their vitality. It is what makes you thrive.

The students are taught their Spirit is comprised of three components:

Faith—the belief in something beyond their knowing

Creativity—the energy that compels you to imagine, invent, act and regenerate

Passion—the force of love that draws you toward success

All human accomplishment is fueled by spirit. Achievement typically starts with an idea and the inspiration to reach for a goal. It is sparked by the belief that this vision is possible. The pursuit of the goal is fueled by a passion to do what it takes to make it happen.

Inventions, technological advancements, acts of courage, works of art, world and space exploration, scientific discoveries, academic pursuits, professional successes and athletic achievements are all products of the human spirit. We are drawn to observe and celebrate these events and their authors largely due to the presence of spirit. Spirit itself inspires us. It is contagious. It taps into the reserves of our own spirit and reminds us that great things are possible.

The students are taught their Spirit is critical for achieving success. They are taught their Spirit is the ultimate source of their successes. The students are taught their Spirit provides the desire to achieve success, the belief that success is possible and the drive to accomplish their goals. Without spirit, it is difficult to plan, take action or get results. You may feel restless or dissatisfied. The students are taught they may feel as if they are spinning their wheels. Or, you may not have a sense of direction, purpose, or meaning. Without spirit, success and happiness are simply not possible.

In Example 14, the student(s) are instructed to examine their spirit in general and explore how it relates to past and future successes. In Examples 15-17, the student is instructed to explore each component of spirit in more detail.

EXAMPLE 14

Examine their Spirit in General and Explore how it Relates to Past and Future Successes 1. In general, what inspires you? Where does your inspiration come from? When do you feel most inspired?
2. What quashes your inspiration?
3. Are there times when you seek inspiration? What do you do to inspire yourself?
4. How often do you act on your inspirations?
5. Make a list of people and events that have inspired you in the past. Include the inspiration and any goals, actions or results that came out of this inspiration.
6. Make a list of people and events that are a source of inspiration today. Describe the inspiration and any associated goals. Include ways you can act upon this inspiration.
7. In general what motivates you to action? Are there particular activities or outcomes that motivate you? Are there things you do to motivate yourself? Are there things that undermine your motivation?
8. What do you do to stay motivated and/or re-energize yourself to keep moving forward? In other words, how do you maintain gravitational draw energy? How do you sustain success priorities?
9. Review the past accomplishments, strengths and talents you included in the Example 13—Personal Success Inventory. For each item, identify the role spirit played in achieving these successes. What inspired you to create each goal? What compelled you to take action? What leaps of faith did you make? How did you sustain/generate the energy you needed to achieve your goal? How did you overcome resistance and obstacles?
10. Review your responses above. Based on your responses and the elements of spirit present during past successes, describe how you can cultivate spirit energy to achieve future successes.
11. Identify places where your spirit may be crying out. Include areas of your life where you feel unfulfilled, restless or dissatisfied. Include places where you feel you are spinning your wheels and getting nowhere and ways that you ignore or stifle your spirit.

Spirit as Creativity—Transforming Vision into Action

The students are taught that their Creativity is what drives them toward success. It fuels their successes by generating vision, which, in turn, engages their will to act. Creativity is at the core of our desires. It is what compels us to dream and imagine. It is the source of our goals and what we envision for ourselves.

Creativity resides in all us. It is not just reserved for artists, writers, poets and actors. Creativity is at the root of all accomplishments where we must first envision something beyond ourselves or our current lives to take action. It is what drives us to learn, grow, travel, seek out new experiences, and plan for the future. It also exists in our everyday lives as we juggle schedules, make plans, write emails, and solve problems.

Many of us do not reserve adequate time, energy, or attention to nurture our own creativity. Part of this is due to our natural resistance to change, which may prevent us from imagining possibilities or entertaining thoughts and/or activities beyond our comfort setpoint. A larger part is due to us not appreciating the role creativity plays in driving us to action. Creativity allows us to envision our goals, but it is also what is required to visualize outcomes and conceive of ways to achieve our aspirations. Once we have this full picture, we are more likely to get started, make plans, and take action.

In previous Examples, the student(s) have been taught to list their goals. In Example 15, the students are taught to work with these goals to tap further into their creativity to energize them towards success. Example 15 will provide a foundation for the students to further develop their creativity for envisioning and accomplishing future goals.

EXAMPLE 15

Work with Goals to Tap Further into the Student's Creativity to Energize the Student Towards Success In Example 15, the student(s) are taught to use the immediate, intermediate and long-range goals they identified to work on during this program.

Defining where You would Like to be (Getting from Point A to Point B)

Many students have a list of certain things they would like to change in their lives. The students might want to find a better job, improve their daily habits, become healthier, earn more money or learn a new skill. In some cases, they may have a vague sense of restlessness, wanting new challenges or desiring to move to the next level without a clear vision of what that entails.

An important part of success is teaching the students how to define Point B for the students—where they are going or where they want to be. The students are asked "What do they envision for themselves? How do you want to reshape their lives? What do they want to achieve? These are important questions that largely start us on the path toward success. In this exercise, we will begin to define your Point B. This is merely a starting point, offering questions you will want to keep in mind throughout this program. There are no right or wrong answers and in some cases you may not have a response. You may come back to this exercise to complete or change your responses at any time. However, you will be asked to identify three things you would like to change that you will work on during this program. These goals will be referenced for use in future exercises.

Please take a moment to consider each question and provide a response below.

1. Make a list of your important life goals. This is your current "To Do" list of things you want to accomplish. (Ex. Get Degree, Buy a House, Plant a Garden, etc.)

2. List any area in your life where you would like to make changes, but you do not have specific goals in mind. Describe what it is you would like to change. (Ex. Professional Career—be more fulfilled in my job, Marriage—improve relationship, etc.)

3. Make a list of any habits or routine activities that you would like to change. (Ex. walk every day, pay bills on time, bring lunch to work, etc.)

4. Select items from the lists above and designate a time frame for when you would like to accomplish them, as follows:
   Immediate Goals—within the next 1-6 months
   Intermediate Goals—within the next 1-2 years
   Long Range Goals—within the next 2-5 years 5. Please review the lists you created for question 4. Choose a goal from each of the lists to focus on during this program.
   Immediate Goal _____
   Intermediate Goal _____
   Long Range Goal _____

Life Goals—Expanding Your Vision of Success

Throughout this program we will be looking at success as a cumulative activity of achieving goals that you have set for yourself. Within this model, there is infinite opportunity for success at many levels. In previous exercises, we have examined goals and success at a specific point in time to define where you are right now and where you want to be.

A different way of looking at success is to frame it within an entire lifetime. We have past successes, current goals and future aspirations all of which will one day make up our legacy.

NOTE: Legacy will be discussed in greater detail later in the program.

The purpose of this exercise is to look at your life from a broader perspective, understanding that it represents a legacy in progress. From this angle, your life goals include the larger picture of what you want to accomplish over an entire lifetime and define your ultimate Point B. You may have already accomplished some of these goals and you may have included others in previous exercises. However, the information in this exercise will be referenced later when we discuss time as a factor of success and legacy.

1. Look at your life as if you were outlining it from birth to death. What are the major goals or milestones you would want to accomplish in order to say you have lived a full life? List each life goal, checking off those you have already completed.

2. Outside of major goals and milestones, you may have a list of things you want to do that are not essential for living a full life, but would greatly enrich your life and/or feed your soul. Please complete the following statement, listing everything that comes to mind: Before my life is over I must . . . .

3. Most likely, you have dreams or secret desires that you have had for a long time, but never acted upon. In some cases, you have ruled these out due to time, circumstance or current responsibilities. Make a list of these past dreams and desires. (Ex. Become a Doctor, Write a Novel, Join the Peace Corp, etc.)

Immediate Goal

1. Think about this goal and why it is important to you. Imagine what you will need to do to accomplish this goal. Envision yourself engaging in these activities and how it will feel to be working towards your goal. Describe these activities and feelings. (This exercise might also help you to identify possible resistance.)

2. Envision each step or activity as an interim success as you work towards reaching your goal. Think of ways to mark each of these successes. Imagine accomplishing and celebrating each interim success. Describe each success and how it feels to celebrate these interim successes.

3. Think about how you will celebrate your success once you accomplish this goal. List your plan for celebration.

4. Imagine how you and your life will be different once you accomplish this goal. Describe these differences.

5. Imagine how you will feel once this goal is accomplished. Describe your feelings.

6. Imagine what will be possible for you once this goal is accomplished. Is it tied to future success and happiness? Describe these possibilities.

Intermediate Goal

1. Think about this goal and why it is important to you. Imagine what you will need to do to accomplish this goal. Envision yourself engaging in these activities and how it will feel to be working towards your goal. Describe these activities and feelings. (This exercise might also help you to identify possible resistance.)

2. Envision each step or activity as an interim success as you work towards reaching your goal. Think of ways to mark each of these successes. Imagine accomplishing and celebrating each interim success. Describe each success and how it feels to celebrate these interim successes.

3. Think about how you will celebrate your success once you accomplish this goal. List your plan for celebration.

4. Imagine how you and your life will be different once you accomplish this goal. Describe these differences.

5. Imagine how you will feel once this goal is accomplished. Describe your feelings.

6. Imagine what will be possible for you once this goal is accomplished. Is it tied to future success and happiness? Describe these possibilities.

Long-Range Goal

1. Think about this goal and why it is important to you. Imagine what you will need to do to accomplish this goal. Envision yourself engaging in these activities and how it will feel to be working towards your goal. Describe these activities and feelings. (This exercise might also help you to identify possible resistance.)

2. Envision each step or activity as an interim success as you work towards reaching your goal. Think of ways to mark each of these successes. Imagine accomplishing and celebrating each interim success. Describe each success and how it feels to celebrate these interim successes.

3. Think about how you will celebrate your success once you accomplish this goal. List your plan for celebration.

4. Imagine how you and your life will be different once you accomplish this goal. Describe these differences.

5. Imagine how you will feel once this goal is accomplished. Describe your feelings.

6. Imagine what will be possible for you once this goal is accomplished. Is it tied to future success and happiness? Describe these possibilities.

Spirit as Faith—Believing in Possibilities

Faith is your ability to adhere to a belief that something is possible without immediate evidence or feedback that your belief is true. It is living beyond recreation and survival, and focusing your time and energy on creative activity without fully knowing that you are doing will work or that you will accomplish what you are seeking to achieve. Faith is the means by which you endure and sustain a long-term commitment in the absence of immediate gratification.

In the Overcoming Resistance exercise, you identified strategies for conquering your fears and rethinking perceived risks. You also created positive statements to replace negative thoughts. While applying reason is a critical part of overcoming resistance, you ultimately need faith to get you going and to carry you through. You need to apply faith to take on risk, accept change and walk through your fear. You need to apply faith to believe that you can accomplish what you set out to achieve. Most importantly, you need to apply faith to overcome obstacles.

In this exercise, you will be reviewing the presence of faith while achieving past successes.

Review your past accomplishments, strengths and talents from the Personal Success Inventory.

1. Think about the faith you applied to initiate and accomplish these successes. Describe how your faith in yourself, others and the world around you played a part in these successes.
2. Think about the resistance and obstacles you encountered. Describe the role faith played in overcoming resistance and obstacles.
3. Describe the role of your faith when you took risks, made changes and invested your time and energy, without knowing the outcome of your efforts. What got you started? What kept you going?
4. Is there any place where your faith in yourself, others or the world is absent or lacking and, as a result, this impedes your success?
5. What could you do to build faith in these areas?

Spirit as Passion—the Power of Love

The key to success might be summarized by one word—PASSION. Passion creates focus. It is power. Passion knows no fear, guilt or shame. It is a stranger to self-doubt and feelings of inadequacy. Passion gives you great courage and infinite hope. It fuels your belief in possibilities. Passion binds you to your dreams and promotes Creative Ambition, without thought of pain or sacrifice. Passion is the power of love at work in your life that drives you to achieve great success and enduring happiness.

Love fuels all great achievements. It creates great leaders and everyday heroes. It is what causes us to set our egos aside and align ourselves with something greater than ourselves as we reach to embrace the love in others and pursue our dreams. With love in your heart, time is timeless, sacrifice is painless and action is effortless.

You experience passion when you align your thoughts and activities to your purest expression of self. This expression of self is your calling. It is your hopes and dreams. It is what energizes you, what makes you feel most alive, and what gives you a sense of purpose and meaning. If you ignore your calling, the flame of passion will eventually die. The death of passion is ultimately the source of your regret, when your heart aches with sadness and longing for the bright future that could have been. You mourn the past and long for the possibilities of a different life with a vibrant future. The most effective means for both achieving success and avoiding regret is aligning yourself to your passion.

In this exercise, you will explore your passion. You will examine your passion during past successes and begin aligning your passion to your current goals. This will serve as a foundation for igniting your passion to achieve future successes.

1. Make a list of activities that make you feel most alive. Include activities where your focus is keen and you lose sense of time and/or the activity around you. Include activities that generate new ideas, inspiration, and goals for future success.

Review your responses above. Describe what these activities have in common.

List ways to model these activities for future success.

2. Think of your passion as the truest expression of yourself without self-consciousness or ego. Consider who you are at the core. What feeds your soul? What are your hopes and dreams? What gives your life purpose and meaning? What is your calling? List everything that comes to mind.
3. How well is your current life and goals aligned with your passion? Make a list of activities and goals that honor and/or give expression to your passion.
4. Identify places where you are not giving full expression to your passion. Include any ways you are ignoring your calling, mourning your past or longing for possibilities.
5. Refer to your responses in the exercise Regret. Do any of your past regrets represent ways you have ignored your passion or your calling? Are there ways you can avoid future regret by aligning yourself with your passion?
6. Review your past successes in the Personal Success Inventory. Describe the role your passion played in achieving these accomplishments.
7. List any accomplishments that were a byproduct of doing something that you loved. Include any achievements where your focus was on the task at hand and not the outcome.

Think about your process while you achieved these unintended goals. How did you do it? What were your thoughts and feelings during this process?

Is there anything within this process that could be applied to future successes?

8. Review your responses above where you identified your passion. Review your responses in the exercises Life Goals and Reshaping Your Life.

Consider each goal and assess its alignment to your passion. Are there any goals that represent your calling? Are there any goals that are not aligned to your passion? Do you want to add goals to the list?

Thought is required to generate and maintain your Creative Ambition while shifting the balance from Self-Preservation and Recreation. Thoughts focused on your success are required while you are both actively engaged in and away from success activities. For example, you are more likely to achieve your goals if your mind is focused on success while engaged in Self-Preservation activities that require less of your mental energy. (Ex. taking a shower, doing laundry, or raking leaves). Conversely, you are less likely to achieve your goals if you mind is focused on what's for dinner while you are engaged in success activities.

Thought is also required for maintaining balance. We are all capable of over thinking things and devoting excessive energy to some things at the deleterious expense of others. Your mind needs to exercise discipline to ensure a balance of thought, action and results. It needs to be astute to recognize when you are spinning your wheels and flexible so you can analyze your approach, revise your plans and redirect your energy when needed. Your mind needs to remain agile allowing you to assign priorities and juggle multiple responsibilities. Most importantly, your mind must provide you the wisdom to practice the kindness and forgiveness to give yourself needed breaks.

In Example 13, you will explore your pattern of thought associated with past successes and identify thought patterns to support future successes.

EXAMPLE 16

Exploring the Student's Pattern of Thought Associated with Past Successes

1. Describe your previous personal successes and thought patterns as you achieved these successes.

2. Did you develop a plan to achieve these successes? Did you create milestones to gauge your progress? Did you periodically assess your activities and progress to revise your plan?
3. Describe any difficulties you encountered in developing or revising your plan.
4. What was your mind focused on when you were engaged in success activities to achieve these goals? Did you stay focused on the task at hand? Did you think of desired outcomes and remind yourself of the larger goal?
5. Describe any difficulties you had with maintaining your focus.
6. During the time period when you were working toward success, how much of your mental energy was focused on achieving your goals? Describe how you maintained your focus on your goals even when you were not engaged in success activities.
7. As you achieved these successes, were you able to maintain balance in other areas of your life? Did you have a tendency to over think things, thereby delaying or interfering with your ability to take action? Did you give adequate thought to planning before taking action?
8. Make a list of the thought patterns that were most effective in helping you achieve your goals.
9. Make a list of thought patterns you wish to avoid repeating.
10. Make a list of new ways you envision using your thoughts to support future successes.

Thoughts in Action—Developing Thought to Achieve Your Goals

In Example 16, the student's examined their thought patterns during past successes. In Example 17, the student(s) will begin putting their minds to work to develop a plan and to adjust their thinking to achieve goals they identified to work on during this program.

During this exercise you will be asked to review your responses from Examples 5-13. You may also want to refer to information in the following exercises: Spirit, Spirit as Faith, Spirit as Passion, and Thoughts.

Because our thoughts are what create and sustain action, your Thought Distribution also influences your rate of success. Your Thought Distribution is how you allocate your thoughts over time towards Creative Ambition (CA), Recreation (R) and Self-Preservation (S). It is the unique configuration of where your thoughts reside in any given period.

Your successes are going to emerge from Creative Ambitions. This includes both thought and action. The more energy you dedicate to Creative Ambition, the more you increase your rate of success.

Examining your Thought Distribution will help you to understand how your thoughts support success while you are working to achieve your goals. When you are engaged in Creative Ambition activities and your thoughts are aligned with your activities, you will increase your focus and effectiveness. Maintaining thought focused on Creative Ambition primes you to achieve your goals by honing your plans and strategies, motivating you to action and facilitating a smooth transition in and out of Creative Ambition activities, thereby increasing your overall success efficiency.

In Example 17, the student will repeat the CA·rs Distribution with a focus on your thoughts rather than your activities.

EXAMPLE 17

CA·rs Distribution with a Focus on Your Thoughts Rather than Your Activities

1. Using the last 24-hours or a typical day, evaluate your thoughts and where your mind was focused.
   How many hours did you sleep?
   Sleep Hours _____
   How many hours were you awake?
   Awake Hours _____ (24 hours—Sleep Hours)
   How many hours were your thoughts focused on Creative Ambitions to improve your quality of life?
   CA Hours _____
   How many hours were your thoughts focused on Recreation or obtaining immediate gratification?
   R Hours _____
   How many hours did you spend thinking about survival or your self-preservation?
   S Hours _____
   Divide the number of hours you spent thinking about each CARS component by the number of Awake Hours:
   CA Hours/Awake Hours _____%
   R Hours/Awake Hours _____%
   S Hours/Awake Hours _____%
2. Review your life goals from the previous exercise. Choose one that you completed and evaluate where your thoughts were focused during a typical day while you were in the process of achieving this success.

| Sleep Hours _____ | CA Hours _____ |
| Awake Hours _____ | R Hours _____ |
| | S Hours _____ |

3. Divide the number of hours you spent thinking about each CARS component by the number of Awake Hours:
   CA Hours/Awake Hours _____%
   R Hours/Awake Hours _____%
   S Hours/Awake Hours _____%
4. Keep track of your thoughts over the next week. Evaluate where your thoughts were focused.

| Sleep Hours _____ | CA Hours _____ |
| Awake Hours _____ | R Hours _____ |
| | S Hours _____ |

5. Divide the number of hours you spent thinking about each CARS component by the number of Awake Hours:
   CA Hours/Awake Hours _____%
   R Hours/Awake Hours _____%
   S Hours/Awake Hours _____%

Action—Promoting and Sustaining Activity

Success is action and productivity. To achieve results, you must promote and sustain activity. Your success is a reflection of how efficiently you bridge the gaps between your creative thoughts and action. It requires that you motivate yourself to take action and maintain a level of coordinated activity in order to achieve your goals. It's not enough that you keep busy. Your action must be focused and so your effort is organized to achieve a desired result.

Action presents three challenges. One is choosing the right activity to achieve your goals. Another is motivating your self to take required action. And the last is sustaining that action until you reach your goal. These challenges typically manifest themselves in a conflict between what we want to do and what we need to do. We naturally gravitate toward activities with the greatest perceived pleasure. These preferred activities involve less pain and sacrifice, and they invariably offer more immediate gratification for our efforts.

We are all more likely to take an action when our anticipated pleasure from taking this action is greater than the anticipated pain. This comparison of perceived pleasure to perceived pain is called Relative Perceived Pleasure. The key to both promoting and sustaining success activity is to increase its Relative Perceived Pleasure. You do this by shifting your perceptions of pleasure to outweigh your perceptions of pain. By making this shift you increase your likelihood of taking action.

There are several means for increasing your relative perceived pleasure. They all involve drawing from your spirit then using thought to shift the balance from perceived pain to perceived pleasure. Making this shift requires that you focus on lasting results rather then immediate gratification and short term gains. It requires that you infuse your perceived pleasure with spirit, reminding yourself of the inspiration, beliefs and visions associated with your goals. It also requires that you increase your perceived pain from NOT taking this action representing a loss of your faith, creativity and passion. In essence, increasing your relative perceived pleasure is an exercise of mindfulness where your spirit is on the line. You take control of your thoughts to remind yourself of the larger pleasures and pains associated with your spirit.

In Example 17 the student(s) are instructed to review their activities during past successes to assess your level of action and relative perceived pleasures. In Example 18 the student is instructed to identify the coordinated activity required to achieve your goals and increase your Relative Perceived Pleasure to promote and sustain activity.

Review your responses as to the student's inventory of past Personal Successes in Example 16, item 1, herein. Think about the action required to achieve these goals. Did you take action in an organized fashion?

EXAMPLE 18

Review their Activities During Past Successes to Assess Your Level of Action and Relative Perceived Pleasures 1. Describe this process.
2. Were you ever engaged in activities that kept you busy and kept you working on things, but in the end did not support your success? Describe these activities. What caused you to take action in these areas? When did you recognize that they were not supporting your effort to achieve your goals? How did you redirect your energy?
3. Think of activities that you needed to engage in to reach these goals? Did you ever avoid these activities or find it difficult to motivate your self to take or sustain action? Explain why. Describe how you ultimately promoted and sustained these activities.
4. Describe the pain and sacrifice you associated with these activities at the time. Describe the pleasure and gains you realized by accomplishing these goals. How do they compare?
5. If you knew what you knew today, how would you change what you did to achieve these goals? How would your actions change? How would your thoughts change? How would your motivation change?
6. During the time period when you were working toward success, how much of your mental energy was focused on achieving your goals? Describe how you maintained your focus on your goals even when you were not engaged in success activities?
7. As you achieved these successes, were you able to maintain balance in other areas of your life? Did you have a tendency to over think things and as a result delayed or interfered with your ability to take action? Did you give adequate thought to planning before taking action?
8. Make a list of the thought patterns that were most effective in helping you achieve your goals.
9. Make a list of thought patterns you wish to avoid repeating.
10. Make a list of new ways you envision using your thoughts to support future successes.

Taking Action—Increasing Your Pleasure Index

In the Action exercise, you learned about a critical component to promoting and sustaining the required activity to achieve your goals—increasing your relative perceived pleasure. This involves shifting the balance of perceived pleasure you associate with an activity to outweigh the perceived pain involved. Shifting this balance requires that you infuse each activity with your spirit, overriding immediate gratification in exchange for lasting pleasure and understanding the true pain involved in not taking action because you sacrifice your faith, creativity, passion, and sense of purpose.

In Example 19 the student is instructed to identify the coordinated action required to achieve your goals and increase your Relative Perceived Pleasure to promote and sustain each activity.

Review your responses in Example 16—Thoughts in Action, herein, and complete the information on the following pages for your immediate, intermediate and long-range goals.

EXAMPLE 19

Immediate Goal—Immediate Intermediate and Long-Range Goals

1. Review your plan, the activities you need to engage in and the changes you need to make in order to achieve this goal. Identify the actions you need to take.
2. List each activity in the order you will need to take action under the Success Activity column below. Include the level of effort you will need to sustain for each in order to accomplish your goal.
3. For each activity, record your immediate response to taking this action today. Include your perceived pleasure and your perceived pain. Include everything that comes to mind, as this is your starting point for increasing your relative perceived pleasure.

| Success Activity | Pleasure | Pain |
| --- | --- | --- |

4. Make a list of activities you typically engage in to avoid taking other action or doing what you need to do. Include the perceived pleasure and perceived pain when engaging in these activities. Again, include your immediate response and whatever comes to mind.
5. Review your responses above.
6. Think about your spirit and what inspired you to set this goal. Think about what you hope to gain. Include your vision of yourself and your life once you've achieved it. List these items under your perceived pleasure for each activity associated with your goal. Include any connections to other goals and/or future success.
7. Think about your spirit and what you will sacrifice by NOT achieving this goal. What is the cost to your spirit? Consider each avoidance activity and think about a lifetime of engaging in these activities at the expense of achieving your goals. Consider the loss of your faith, creativity and passion. Consider your level of regret. Add each item under the perceived pain for your avoidance activities.

Intermediate Goal

1. Review your plan, the activities you need to engage in and the changes you need to make in order to achieve this goal. Identify the actions you need to take.
2. List each activity in the order you will need to take action under the Success Activity column below. Include the level of effort you will need to sustain for each in order to accomplish your goal.
3. For each activity, record your immediate response to taking this action today. Include your perceived pleasure and your perceived pain. Include everything that comes to mind, as this is your starting point for increasing your relative perceived pleasure.

| Success Activity | Pleasure | Pain |
| --- | --- | --- |

4. Make a list of activities you typically engage in to avoid taking other action or doing what you need to do. Include your perceived pleasure and your perceived pain when engaging in these activities. Again, include your immediate response and whatever comes to mind.

| Success Activity | Pleasure | Pain |
| --- | --- | --- |

5. Review your responses above.
Think about your spirit and what inspired you to set this goal. Think about what you hope to gain. Include your vision of yourself and your life once achieved you've achieved it. List these items under your perceived pleasure for each activity associated with your goal.
Include any connections to other goals and/or future success.
Think about your spirit and what you will sacrifice by NOT achieving this goal. What is the cost to your spirit? Consider each avoidance activity and think about a lifetime of engaging in these activities at the expense of achieving your goals. Consider the loss of your faith, creativity and passion. Consider your level of regret. Add each item under the perceived pain for your avoidance activities.

| Success Activity | Pleasure | Pain |
| --- | --- | --- |

Long-Term Goal

1. Review your plan, the activities you need to engage in and the changes you need to make in order to achieve this goal. Identify the actions you need to take.
2. List each activity in the order you will need to take action under the Success Activity column below. Include the level of effort you will need to sustain for each in order to accomplish your goal.
3. For each activity, record your immediate response to taking this action today. Include your perceived pleasure and your perceived pain. Include everything that comes to mind, as this is your starting point for increasing your relative perceived pleasure.

| Success Activity | Pleasure | Pain |
| --- | --- | --- |

4. Make a list of activities you typically engage in to avoid what taking other action or what you need to do. Include your perceived pleasure and your perceived pain when engaging in these activities. Again, include your immediate response and whatever comes to mind.

| Success Activity | Pleasure | Pain |
| --- | --- | --- |

5. Review your responses above.
6. Think about your spirit and what inspired you to set this goal. Think about what you hope to gain. Include your vision of yourself and your life once you've achieved it. List these items under your perceived pleasure for each activity associated with your goal. Include any connections to other goals and/or future success.
7. Think about your spirit and what you will sacrifice by NOT achieving this goal. What is the cost to your spirit? Consider each avoidance activity and think about a lifetime of engaging in these activities at the expense of achieving your goals. Consider the loss of your faith, creativity and passion. Consider your level of regret. Add each item under the perceived pain for your avoidance activities.

| Success Activity | Pleasure | Pain |
| --- | --- | --- |

Figure 25:
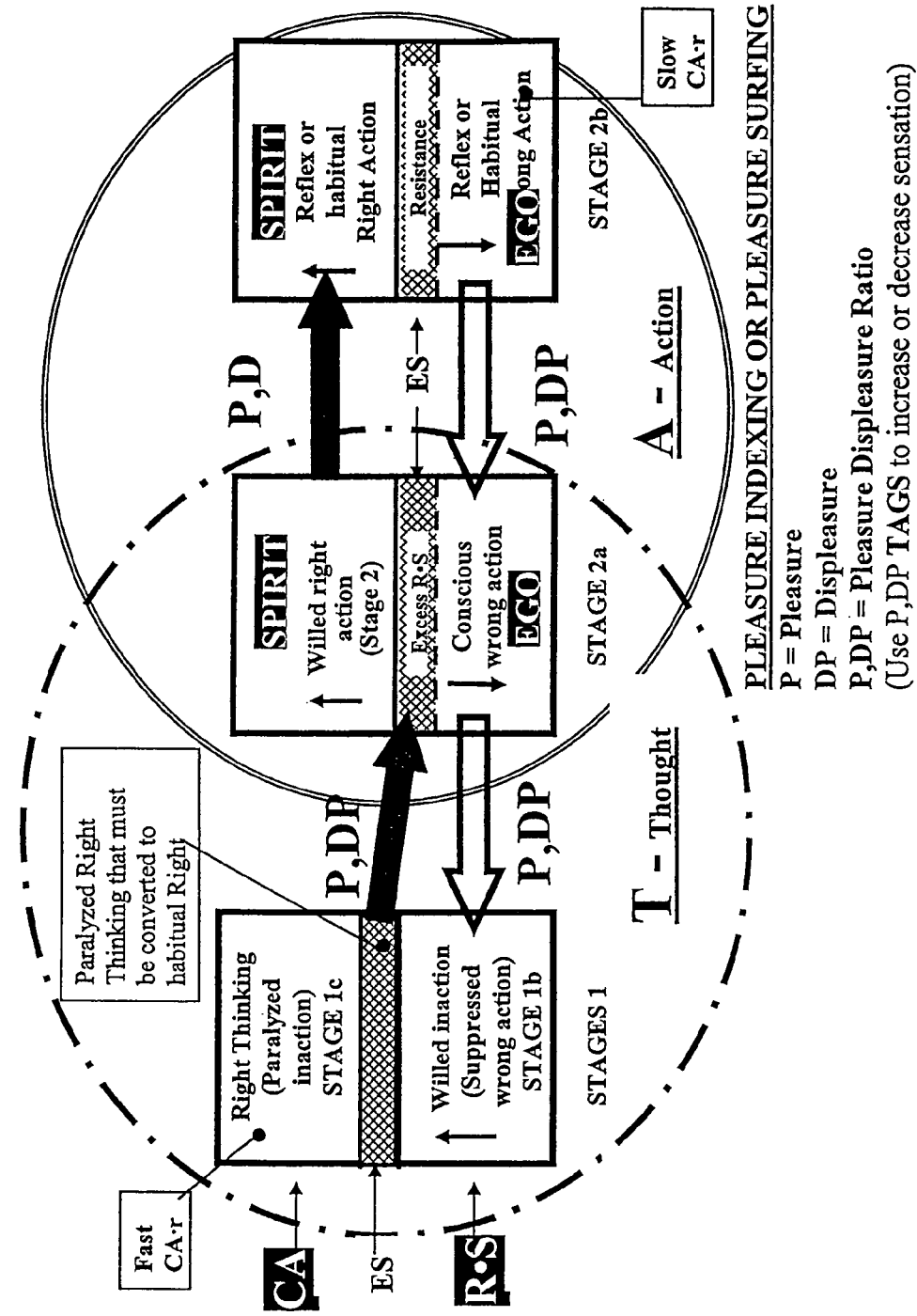
FIG. 25 depicts a Thought (T)/Action (A) Conversion Diagram illustrating that disrupting the equilibrium setpoint of the Ego requires diminishing the student's natural routine, according to embodiments of the present invention.
Figure 31:
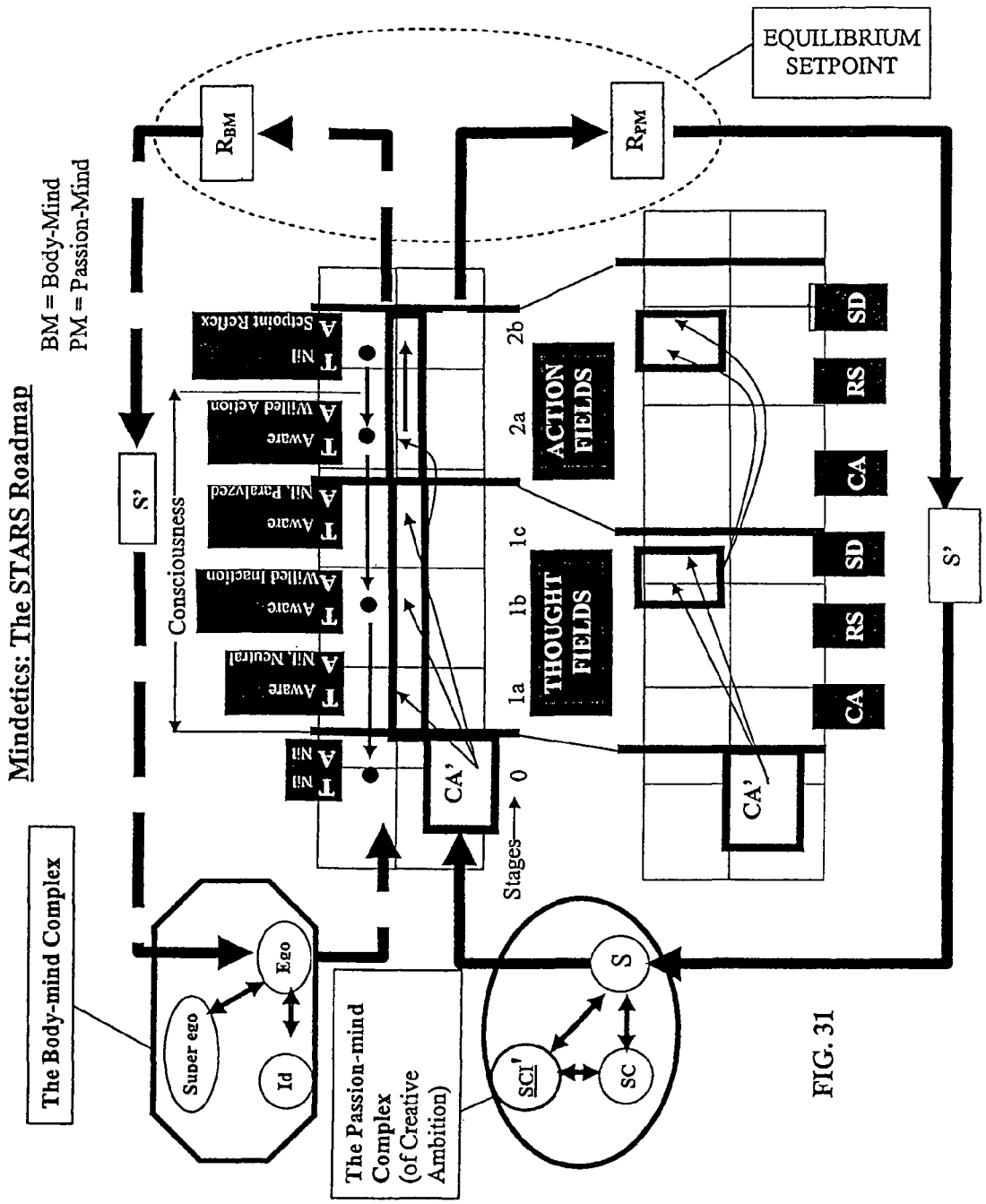
FIG. 31 depicts a STARS roadmap, according to embodiments of the present invention.

FIG. 25 depicts a Thought (T)/Action (A) Conversion Diagram illustrating that disrupting the equilibrium setpoint of the Ego requires diminishing the student's natural routine. While this step is a great challenge for the student, the ability to do so will ultimately determine the student's final success or failure in life. Equilibrium setpoint as depicted in FIG. 31 is the obstacle that a student must overcome as they attempt to willingly and voluntarily initiate an action or activity that goes the very nature of their Ego at a specific moment in time. The greatest challenge facing a student is to overcome the paralyzing set of signals from the Ego, in the form of pain, discomfort, hunger, and thirst, which are designed to draw the student back towards the Ego's basic simple pleasure drives of self-preservation and recreation. These drives and impulses of the Ego are the result of a lifetime of conditioning that form part of the equilibrium setpoint that include a certain balance between forces of success or natural creativity, recreation, self-preservation and sleep. The student perceives the disruption of this well maintained balance as a threat by the Ego, in turn signaling the brain to cease and desist new activities outside of the this balance or equilibrium.

The most difficult obstacle facing a student who is seeking success is to counter the resistance, drives and demands of the Ego. Interestingly, while an anorexic patient may have found a way to powerfully suppress and override the natural drives of hunger and thirst to an extreme, the dieter who keeps failing diet after diet has not found a way to suppress and override the powerful survival drives of their body to eat and drink for survival.

Resistance is defined as the power or capacity to resist. To resist is to strive to fend off or offset the actions, effects, or force of. The body has a natural resistance to change. Whenever a student sets out to take creative action, their body will immediately try to fend off or offset that action making it difficult to follow through. Friction is the natural equivalent to natural resistance. Whenever the student attempts to set a body in motion against a surface, they will feel it pushing back with a natural force of resistance caused by friction.

Equilibrium setpoint defines where the student is most comfortable and safe. Everyone has a tolerance for change and risk within a certain range of events or circumstances, which typically defines their set point. Equilibrium setpoint is the set of behaviors and patterns of choices that a student naturally maintains. It embodies the student's comfort zone as the range of change and risk they are most comfortable with, and forms a baseline of thoughts and activities that they consistently come back to regardless of the attempted changes in their life. Overcoming equilibrium setpoint requires diminishing the student's behavioral homeostasis (a fixed set of choices) that they have been naturally taught to restore.

To accomplish new goals and achieve success, the student must be taught to stretch beyond their equilibrium setpoint. The first step required of a student in moving their equilibrium setpoint is for the student to move away from their points of comfort and safety by initiating new behaviors and activities. The student is therefore instructed to undertake activities that are not part of their routine; this may naturally involve mental, emotional, or psychological pain. The equilibrium setpoint has been disrupted when the new behavior or activity is no longer perceived as uncomfortable, and becomes part of the student's natural routine.

Many people do not reserve adequate time, energy, or attention to nurturing their own creativity. This is due in port to a natural resistance to change that prevents imagining possibilities or entertaining thoughts and/or activities beyond the Equilibrium Setpoint (ES) represented by Equation 2 as follows:

Equation 2:

Setpoint before disruption = $S = R_{PM} / R_{BM}$ = Success Ratio

Setpoint after disruption = $S' = R'_{PM} / R'_{BM}$ = Success Ratio

Equilibrium Setpoint = $ES = S'/S = \dfrac{R'_{PM} / R'_{BM}}{R_{PM} / R_{BM}}$

A student wishing to diminish their equilibrium setpoint may begin by identifying one thing to change in their daily routine. Change and risk are inherent to achieving success. In order to accomplish new goals the student must extend himself or herself beyond the equilibrium setpoint of comfort. This invariably results in resistance. The student then makes a commitment to practice this change every day for the next three weeks. This is followed by the student monitoring their ability change; for example by measuring the level of difficulty involved in making the change, describing any resistance they encountered during the process of changing, and recording how they dealt with this resistance.

Passion-Mind ($R_{PM}$)

Regrets later in life for deeds not done earlier can cause one to be filled with overwhelming emotional pain so strong that it lead to depression or death from a broken heart. Whenever there exists a crisis of relevance, the Ego allows the student to spring into action instantly and with sustained vigor. This truly characterizes the nature of the Passion-mind. When the student become passionate about a pursuit, they take on a certain sense of urgency, and the passion becomes a crisis of relevance. For such magnitude of urgency to exist, there must be a strong link to regret if that act is not carried out or goal not achieved. When the Ego tries to sell the student on the idea that it is better to avoid short-term pain for longer term gain, it is misguided advice. FIG. 31 instructs the student to direct their creative energy (CA) to focus on the Passion-mind, rather the Body-mind. Disrupting the equilibrium setpoint may therefore be defined as the point at which the student's use of their Passion-mind exceeds their use of the Body-mind. The Body-mind represents the natural path for a student who has not yet successfully disrupted their equilibrium setpoint. A student who desires to achieve success must be instructed to disrupt their equilibrium setpoint such that their creative ambitions and compelling personal desire (CA') are directed through the Passion-mind pathway and away from the Ego controlled Body-mind pathway.

Once the student has disrupted their equilibrium setpoint, they are instructed to decrease their levels of sleep dormancy (SD) such that the student has more time available for achieving their creative ambition or compelling personal desire (CA'). The student is taught that they have a limited amount of time in which to accomplish their goals. With their equilibrium setpoint disrupted, the student may then utilize the CARS Distribution to allocate more energy over time towards Creative Ambition (CA), Recreation (R) and Self-Preservation (S). While the student's energy allocation may fluctuate from day to day, over the course of a lifetime this allocation of CA, R and S will influence their rate and opportunity for success. Successes will emerge from Creative Ambitions of the student who can successfully complete this reallocation. Successful people allocate more energy toward Creative Ambition and less energy towards Recreation and Self-Preservation. The more energy the student dedicates to their Creative Ambition, the more they will increase their rate of success.

Figure 24:
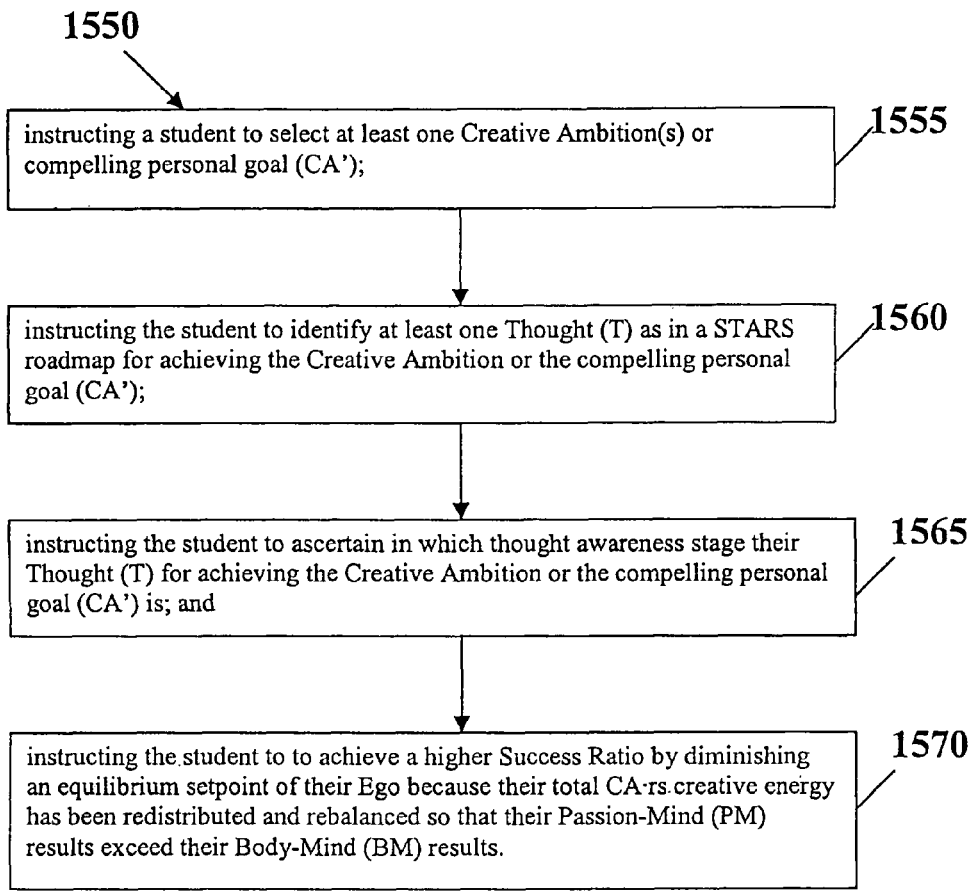
FIG. 24 depicts a flowsheet of a method of utilizing a STARS roadmap to achieve a higher Success Ratio and overcome resistance from the Ego, according to embodiments of the present invention.

FIG. 24 depicts a flowsheet of a method 1550 of utilizing a STARS roadmap to achieve a higher Success Ratio (as in Equation 2) and overcome resistance from the Ego. In the step 1555, a student is instructed to select at least one Creative Ambition(s) or compelling personal goal (CA'). In the step 1560, the student is instructed to identify at least one Thought (T) as in a STARS roadmap for achieving the Creative Ambition or the compelling personal goal (CA'). In step 1565, the student is instructed to ascertain in which thought awareness stage their Thought (T) for achieving the Creative Ambition or the compelling personal goal (CA') is. In step 1570, the student is instructed to achieve a higher Success Ratio (see Equation 2) by increasing an equilibrium setpoint of their Ego because their total CA·rs creative energy has been redistributed and rebalanced so that their Passion-Mind (PM) results exceed their Body-Mind (BM) results.

In the method 1550 the student is instructed to move their thought awareness stage of the at least one Thought (T) to Action (A) of the STARS roadmap to a willed action stage by increasing the equilibrium setpoint of their Ego. Alternatively, the student is instructed to move their thought awareness stage of the at least one Thought (T) to Action (A) of the STARS roadmap to a willed inaction stage by increasing the equilibrium setpoint of their Ego in the method 1550. The student is instructed to redistribute their total CA·rs creative energy by deriving their CA' from reduction of Ego Sleep Dormancy (ESD) and/or reduction of Ego·rs (E·rs) dormancy.

Figure 26:
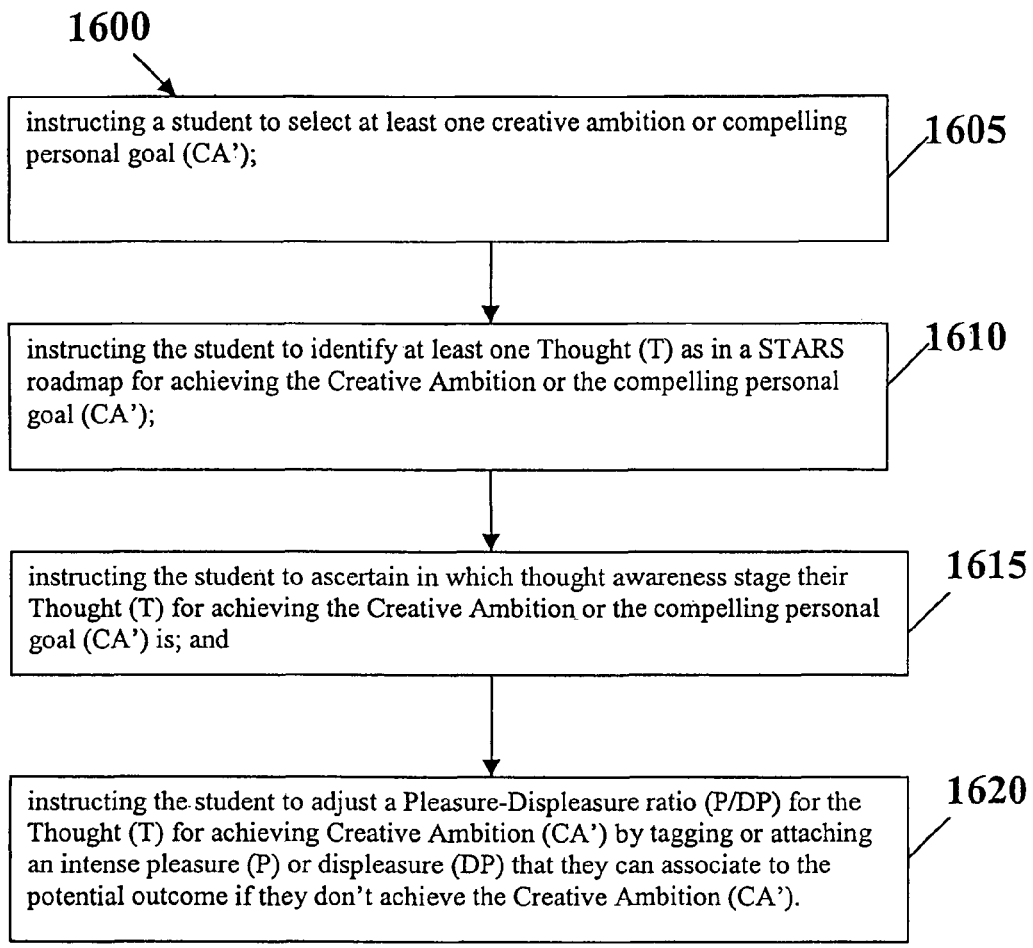
FIG. 26 depicts a flowsheet of a method of utilizing a STARS roadmap to overcome the Ego dominated Body-Mind Complex, according to embodiments of the present invention.

FIG. 26 depicts a flowsheet of a method 1600 of utilizing a STARS roadmap to overcome the Ego dominated Body-Mind Complex. In the step 1605, the student is instructed to select at least one Creative Ambition(s) or compelling personal goal (CA'). In the step 1610, the student is instructed to identify at least one Thought (T) as in a STARS roadmap for achieving the Creative Ambition or the compelling personal goal (CA'). In the step 1615, the student is instructed to ascertain in which thought awareness stage their Thought (T) for achieving the Creative Ambition or the compelling personal goal (CA') is. In the step 1620, the student is instructed to adjust a Pleasure- Displeasure ratio (P/DP) for the Thought (T) for achieving Creative Ambition (CA') by tagging or attaching an intense pleasure (P) or displeasure (DP) that they can associate to the potential outcome if they don't achieve the Creative Ambition (CA'). In the method 1600, the student is taught to reflexively attach forced pleasure to overcome a resistance associated by the student to perform the Action (A) because of the attached intrinsic displeasure (DP) of the Action (A). In the method 1600, the at least one Creative Ambition(s) or compelling personal goal (CA') is derived the Spirit (S) of the student(s) as in the STARS roadmap, wherein the Spirit(s) may draw CA' from the Supreme Collective Intelligence (SCI') or from a collective group of people (SCI).

In the method 1600, the student(s) are instructed to set up polar behavior choices to promote willed right action (Stage 2a) and reflex right action (Stage 2b) or promote Willed inaction (Suppressed wrong action) (STAGE 1b).

In the method 1600, the student(s) are taught to increase P/DP by applying forced pleasure (P) to the Action (A) the student has identified.

In the method 1600, the student(s) are taught to decrease P/DP by applying forced displeasure (DP) to the Action (A) the student has identified.

Figure 27:
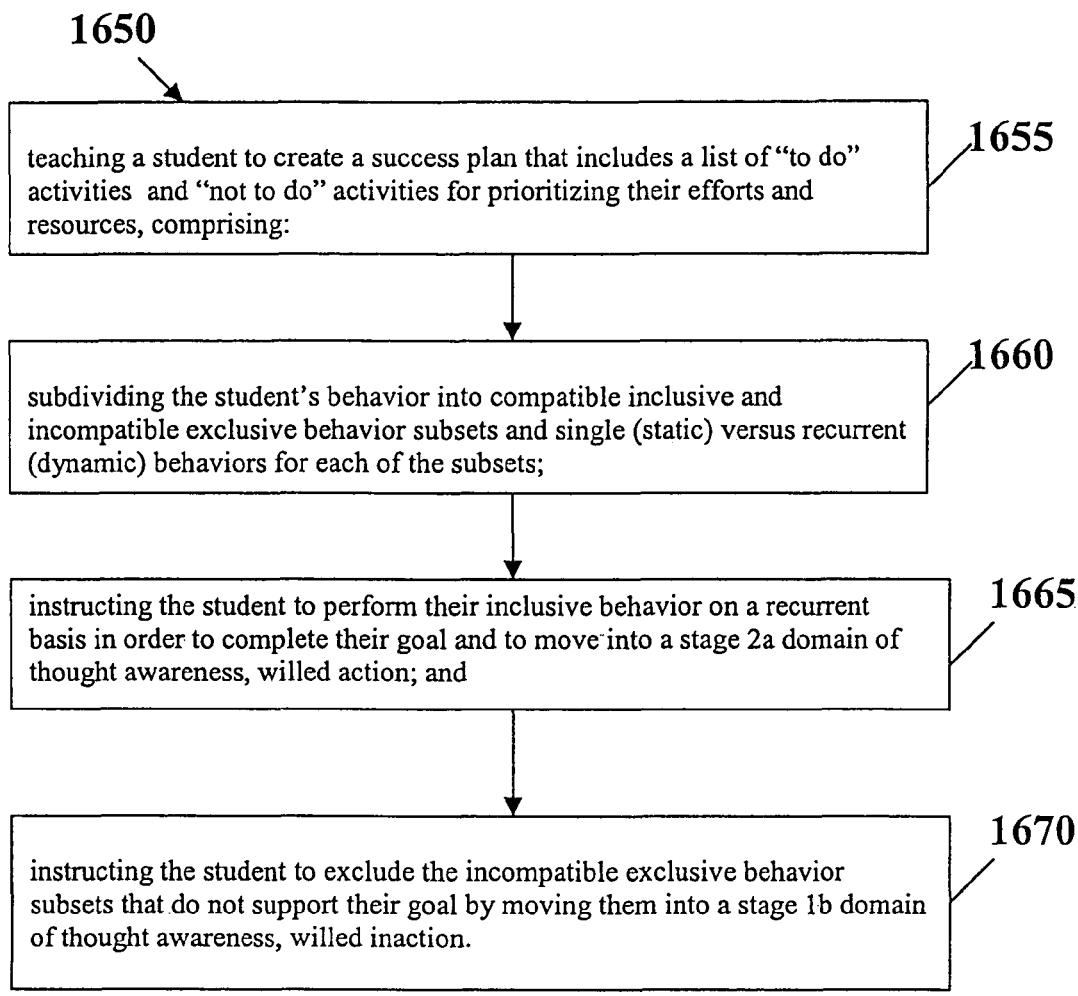
FIG. 27 depicts a flowsheet of a method 1650, teaching succes, according to embodiments of the present invention.

FIG. 27 depicts a flowsheet of a method 1650, teaching success. In the step 1655, a student is taught to create a success plan that includes a list of "to do" activities and "not to do" activities for prioritizing their efforts and resources. In the step 1655, the student is taught to subdivide their behavior into compatible inclusive and incompatible exclusive behavior subsets and single (static) versus recurrent (dynamic) behaviors for each of the subsets. In a step 1660, the student is instructed to perform their inclusive behavior on a recurrent basis in order to complete their goal and to move into a stage 2a domain of thought awareness, willed action. In a step 1665, the student is instructed to exclude the incompatible exclusive behavior subsets that do not support their goal by moving them into a stage 1b domain of thought awareness, willed inaction.

In the method 1600, each inclusive behavior required for achieving happiness is selected from the group consisting of experiencing love, belonging, connectedness, sanctuary and meaningfulness.

In the method 1600, each exclusive behavior that does not support achieving happiness is selected from the group consisting of anger, fear, selfishness and insecurity.

In the method 1600, the student is taught to displace the inclusive activity from Stage1c to Stage2a, e.g. to displace the inclusive activity from awareness with paralyzed inaction to awareness with willed action, thereby increasing a Success Ratio. Hereinafter, the Success Ratio is proportional to ES, as in Equation 2, herein.

Figure 28:
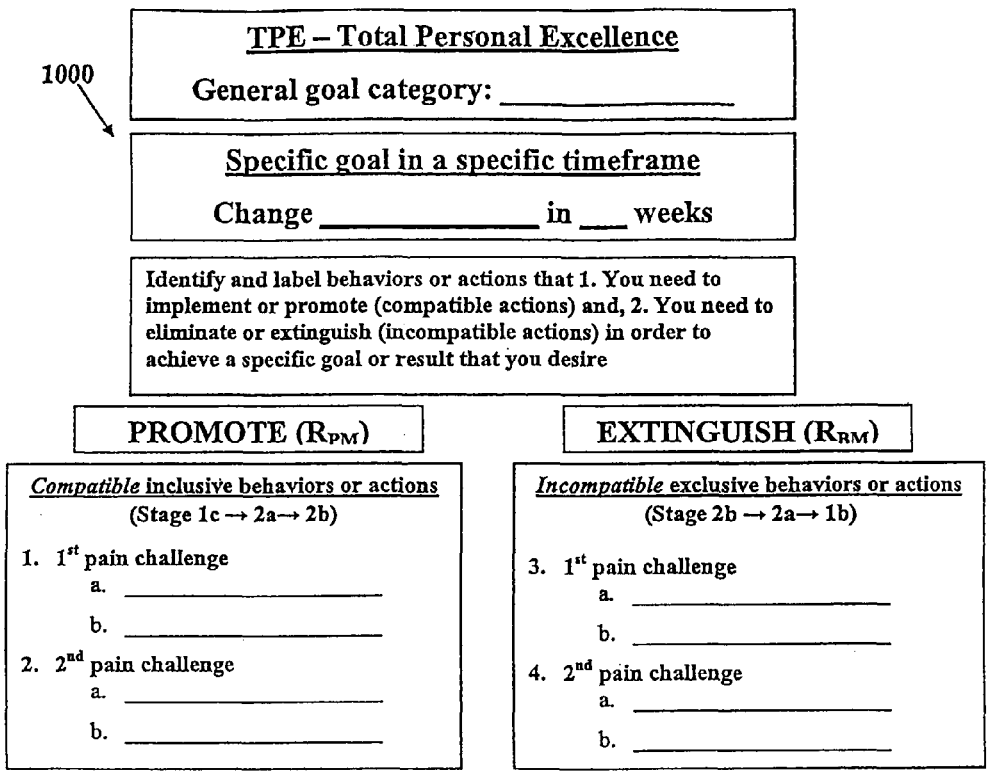
FIGS. 28-30 depict TPE diagrams, according to embodiments of the present invention.

FIG. 28 depicts a TPE diagram 1000. The student is instructed to Identify and label behaviors or actions that 1. You need to implement or promote (compatible actions) and, 2. You need to eliminate or extinguish (incompatible actions) in order to achieve a specific goal or result that you desire. The TPE diagram 1000 includes a goal tracker for recording micro successes on the goal tracker chart.

Figure 29:
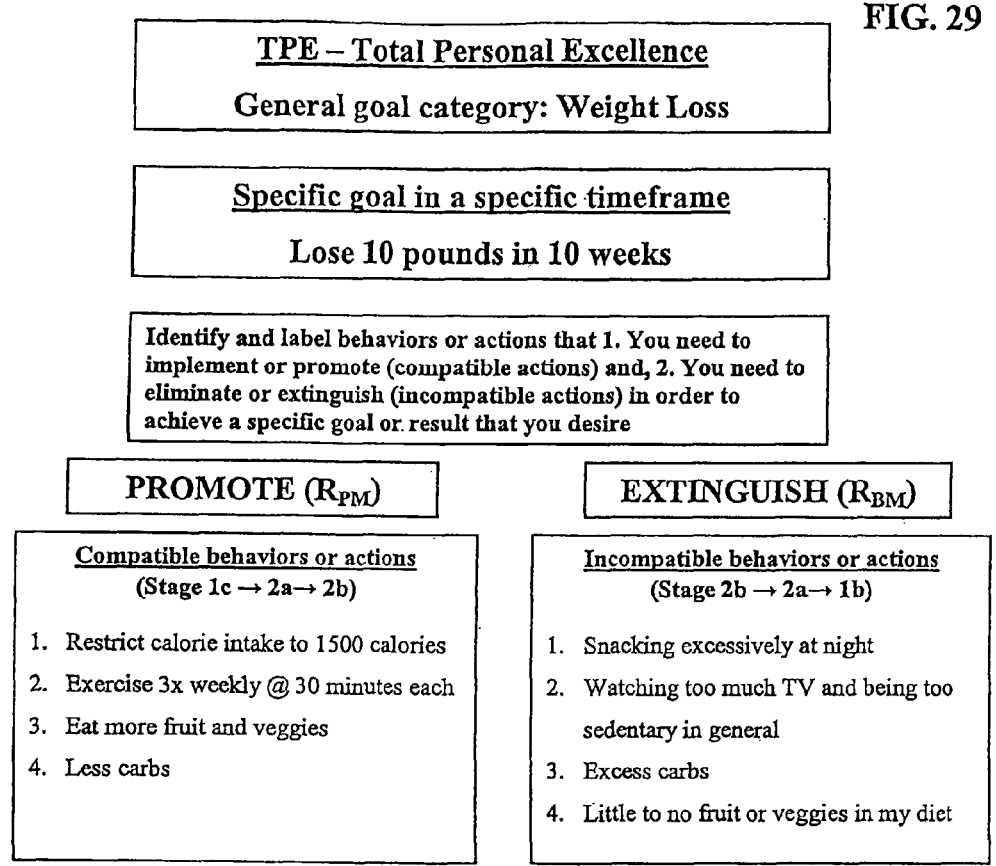

FIG. 29 depicts a TPE diagram 1000 for which the creative ambition and compelling goal is weight loss. The student is instructed to Identify and label behaviors or actions that 1. You need to implement or promote (compatible actions) and, 2. You need to eliminate or extinguish (incompatible actions) in order to achieve a specific goal or result that you desire. Here the compatible actions that the student(s) need to implement or promote are 1) Restrict calorie intake to 1500 calories; 2) Exercise 3× weekly @ 30 minutes each: 3) Eat more fruit and veggies; and 4) Eat Less carbs. The incompatible actions that the student(s) need to extinguish are: 1) Snacking excessively at night; 2) Watching too much TV and being too sedentary in general; 3) Excess carbs; and 4) Little to no fruit or veggies in my diet. The TPE diagram 1000 includes a goal tracker for recording micro successes on the goal tracker chart.

Figure 30:
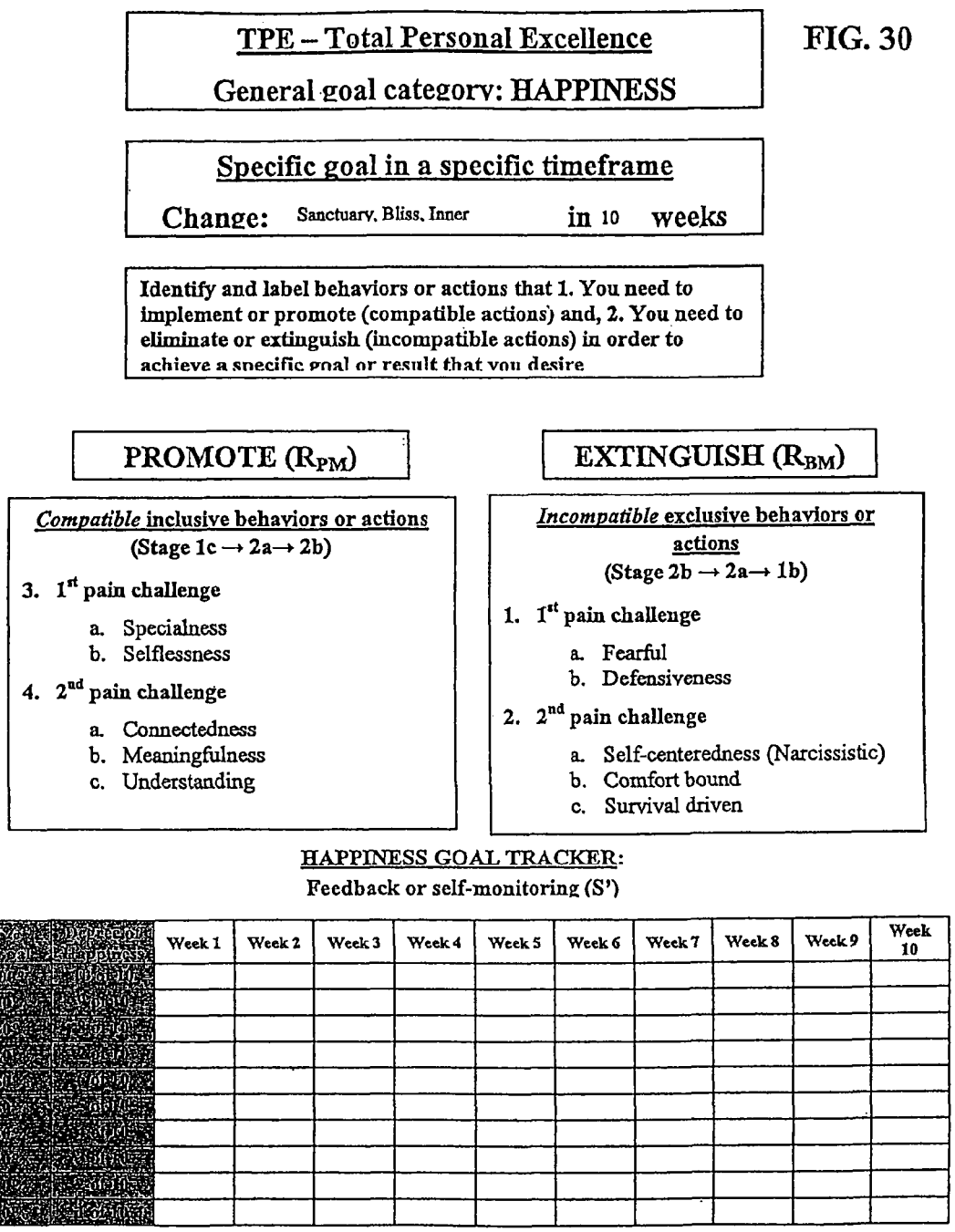

FIG. 30 depicts a TPE diagram 1000 for which the creative ambition and compelling goal is happiness. The student is instructed to Identify and label behaviors or actions that 1. You need to implement or promote (compatible actions) and, 2. You need to eliminate or extinguish (incompatible actions) in order to achieve a specific goal or result that you desire. Here the compatible actions that the student(s) need to implement or promote are first pain goals such as a) specialness and 2) selflessness and second pain goals are 3) connectedness, 4) meaningfulness and 5) understanding. The incompatible actions that the student(s) need to extinguish are second pain activities: 1) fearful; 2) defensiveness; 3) self-centeredness; and 4) comfort driven. The TPE diagram 1000 includes a happiness tracker for recording micro successes on the goal tracker chart.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A computer-implemented method for moving Thought (T) to Action (A) of a STARS roadmap, comprising:
   a computer system displaying on a computer screen an instruction to a student to select at least one Creative Ambition or compelling personal goal (CA');
   the computer system receiving data comprising the at least one CA';
   the computer system displaying on the computer screen an instruction to the student to ascribe at least one intensity of a perceived pleasure and to ascribe at least one intensity of a perceived pain of the at least one CA';
   the computer system receiving data comprising the intensity of the perceived pleasure and data comprising intensity of the perceived pain;
   the computer system determining an average perceived pleasure from the at least one intensity of a perceived pleasure, and an average perceived pain from the at least one intensity of a perceived pain;
   the computer system calculating and displaying a perceived relative reward, wherein the perceived relative reward is equal to the ratio of the average perceived pleasure to the average perceived pain, wherein said perceived relative reward indicates a probability of the student moving from the Thought (T) to the Action (A); and
   storing a set of data items comprising the calculated perceived relative reward in a data storage device coupled to the computer system.

2. The method of claim 1, further comprises instructing, by the computer system, the student to determine in which thought awareness stage the student is in for achieving the CA', wherein the thought awareness stage is selected from the group consisting of Nil Thought, Nil Action (stage 0); Aware Thought, Nil and Neutral Action (stage 1a); Aware Thought, Nil and Willed Inaction (stage 1b); Aware Thought, Nil and Paralyzed Inaction (stage 1c); Aware Thought, Willed Action (Stage 2a); and Nil Thought, Setpoint Reflex Action (stage 2b).

3. The method of claim 2, further comprising the computer system receiving data comprising the thought awareness stage the student is in for achieving the CA'.

4. The method of claim 1, wherein the at least one Creative Ambition or compelling personal goal (CA') is derived from Spirit (S) of the student as in the STARS roadmap wherein the Spirit may draw the at least one CA' from the supreme collective intelligence (SCI) or from a collective group of people (SCI').

5. The method of claim 1, further comprising: instructing the student, by the computer system, that the higher the perceived relative reward, the more likely that the student is to progress to a higher thought awareness stage.

6. The method of claim 1 further comprising:
  instructing the student, by the computer system, that CA' is achieved in micro successes;
    wherein the student experiences pain concurrently with each micro success in proportion to their Ego's resistance to foregoing Ego Sleep Dormancy (ESD) and/or Ego·rs (E·rs) dormancy,
    wherein the pain includes a first and a second pain, wherein the first pain progressively increases with each successive micro success until the first pain reaches a maximum and then subsides, wherein second pain progressively increases with each successive micro success until a final micro success which represents achieving the at least one CA' and then subsides, and
  instructing the student, by the computer system, that achieving a willed action or a reflex right action stages or a willed inaction stage requires offsetting resistance from the Ego by tagging or attaching an intense pleasure (P) or displeasure (DP) that the student can associate to the potential outcome if they don't achieve the Creative Ambition (CA').

7. The method of claim 1, wherein the at least one intensity for a perceived pleasure is ascribed with a value between 0 and 10 with 0 being no pleasure and 10 is a greatest pleasure, wherein the at least one intensity for a perceived pain is ascribed with a valued between 0 and 10 with 0 being no pain and 10 being a greatest pain.

8. The method of claim 1, wherein said determining of an average perceived pleasure from the at least one intensity for a perceived pleasure includes weighting each of the at least one intensity for a perceived pleasure, and wherein determining of an average perceived pain from the at least one intensity for a perceived pain includes weighting each of the at least one intensity for a perceived pain.

9. The method of claim 1, wherein the at least one perceived pleasure relates to a pleasure coming from the group consisting of love, happiness, altruism, creative ambition comfort, creative ambition excitement, creative ambition wealth, creative ambition sex, success, positive legacy and inspiration.

10. The method of claim 1, wherein the at least one perceived pain relates to a pain coming from the group consisting of fear, physical pain, emotional pain, discomfort, shame, guilt, worry and regret.

11. A computing system comprising a processor coupled to a computer-readable memory unit, said memory unit comprising a software application, said software application comprising instructions that when executed by said processor implement the method of claim 1.

12. A computer program product, comprising a computer-readable storage medium having a computer-readable program code stored therein, said computer-readable program code containing instructions configured to be executed by a processor of a computer system to implement a method of moving Thought (T) to Action (A) of the STARS roadmap, comprising:
  a computer system displaying on the computer screen, an instruction to a student to select at least one Creative Ambition or compelling personal goal (CA');
  the computer system receiving data comprising the at least one CA';
  the computer system displaying on a computer screen, an instruction to the student to ascribe at least one intensity of a perceived pleasure and to ascribe at least one intensity of a perceived pain of the at least one CA';
  the computer system receiving data comprising the intensity of the perceived pleasure and data comprising intensity of the perceived pain;
  the computer system determining an average perceived pleasure from the at least one intensity of a perceived pleasure, and an average perceived pain from the at least one intensity of a perceived pain;
  the computer system calculating and displaying a perceived relative reward, wherein the perceived relative reward is equal to the ratio of the average perceived pleasure to the average perceived pain, wherein said perceived relative reward indicates a probability of the student moving from the Thought (T) to the Action (A); and
  storing a set of data items comprising the calculated perceived relative reward in a data storage device coupled to the computer system.

* * * * *